(12) United States Patent
Korchev et al.

(10) Patent No.: US 10,800,925 B2
(45) Date of Patent: Oct. 13, 2020

(54) COMPOSITE PARTICLES HAVING COATED AGGREGATES WITH LOW STRUCTURE CARBON BLACK CORES, COATINGS AND INKS WITH HIGH RESISTIVITY AND OPTICAL DENSITY, DEVICES MADE THEREWITH, AND METHODS FOR MAKING SAME

(71) Applicant: Cabot Corporation, Boston, MA (US)

(72) Inventors: Andriy Korchev, Westford, MA (US); Geoffrey D. Moeser, Groton, MA (US); Danny Pierre, River Vale, NJ (US); Qian Ni, Billerica, MA (US); Federico Villalpando-Paez, San Francisco, CA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 16/310,530

(22) PCT Filed: Jun. 29, 2017

(86) PCT No.: PCT/US2017/039958
§ 371 (c)(1),
(2) Date: Dec. 17, 2018

(87) PCT Pub. No.: WO2018/005771
PCT Pub. Date: Jan. 4, 2018

(65) Prior Publication Data
US 2019/0211208 A1 Jul. 11, 2019

Related U.S. Application Data

(60) Provisional application No. 62/357,734, filed on Jul. 1, 2016, provisional application No. 62/452,084, filed on Jan. 30, 2017.

(51) Int. Cl.
| | | |
|---|---|---|
| C09C 1/50 | (2006.01) | |
| C09C 1/56 | (2006.01) | |
| G02F 1/1335 | (2006.01) | |
| G02F 1/1339 | (2006.01) | |

(52) U.S. Cl.
CPC .......... C09C 1/50 (2013.01); C09C 1/56 (2013.01); G02F 1/133512 (2013.01); *C01P 2004/80* (2013.01); *C01P 2006/10* (2013.01); *C01P 2006/12* (2013.01); *C01P 2006/13* (2013.01); *C01P 2006/19* (2013.01); *C01P 2006/40* (2013.01); *G02F 2001/13398* (2013.01)

(58) Field of Classification Search
CPC ....... C09C 1/50; C09C 1/56; G02F 1/133512; C01P 2006/19; C01P 2006/40
USPC ................................................. 523/200, 215
See application file for complete search history.

(56) References Cited

U.S. PATENT DOCUMENTS

| | | |
|---|---|---|
| 5,679,728 A | 10/1997 | Kawazura et al. |
| 5,830,930 A | 11/1998 | Mahmud et al. |
| 5,919,841 A | 7/1999 | Mahmud et al. |
| 5,948,835 A | 9/1999 | Mahmud et al. |
| 6,008,272 A | 12/1999 | Mahmud et al. |
| 6,028,137 A | 2/2000 | Mahmud et al. |
| 6,056,933 A | 5/2000 | Vogler et al. |
| 6,090,880 A | 7/2000 | Zimmer et al. |
| 6,159,275 A | 12/2000 | Otto et al. |
| 6,160,047 A | 12/2000 | Agostini et al. |
| 6,172,137 B1 | 1/2001 | Agostini et al. |
| 6,248,808 B1 | 6/2001 | Sone et al. |
| 6,444,727 B1 | 9/2002 | Yamada et al. |
| 6,709,506 B2 | 3/2004 | Mahmud et al. |
| 9,267,048 B2 | 2/2016 | Korchev et al. |
| 9,790,393 B2 * | 10/2017 | Korchev ................ B05D 3/067 |
| 10,519,298 B2 * | 12/2019 | Matheu .................... C09C 1/42 |
| 2003/0040553 A1 | 2/2003 | Mahmud et al. |
| 2005/0249657 A1 | 11/2005 | Kutsovsky et al. |
| 2014/0126936 A1 | 5/2014 | Step et al. |
| 2016/0017168 A1 | 1/2016 | Korchev et al. |

FOREIGN PATENT DOCUMENTS

| | | |
|---|---|---|
| EP | 1783178 A1 | 5/2007 |
| WO | WO 98/47971 | 10/1998 |
| WO | WO2006/137148 | 12/2006 |
| WO | WO 2014/165151 A1 | 10/2014 |

OTHER PUBLICATIONS

The International Search Report and the Written Opinion of the International Searching Authority, or the Declaration of International Application No. PCT/US2017/039958, dated Oct. 17, 2017.

* cited by examiner

*Primary Examiner* — Hannah J Pak

(57) ABSTRACT

Composite particles that super-aggregates of coated aggregates having low structure carbon black cores and metal/metalloid oxide mantles are described. Coatings containing filler-polymer compositions which have the composite particles as filler, such as curable coatings and cured coatings or films formed therefrom containing the filler-polymer compositions, with combinations of high resistivity, good optical density properties, good thermal stability, high dielectric constant, and good processability, along with their use in black matrices, black column spacers, light shielding elements in LCDs and other display devices, also are described. Inks containing the composite particle are described. Devices having these compositions, components and/or elements, and methods of preparing and making these various materials and products are described.

17 Claims, 18 Drawing Sheets

100 nm

COMPOSITE PARTICLES HAVING COATED AGGREGATES WITH LOW STRUCTURE CARBON BLACK CORES, COATINGS AND INKS WITH HIGH RESISTIVITY AND OPTICAL DENSITY, DEVICES MADE THEREWITH, AND METHODS FOR MAKING SAME

This application is a national phase application of PCT/US2017/039958, which claims priority from U.S. 62/357,734, filed Jul. 1, 2016, and U.S. 62/42,084, filed Jan. 30, 2017, the entire contents of both of which are incorporated herein by reference.

BACKGROUND OF THE INVENTION

The present invention relates to composite particles. The present invention further relates to coatings containing filler-polymer compositions with the composite particles as filler, and curable coatings and cured coatings or films containing the filler-polymer compositions, with combinations of high resistivity, good optical density properties, good thermal stability, low dielectric constant, and/or good processability. The present invention further relates to black matrices, black column spacers, light shielding elements for LCD devices and other displays, and other components that incorporate the coatings. The present invention further relates to inks having the composite particles. The present invention further relates to methods of preparing and making these various materials and products.

Carbon blacks are used as pigments in a wide variety of media, including, for example, inkjet inks, ink-jettable and photolithographic color filters, and toners. The structure and surface area of these blacks are chosen to permit a particular loading level of carbon black in a matrix and to reduce conductivity and charge accumulation in the media. Increased loading level increases the optical density (OD), a measure of the opacity of a coating material, but also increases the viscosity of the coating compositions used to produce the media. This can act as a limitation on the performance enhancements that may be obtained additively with carbon black. The structure of the carbon black also can affect processing, performance, or both. While carbon black aggregates with high structure are generally easier to disperse, they may cause significant viscosity build up in the dispersions or inks. High structure also may increase electrical conductivity.

Carbon blacks with low structure and intermediate to high surface area have been disclosed for use in coatings, black matrices, and other uses and can be obtained by a combination of adding alkali and/or alkaline earth salts to a feedstock of a carbon black furnace operated under certain process conditions including inter alia addition of auxiliary hydrocarbon. These carbon blacks with low structure and intermediate to high surface area and processes for making them are disclosed in U.S. Pat. Nos. 8,574,537 B2, 8,501,148 B2, and 9,217,944 B2, which are incorporated in their entireties by reference herein.

Carbon black has been used as filler in coatable polymer compositions that are used to make resistive black matrices, black column spacers, or other light shielding elements in electronic displays such as liquid crystal displays (LCDs). For such uses, filler-polymer compositions are desired which have both high electrical resistivity and good optical characteristics. The desired range of electrical volume (or surface) resistivity depends on a particular application of the filled polymer composition and, for example, can be in the range of from $10^1$ to $10^{18}$ Ohm·cm. A typical volume resistivity value for some commercial polymers is in the range of from $10^{12}$ to $10^{18}$ Ohm·cm. However, typical systems may not be able to provide the desired balance of overall properties, such as with respect to the desired light-shielding capabilities (e.g., an optical density (OD) of greater than 2 at 1 micron thickness) and high resistivity. Though, in general, optical density of a filler-polymer composition can be increased as a positive function of increasing carbon black loading level, a sharp change (reduction) in resistivity of the composite occurs when the concentration of carbon black particles in the polymer composition reaches a critical value at which continuous conductive paths are formed in the composite, which is referred to as "percolation." This can limit the range of optical density adjustments in polymer compositions that can be made through merely changing loading level of carbon black filler.

Filler-polymer compositions which contain dual phase silica-carbon black fillers and methods of their use have been developed to improve control of electrical properties of the coatings and composites comprising such silica-carbon black dual phase particles by adjusting particle loading, particle morphology and degree of silica surface coverage, such as described in U.S. Pat. No. 9,267,048 B2, which is incorporated in its entirety by reference herein.

Methods of making various types of dual phase fillers having a carbon phase and a silica phase, which may be used in such filler-polymer compositions and methods of control, are described in U.S. Pat. Nos. 6,709,506; 6,686,409; 6,364,944; 6,057,387, and 5,904,762, all incorporated in this application, in their entirety by reference herein. These incorporated '506, '409, '944, '387 and '762 patents disclose a method of making the dual phase filler that involves introducing a feedstock into a first stage of a multi-stage reactor, and introducing a second feedstock into the reactor at a location downstream of the first stage, wherein at least one of the first and second feedstocks comprise a carbon black-yielding feedstock, and at least one of the feedstocks comprises a silicon-containing and/or metal-containing compound which is volatizable/decomposable at carbon black reactor conditions. The incorporated 506, '409, '944, '387 and '762 patents disclose producing multiphase aggregates with different feedstock entry points on a feedstock injection zone arranged as first and second feedstock entry points that are spaced apart over a short distance.

Even with these advances, there is a continuing demand for even higher performance and more versatile fillers for use in LCD components, and other displays. For high electrical resistivity applications (such as black matrix, black column spacers, non-conductive black inks and coatings, and the like), dual phase particles preferably have a higher degree of silica surface coverage. To achieve that, a substantial concentration of silica in the composition of dual phase particles can be required. Such high concentrations of silica increase the filler loading required to achieve desired optical densities; however, the high loading of these high structure fillers also increases viscosity, reducing the processability of coating compositions.

Accordingly, there is a need for new filler and pigment particle materials, such as low structure hybrid particles, which can provide improved combinations and balances of resistivity, optical density, thermal stability, dielectric constant, processability, or other properties of media, such as in components of LCDs and other displays, e.g., black matrices, black column spacers, bezels, light-shielding elements, or other components made with polymer-filled compositions, as well as in inks and dispersions, or other compositions and materials.

SUMMARY OF THE PRESENT INVENTION

A feature of the present invention is to provide hybrid composite particles which can be used to provide improved combinations of electrical, optical properties, thermal, and/or processing properties in coatings, films, inks, and/or media.

A further feature of the present invention is to provide coatings which contain filler-polymer compositions with the filler comprising the hybrid composite particles, which have combinations of high resistivity, good optical density properties, low dielectric constant, processable viscosity at high particle loading, and/or good thermal stability.

A further feature of the present invention is to provide cured coatings or films which contain filler-polymer compositions with the filler comprising the hybrid composite particles, which have combinations of high resistivity, good optical density properties, low dielectric constant, processable viscosity at high particle loading, and/or good thermal stability.

A further feature of the present invention is to provide black matrices which contain filler-polymer compositions with the filler comprising the hybrid composite particles, which have combinations of high resistivity, good optical density properties, low dielectric constant, processable viscosity at high particle loading, and/or good thermal stability.

A further feature of the present invention is to provide black column spacers which contain filler-polymer compositions with the filler comprising the hybrid composite particles, which have combinations of high resistivity, good optical density properties, low dielectric constant, processable viscosity at high particle loading, and/or good thermal stability.

A further feature of the present invention is to provide light shielding elements in a LCD or other display which contain filler-polymer compositions with the filler comprising the hybrid composite particles, which have combinations of high resistivity, good optical density properties, low dielectric constant, processable viscosity at high particle loading, and/or good thermal stability.

A further feature of the present invention is to provide methods for making hybrid composite particles which can be used in coatings, films, inks, and/or media.

A further feature of the present invention is to provide methods for making curable coatings, radiation or thermally-curable coatings, black matrices, black column spacers, and/or other light shielding elements in a LCD or other display, which contain filler-polymer compositions with the filler comprising the hybrid composite particles that can maintain good thermal stability, and controlled electrical resistivity, optical density and/or dielectric constant, in the filler-polymer compositions, when exposed to radiation and/or elevated temperature for preparation or post-processing.

Another feature of the present invention is to provide devices, such as LCDs, which incorporate one or more of the curable coatings, radiation or thermally-curable coatings, black matrices, black column spacers, bezels and/or other light shielding elements of displays.

An additional feature of the present invention is to provide inks and dispersions having the hybrid composite particles, an aqueous or non-aqueous carrier, and a polymer or resin.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to carbon black-metal/metalloid oxide composite particles, comprising a plurality of carbon black aggregates, wherein each carbon black aggregate is at least partially coated with at least one metal oxide or metalloid oxide or any combinations thereof to provide coated aggregates. The coated aggregates are fused together to form individual composite particles having an exposed outer surface area. The at least one metal oxide or metalloid oxide is at least 30% by surface area of the exposed outer surface area of the composite particles.

The present invention further relates to a method of making carbon black-metal/metalloid oxide composite particles of the present invention, comprising forming a stream of combustion gases by reacting a preheated air stream with a fuel, introducing first feedstock into the stream of combustion gases at a predetermined number of points arranged in a first ring pattern that is defined around the stream of combustion gases to form a reaction stream and start pyrolysis of the first feedstock in the reaction stream, wherein the first feedstock comprises carbon black-yielding feedstock, introducing an auxiliary hydrocarbon into the stream of combustion gases at a predetermined number of points arranged in a second ring pattern that is defined around the stream of combustion gases, wherein the first and second ring patterns may be located at a same location or different locations, additionally introducing into at least one of the stream of combustion gases or the reaction stream or any combinations thereof at least one substance containing at least one Group IA element or Group IIA element or any combinations thereof, allowing carbon black aggregates to form in the reaction stream, thereby forming carbon black aggregates suspended in the reaction stream, wherein the carbon black aggregates have external surfaces, introducing a second feedstock comprising at least one of metal containing compound or metalloid-containing compound or any combinations thereof into the reaction stream in which the carbon black aggregates are suspended, the reaction stream having sufficient temperature to decompose the at least one metal-containing compound or metalloid-containing compound or any combinations thereof, wherein the decomposed at least one metal-containing compound or metalloid-containing compound or any combinations thereof form a shell comprising metal oxide or metalloid oxide or any combinations thereof about at least a portion of the external surfaces of the carbon black aggregates to form at least partially coated carbon black aggregates; and allowing the at least partially coated carbon black aggregates to fuse together to form composite particles before quenching the pyrolysis, wherein the at least one metal oxide or metalloid oxide or any combinations thereof is at least 30% by surface area of the exposed outer surface area of the composite particles.

In addition, the present invention relates to coatings, curable coatings, e.g., radiation or thermally-curable coatings, cured coatings, black matrices, black column spacers and/or other light shielding elements in a LCD or other display comprising a filler-polymer composition wherein the filler comprises composite particles of the present invention. The filler-polymer composition of the curable, cured coating, black matrix, black column spacer or other light shielding elements in a LCD or other display can include a combination of at least one polymer with at least one filler.

Also, the present invention relates to products or articles containing one or more of the coatings, curable coatings, cured coatings, black matrices, black column spacers and other light shielding elements in a LCD or other display which comprise filler-polymer compositions which contain composite particles of the present invention. The product or article can be or include a liquid crystal display, and the like.

The present invention further relates to a method of making a cured coating comprising (i) combining at least one polymer with at least one filler and optionally a vehicle, such as a volatizable liquid, to provide a curable, for example, by irradiation or heat, filler-polymer composition, the filler comprising the carbon black-metal/metalloid oxide composite particles of the present invention; (ii) applying the curable filler-polymer composition onto a substrate to form a curable coating; (iii) curing the coating imagewise to form a cured coating; and (iv) developing and drying the cured coating.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

BRIEF DESCRIPTION OF DRAWINGS

FIGS. 3A-3D are TEM images for composite particles with 80% silica surface coverage according to an example of the present application, wherein the composite particles were super-aggregates of coated aggregates that have an aggregate core that is a low structure carbon black and silica mantles, wherein FIG. 3A shows a material as made (scale bar=100 nm) and FIGS. 3B-3D show ashed samples at various magnifications (scale bars=500 nm, 100 nm, and 20 nm, respectively).

DETAILED DESCRIPTION OF THE PRESENT INVENTION

Figure 1:
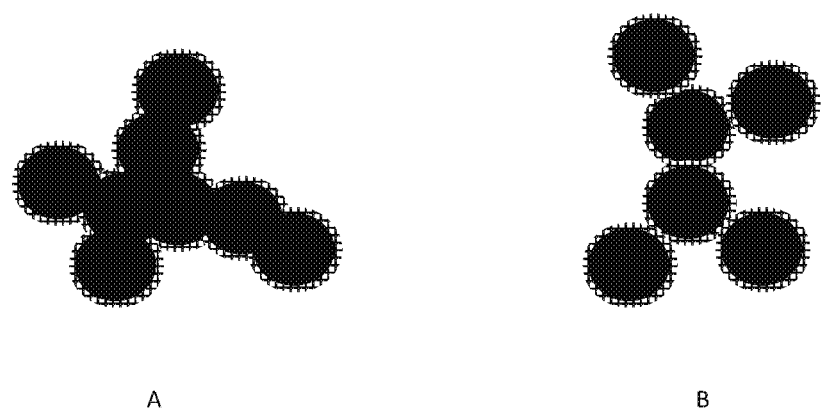
FIG. 1 is a schematic representation of a composite particle (B) according to an example of the present application, and an aggregate particle (A) that represents a comparison dual phase silica-carbon black.

The present invention relates to composite particles that individually comprise a super-aggregate of individual coated aggregates that have aggregate cores which can be ultra-low structure carbon black, and metal/metalloid oxide mantles (shells). The composite particles of the present invention can impact various properties of materials that incorporate them in beneficial ways. The coated aggregates are fused together into an overall aggregate, referred to herein as a super-aggregate, that is a discrete composite particle. The composite particles of the present invention, and the coated aggregate constituents thereof that have core-shell structures, with the core comprising, consisting of or being the low structure carbon black and the shell comprising, consisting of or being the metal oxide or metalloid oxide, such as silica. The composite particles of the present invention are not considered dual-phase particles that have two phases (a phase of carbon and a phase of metal oxide) mixed in and among each other (e.g., distributed randomly throughout the volume of each particle with no clear formation of a core and shell of different materials). The composite particles can disperse well in coatings and inks without viscosity build-up problems. The composite particles are useful as a filler or pigment material in media. Combined improvements in electrical, optical, thermal, and/or processing properties or other properties can be obtained in coatings, inks, or other media that are modified with the composite particles.

In the structure of a composite particle of the composite particles of the present invention, the coated aggregates are fused together to form a unitary composite particle that has an exposed outer surface area, wherein the metal oxide, or metalloid oxide, or any combinations thereof is at least 30%, or at least 40%, or at least 50%, or at least 60%, or at least 70%, or at least 80%, or at least 90%, or at least 95%, or at least 99%, or is from 30% to 100%, or from 30% to 99%, or from 30% to 70%, or from 30% to 60%, or from 35% to 95%, or from 40% to 90%, or from 50% to 80%, or from 60% to 80% or other amounts by surface area of the exposed outer surface area of the composite particle (e.g., particle (BET) surface area). The metal/metalloid oxide can fully or partially cover the exposed surface area of the individual coated aggregates in similar values before they are united together as a composite particle (e.g., from 30% to 100%, or from 30% to 99%, and so on, surface coverage). The metalloid of the metalloid oxide can be or include silicon, boron, germanium, or any combinations thereof. The metalloid of the metalloid oxide can be or include silicon. As an option, the metalloid oxide can be silica, and the above-indicated surface area amounts can refer to surface area coverage from silica. The metal of the metal oxide can be or include aluminum, zinc, magnesium, calcium, titanium, vanadium, cobalt, nickel, zirconium, tin, antimony, chromium, neodymium, lead, tellurium, barium, cesium, iron, molybdenum, or any combinations thereof.

The composite particles of the present invention can have high resistivity and impart good optical density to coatings and inks modified therewith. The composite particles can have a powder resistivity greater than 20 Ω·cm, or greater 50 Ω·cm, or greater than 100 Ω·cm, or greater than 500 Ω·cm, or greater than 1000 Ω·cm, or greater than 2500 Ω·cm, or greater than $10^4$ Ω·cm, or greater than $10^5$ Ω·cm, or greater than $10^6$ Ω·cm, or greater than $10^7$ Ω·cm, or from 20 Ω·cm to $10^8$ Ω·cm, or from 1000 Ω·cm to $10^8$ Ω·cm, or from $10^6$ Ω·cm to $10^8$ Ω·cm or other resistivity values, all at a powder density of 1 g/cc. These high resistivities can be provided in composite particles that contain 1 wt % to 90 wt %, or from 2 wt % to 70 wt %, from 3 wt % to 70 wt %, or from 4 wt % to 60 wt %, or from 5 wt % to 50 wt %, or from 7.5 wt % to 40 wt %, or from 10 wt % to 30 wt % or other amounts of metal/metalloid oxide content in the composite particles. High or predominant metal/metalloid content need not be required in the composite particles of the present invention to obtain resistivity targets. This can prevent or mitigate compromising optical density or other properties when targeting a resistivity property for a composition or product modified with the composite particles.

High electrical resistivity of the composite particles of the present invention is thought to be the result of their inherent structure, which comprise a "super-aggregate" of coated aggregates that comprise an aggregate core that comprises a low structure carbon black and a mantle (shell) that comprises metal oxide, metalloid oxide, or a combination thereof. To illustrate this, FIG. 1 shows schematically a comparison of a "super-aggregate" composite particle (B) of the present application, and an aggregate particle (A) that represents a comparison dual phase silica-carbon black particle based on a commercial product. For purposes of this illustration, composite particle (B) comprises a plurality of coated aggregates which have a silica mantle-carbon black core structure, that are fused together to form a single "super-aggregate." Silica coating regions are identified in hatched surface portions and carbon core regions in black shading in FIG. 1. The comparison aggregate particle (A) is comprised of carbon primary particles that fuse together to form a highly-aggregated, randomly-shaped aggregate having a highly irregular outer surface with silica randomly deposited on the highly irregular surface structure of the aggregate of carbon particles. While FIG. 1 shows comparison aggregate particle (A) with almost complete surface silica coverage, this is neither required nor typical. Composite particle (B) is a super-aggregate formed of coated aggregates that are fused together by the silica coating. The coated aggregates have low structure carbon black cores with reduced aggregation and well-defined shapes and geometries (e.g., high sphericity and roundness) that are coated with silica mantles (or other metal/metalloid oxide mantles) that replicate the well-formed low structures of the core, and this shell/core structure is well-preserved in the overall aggregate. This different structure of the composite particle of the present invention can provide performance benefits, particularly high electrical resistivity, and processing capabilities that extend beyond those of previous dual phase fillers.

The composite particles of the present invention can be prepared with aggregate cores that are low structure carbon black aggregates. Oil absorption number (OAN) is a measure of particle structure. The carbon black aggregates that can be used as aggregate cores for formation of the coated aggregates of composite particles of the present invention can have low structure. OAN value typically is proportional to the degree of aggregation of structure level of a particle. The carbon black aggregates of the composite particles of the present invention can have an OAN of from 30 to 50 cc/100 g, or from 35 to 50 cc/100 g, or from 35 to 45 cc/100 g, or other values.

The carbon black aggregates that can be used for the aggregate cores can have high sphericity and roundness and may approach an essentially overall spherical geometry. The carbon black aggregates can have a roundness, i.e., the ratio of the convex perimeter to the perimeter, of at least 0.8, at least 0.85, or at least 0.9, based on electron microscopy images of samples of at least 2000 carbon black aggregates at the magnification recommended for TEM observation under ASTM D-3849. The low structure carbon black aggregates used for the aggregate cores, before their coating with silica or other metal/metalloid oxide, can be a high purity, single phase material, such as carbon black aggregates that have less than 1 wt %, or less than 0.5 wt %, or less than 0.1 wt % total metal oxide and metalloid oxide, or less than 0.05 wt %, or less than 0.01 wt % or other amounts, based on the weight of the carbon black aggregates. In providing a composite particle of the present invention, these well-formed low structure carbon black aggregates used for the aggregate cores, as a foundation particle for the formation of coated aggregates that form or cluster into super-aggregates thereof, can facilitate the build and control of properties in the composite particles formed from these starting structures.

As can be observed through electron microscopy, which is shown in the figures described herein, each carbon particle core of a composite particle of the present invention has a thin dielectric layer of silica or other metal/metalloid oxide which, depending on the level of silica or other metal/metalloid oxide coverage, may significantly affect (reduce) the transport of electrons between the aggregates in the super-aggregate composite particle. This can increase resistivity of the overall composite particle. Further, distinct borders between nearly spherical silica or other metal/metalloid oxide mantles can be observed by electron microscopy in ashed samples of composite particles of the present invention, such as shown in the figures described herein, which distinct borders are not present in higher structure silica-carbon black dual phase particles when viewed similarly. This indicates a high concentration of metal/metalloid oxide material in a shell or surface region of the coated aggregates, as compared to distribution of the metal/metalloid oxide on the surface and significantly through and/or into the bulk volume of the carbon black of the aggregate cores. Further, thin layers of metal/metalloid oxide material, such as silica, can be optically transparent in the visible spectrum, which can allow optical density properties of core material coated therewith to continue to be achievable even when partially or extensively coated with a thin layer of the metal/metalloid oxide material in the coated aggregates and the composite particle products of the present invention.

Composite particles of the present invention can be more electrically resistive at the same particle structure as compared to dual phase silica-carbon black particles that lack the aggregate cores that are low structure carbon cores. Practically, this means that higher electrical resistivity can be achieved with higher filler loading and/or less total silica or other metal/metalloid content in the product particles. In composite particles of the present invention, the silica or other metal/metalloid oxide can function as a structure facilitator on the aggregate cores to build higher structure aggregates, when starting with the ultra-low structure carbon black seeds. Without being bound by any particular theory, it is believed that the low structure carbon black cores are linked together by silica junctions that prevent the conduction of electrons from one core to another, depriving electrons of a conductive path from one end of the composite particle to another. In contrast, prior art dual phase silica-carbon black particles having a higher structure core (see FIG. 1A) have a conductive path from one end of the particle to another, and any gap in the silica coverage allows transmission from one dual phase particle to another. This is thought to explain, at least in part, why composite particles of the present invention can show much better resistivity as even compared to different particles having similar structure which are dual phase particles lacking the aggregate cores that are low structure carbon cores, or low structure single phase carbon blacks. Further, powders of the composite particles of the present invention can be more electrically resistive at the same silica coverage as compared to dual phase silica-carbon black particles that lack the aggregate cores that are low structure carbon cores. The composite particle of the present invention can provide increased electrical resistivity even at relatively low surface coverage (e.g., 35-60%). Therefore, the properties driven by carbon, for example, optical density, can be enhanced using composite particles of the present invention, and can go hand-in-hand with the improvements in resistivity.

Another direct advantage of having less silica or other metal/metalloid oxide content in the composite particles is the ability and option to achieve the desired level of performance with higher particle loading in the formulations, which provides more flexibility to users. Coatings modified with composite particles of the present invention can have lower viscosity as compared to coatings modified with dual phase silica-carbon black particles that lack the aggregate cores that are low structure carbon cores (i.e., have higher structure) at similar loading levels, which allows for increasing the solid % of the composite particle filler in coated films such that higher optical densities can be reached.

Further, a composite particle having such a "shell (mantle)/core" structure can be beneficial for wetting and dispersing processes, which are common steps in the preparation of the millbases and inks. A special feature of the composite particles of the present invention comprising the core-shell particles with low structure carbon black core can include the breakage of the aggregates induced by very strong shear forces, for example, upon bead milling. As the result, particle size can be substantially reduced; however their high electrical resistivity performance can be expected to be unaltered.

It is known that modification of the surface chemistry of carbon black, e.g., by oxidation or diazonium treatment can increase electrical resistivity of the carbon particles. However, surface treated carbons generally demonstrate distinct sensitivity to elevated temperature depending on the nature of the treatment chemistry and/or reaction by-products. This limits their use in the applications that require exposure to elevated temperatures. Compositions including with composite particles of the present invention show excellent thermal stability, as confirmed in studies described herein. The composite particles can have a loss on heating of less than 1 wt % loss, or less than 0.75 wt % loss, or less than 0.50 wt % loss, or less than 0.1 wt % or other values, when subjected to a temperature of from 110° C. to 450° C. in air with a temperature ramp of 5° C. per minute. This makes the composite particles good candidates for applications that either require thermal stability (in air) or that demand no change in material performance, such as electrical resistivity, after exposure to elevated temperature. Furthermore, the composite particles can improve the dielectric performance of coatings such as black matrices and black column spacers by increasing breakdown voltage and/or by increasing dielectric constant.

The composite particle of the present invention can be characterized by one or more properties, such as an OAN of from 60 to 130 cc/100 g, or from 70 to 120 cc/100 g, or from 80 to 110 cc/100 g composite particles or other OAN values; and/or a BET of 50-90 $m^2/g$, or from 55-80 $m^2/g$ or from 60 to 80 $m^2/g$ or from 70 to 90 $m^2/g$ or other values; and/or a ratio of BET ($m^2/g$)/iodine number (mg/g) of from 2 to 5, or from 3 to 4 or other values. OAN is measured as per ASTM 2414, and Nitrogen surface area (BET) and STSA surface area is measured as per ASTM D6556-10. The composite particles can have an average size of up to 500 nm, such as from 35 to 500 nm, or from 50 to 400 nm, or from 75 to 250 nm or other values. The composite particle can have an iodine number of 200 mg/g or lower, such as from 5 to 200 mg/g, or other values. Roundness and OAN of the carbon black cores can be measured after hydrofluoric acid treatment of the coated aggregates to leave residual silica of less than 1 wt %. Roundness is the arithmetic average of the ratio of the convex perimeter/perimeter of at least 2000 particles observed by transmission electron microscopy (TEM). Iodine adsorption number of the carbon blacks ($I_2$ No.) is determined according to ASTM Test Procedure D-1510-08. Average particle size of aggregates, such as the composite particles, can be determined, for example, by ASTM Test D-3849.

The present invention further relates to curable coatings, radiation and thermally-curable coatings, cured coatings, black matrices, black column spacers, bezels and other light shielding elements in LCDs, other displays, inks (e.g., ink-jettable inks), and other products and compositions, which contain at least one composite particle of the present invention. As used herein, to "cure" a polymer means to harden it by cross-linking or otherwise increasing its molecular weight. The composite particle can be used for control of combinations of electrical, optical, thermal, processing properties or other properties of coating compositions and inks prepared therewith. In the present invention, the electrical resistivity can be controlled such that the surface electrical resistivity of a cured coating, a curable-coating, a radiation or thermally-curable coating, a cured coating or film formed therefrom, a black matrix, a black column spacer and other light shielding element in an LCD or other display formed from a filler-polymer composition containing the composite particle as filler can be $10^6$ to $10^{16}$ ohms per square (Ohm/sq or $\Omega$/sq) or more, such as from $10^8$ to $10^{16}$ Ohm/sq, or from $10^{10}$ to $10^{16}$ Ohm/sq, or from $10^{10}$ to $10^{15}$ Ohm/sq, or from $10^{10}$ to $10^{14}$ Ohm/sq, or from $10^{11}$ to $10^{16}$ Ohm/sq, or from $10^{11}$ to $10^{15}$ Ohm/sq, or from $10^{11}$ to $10^{14}$ Ohm/sq, or from $10^{12}$ to $10^{16}$ Ohm/sq, or from $10^{12}$ to $10^{15}$ Ohm/sq, or from $10^{12}$ to $10^{14}$ Ohm/sq, or from $10^{14}$ to $10^{16}$ Ohm/sq, or other controlled amounts. The electrical resistivity is with respect to the composition that contains the filler and polymer, which can be used in forming a curable coating, radiation or thermally-curable coating, cured coatings or films, a black matrix, a black column spacer and other light shielding elements in an LCD or other display of the present application. As shown by examples provided herein, higher resistivity and optical density can be reached with the filler-polymer composition having the composite particles of the present invention at the same silica surface coverage as dual phase silica-carbon black particles that lack the low structure carbon cores. In addition, higher optical densities can be obtained since the composite particles can be loaded at higher levels in polymer compositions since the viscosity of the polymer compositions filled with the composite particles can be lower than for dual phase silica-carbon black particles that lack the low structure carbon cores at the same loading level. The curable coatings, radiation or thermally-curable coatings, cured coatings or films, black matrices, black column spacers and other light shielding elements in an LCD or other display containing these composite particles can further provide suitable color properties (such as optical density, tinting strength, and the like).

The composite particles can be used in filler-polymer compositions to provide coatings which have optical density such as greater than or equal to 1 per one micron (μm) thickness, or greater than or equal to 1.25 per one micron thickness, or greater than or equal to 1.5 per one micron thickness, or greater than or equal to 1.75 per one micron thickness, or greater than or equal to 2.0 per one micron thickness, or greater than or equal to 2.5 per one micron thickness or higher values, or greater than 3 per one micron thickness or higher values, or from 1 to 4 per one micron thickness, or from 1.5 to 2.5 per one micron thickness, or from 2 to 3 per one micron thickness, or other values. The optical density values provided are based upon a measurement of a coating having a one micron thickness or per one micron increments in the coating. These optical density values can apply to curable, cured, or both of these forms of coatings. The composite particles can have a tinting strength of from 75 to 100, or from 80 to 99, or from 75 to 95 or other values. Tinting strength (Tint) of the composite particles can be determined according to ASTM Test Procedure D3265-07. The composite particles can be used in filler-polymer compositions to provide a low dielectric constant layer, such as films having a dielectric constant of less than 20, or less than 15, or less than 10, or from 1 to less than 20, or from 5 to less than 20, or from 10 to less than 20, or other values. For purposes of the present invention, and unless stated otherwise, all values for dielectric constant are measured at 1 MHz.

A method of the present invention has been developed by which the composite particle can be formed in a single continuous process flow in a modular or "staged" furnace carbon black reactor that is used to build and control the structure of the particle. Different feedstock materials are introduced at different introduction points that are spaced apart sufficiently within the reactor to allow low structure carbon black "core" or "seed" particles to be well-formed before these aggregate core or seed particles are converted downstream into metal/metalloid oxide coated aggregates by separate downstream feedstock introduction of decomposable and/or volatizable metal/metalloid-containing compounds. The carbon black core or seed particles processed in this manner can be converted from single phase carbon particles into core/shell structures with metal/metalloid oxide mantles about carbon black cores. The resulting coated aggregate particles, as intermediate products, in turn can fuse with similar coated aggregates in the reactor before quench to form an overall aggregate or "super-aggregate" for recovery as a composite particle of the present invention. A plurality of such composite particles can be formed concurrently in the carbon black reactor and recovered during the same production run.

Figure 2:
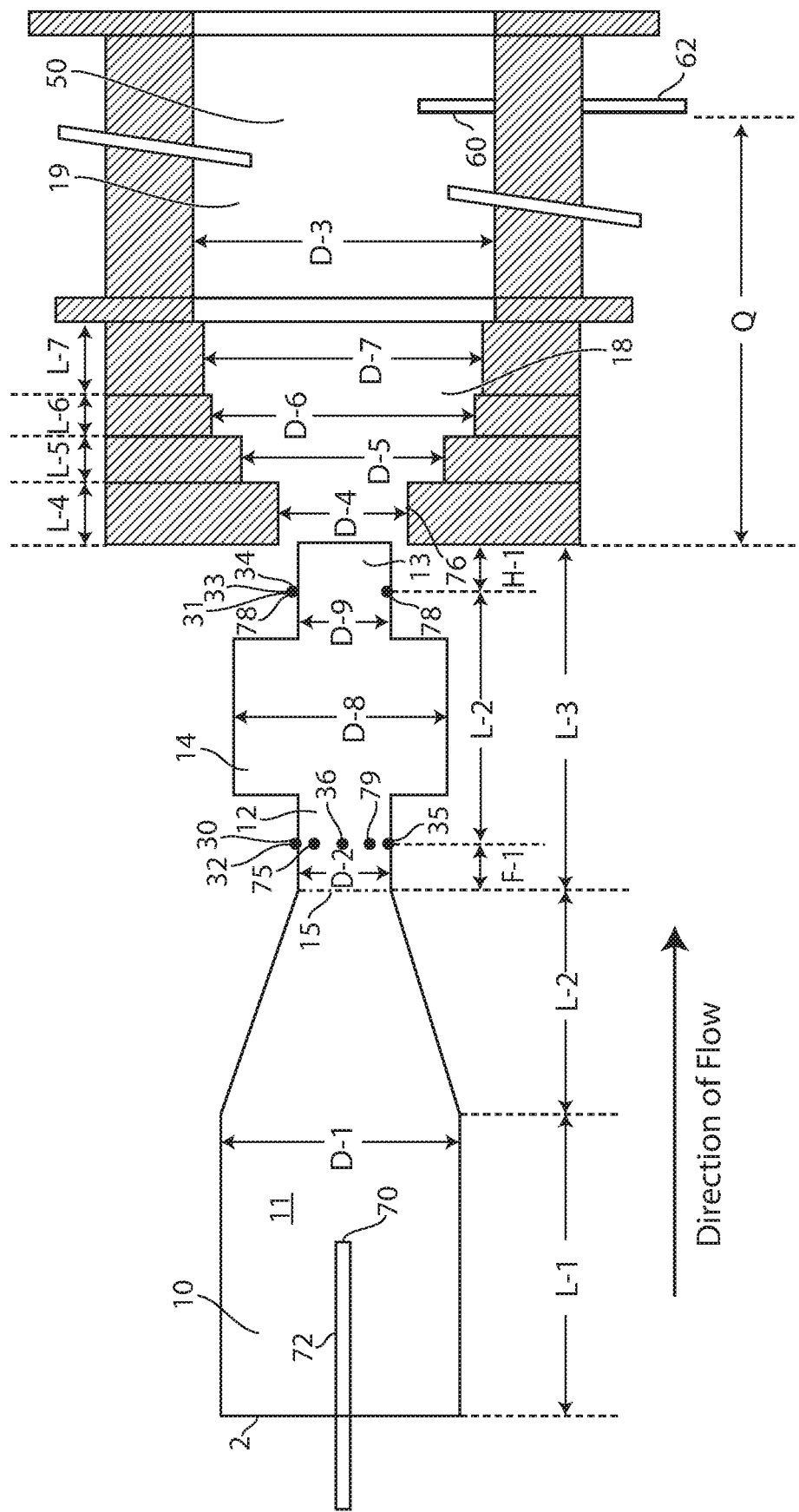
FIG. 2 is a schematical view of a portion of one type of furnace carbon black reactor that may be utilized to produce composite particles according to an example of the present application.

A modular or multi-staged furnace carbon black reactor as depicted in FIG. 2 can be used, as an option, to produce composite particles of the present invention. The furnace or reactor has more than one stage or entry point for separate introduction of carbon black-yielding feedstock and metal/metalloid oxide forming feedstock in a particular sequence and arrangement to build the composite particle. Composite particles can be produced in a modular furnace carbon black reactor 2, such as that depicted in FIG. 2, having a combustion zone 10, which has a zone of converging diameter 11, first transition zone 12, second transition zone 13, entry section 18, and reaction zone 19. The diameter of the combustion zone 10, up to the point where the zone of converging diameter 11 begins, is shown as D-1; the diameter of zone 12, as D-2 (which can be the same or substantially the same as diameter D-9 for zone 13); a zone 14 of enlarged diameter D-8 is located between D-2 and D-9, the diameters of the stepped entry section, 18, as D-4, D-5, D-6, and D-7; and the diameter of zone 19, as D-3. The length of the combustion zone 10, up to the point where the zone of converging diameter 11 begins, is shown as L-1; the length of the zone of converging diameter is shown as L-2; the length of the transition zone is shown as L-3; and the lengths of the steps in the reactor entry section, 18, as L-4, L-5, L-6 and L-7. D2 and D9 can be close in diameter size to each other but need not be exactly the same (e.g., D2 and D9 can have diameters that are within ±25% of each other). As an option, D2 and D9 are relatively small in diameter relative to D-1 and D-4 through D-3, because a smaller diameter can mean that the gas is flowing at high velocity through these zones to achieve effective mixing of the liquid that is injected.

To produce carbon black aggregates, hot combustion gases are generated in combustion zone 10 by contacting a liquid or gaseous fuel with a suitable oxidant stream such as air, oxygen, mixtures of air and oxygen or the like. Among the fuels suitable for use in contacting the oxidant stream in combustion zone 10 to generate the hot combustion gases are any of the readily combustible gas, vapor, or liquid streams such as natural gas, hydrogen, carbon monoxide, methane, acetylene, alcohol, or kerosene. It is generally preferred, however, to utilize fuels having a high content of carbon-containing components and in particular, hydrocarbons. When natural gas is used to produce the carbon black cores of the particles of the present invention, the volumetric ratio of air to natural gas may be from about 10:1 to about 1000:1, or from 10:1 to 100:1. To facilitate the generation of hot combustion gases, the oxidant stream may be preheated. The hot combustion gas stream flows downstream from zones 10 and 11 into zones 12, 13, 18, and 19, in this sequence. Fewer or more reaction zones can be included in the reactor after zone 13. The direction of the flow of hot combustion gases is shown in FIG. 2 by the arrow. Quench 60 can be used to arrest the chemical reaction in the reactor and is located downstream of the feedstock entry points and the reaction zone.

Carbon black-yielding feedstock 30 is introduced at a point or plurality of points indicated as points 32, 35 and 36 (located in zone 12), and/or at point 70 (located in zone 11). In the reaction zone portion 12 of the reactor, the carbon black-yielding feedstock is pyrolyzed to carbon black. Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like.

The distance from the end 15 of the zone of converging diameter 11 (in the flow direction) to points 32, 35 and 36 is shown as F-1. Generally, carbon black-yielding feedstock 30 is injected in the form of a plurality of streams which penetrate into the interior regions of the hot combustion gas stream to insure a high rate of mixing and shearing of the carbon black-yielding feedstock by the hot combustion gases so as to rapidly and completely decompose and convert the feedstock to carbon black.

Auxiliary hydrocarbon is introduced at point 70 through probe 72 and/or through auxiliary hydrocarbon passages 75 and 79 in the walls which form the boundaries of zone 12 of the carbon black forming process. In FIG. 2, introduction points 75, 36, and 79 can represent the entrances of these introduction points into reactor zone 12 at an inner wall thereof. The term "auxiliary hydrocarbon" as used herein refers to hydrogen or any hydrocarbon having a molar hydrogen-to-carbon ratio greater than the molar hydrogen-to-carbon ratio of the feedstock and may be gaseous or liquid. Exemplary hydrocarbons include but are not limited to those materials described herein as suitable for use as fuels and/or feedstocks. As an option, the auxiliary hydrocarbon is natural gas. The auxiliary hydrocarbon may be introduced at any location between the point immediately after the initial combustion reaction of the first-stage fuel and the point immediately before the end of formation of carbon black provided that unreacted auxiliary hydrocarbon eventually enters the reaction zone. The carbon black-yielding feedstock 30 can be introduced at a plurality of points, such as indicated as points 32, 35 and 36 and/or others, that can be arranged in a ring pattern that is defined around the stream of combustion gases, such as shown in FIG. 2. The number of introduction points shown is for illustration only as a larger number of carbon black-yielding feedstock introduction points may be used to define the ring pattern. The auxiliary hydrocarbon can be introduced into the stream of combustion gases at a predetermined number of points, such as points 75 and 79 and/or others, arranged in a ring pattern that can coincide with the ring pattern of carbon black yielding feedstock introduction points, such as shown in FIG. 2, or can define a ring pattern located at a different location in zone 12 from the ring pattern of carbon black-yielding feedstock introduction points (not shown). The number of introduction points of auxiliary hydrocarbon shown is for illustration only as a larger number of introduction points may be used. The carbon black-yielding feedstock introduction points and auxiliary hydrocarbon introduction points each can be intermittently located at spaced-apart positions along the ring pattern(s). When the ring patterns of the introduction points of the carbon black-yielding feedstock and auxiliary hydrocarbon coincide and form a single ring pattern, the different kinds of introduction points can alternate regularly or irregularly in the ring pattern as long as adequate mixing of the materials can be obtained in the reactor. For example, the carbon black yielding feedstock and auxiliary hydrocarbon introduction points can individually alternate around the ring pattern, or can alternate in two or more in series of each around the ring pattern, or can alternate as individuals for one type and two or more in series of the other around the ring pattern, or the alternation of types can be more random around the ring pattern. When the ring patterns of the introduction points of the carbon black-yielding feedstock and auxiliary hydrocarbon are separately located in zone 12, the different ring patterns may be spaced apart about 12 inches (about 30 cm) or less in the flow direction (i.e., the left-to-right direction in the perspective of FIG. 2) of the reactor. In the Examples described below, the auxiliary hydrocarbon was introduced through three orifices in the same ring pattern as the carbon black yielding feedstock streams. The orifices are preferably arranged in an alternating pattern, one feedstock, the next auxiliary hydrocarbon, etc., spaced evenly around the outer periphery of section 12. The quantity of auxiliary hydrocarbon added to the reactor may be adjusted so that carbon content of the auxiliary hydrocarbon is at most about 20% by weight of the total carbon content of all fuel streams injected into the reactor, for example, from about 1 to about 5%, from about 5% to about 10%, from about 10% to about 15%, from about 15% to about 20%, or in any range bounded by any of these endpoints. The carbon content of the auxiliary hydrocarbon can be from about 3% to about 6% by weight of the total carbon content of all fuel streams injected into the reactor. Without being bound by any particular theory, the use of auxiliary hydrocarbon may act to reduce the structure of the carbon particles to extremely low levels.

Substantially all, or essentially all or completely all of the introduction of carbon black-yielding feedstock into the reactor, such as at least 95 wt %, or at least 98 wt %, or at least 99 wt %, or 100 wt % of the total amount of introduced carbon black-yielding feedstock, can be completed by no later than introduction point 32. The first feedstock, in addition to a carbon black-yielding feedstock and auxiliary hydrocarbon, may further comprise additional materials or compositions which are commonly used to make conventional carbon black provided that metal/metalloid oxide forming compounds preferably are substantially, essentially, or completely excluded from feedstock introduced into zones 11 and 12, so that low structure carbon black cores can be formed that are single phase or essentially single phase carbon particles. As an option, the carbon black-yielding feedstock has a composition that is substantially free of metal/metalloid oxide-forming content (e.g., silica or others) in the carbon black aggregates. As an option, the carbon black aggregates formed can have less than 1 wt %, or from 0 to 0.1 wt %, or from 0 to 0.5 wt %, or from 0 to 0.05 wt %, or from 0 to 0.01 wt %, total metal oxide and metalloid oxide, based on the weight of the carbon black aggregates. This metal or metalloid oxide only refers to the metal or metalloid oxide that forms the mantle and does not include any metal oxide that might be present as ash from, for example, potassium oxide from the structure control salt solution injected into the carbon black yielding feedstock. Examples of compounds which can form such metal/metalloid oxides in the particles under reactor conditions are described herein with respect to the feedstock introduced at the downstream introduction location 33.

Specific alkali or alkaline earth materials can be added, as an option, to the composite particle as a structure modifier for the carbon black core in such an amount that the total concentration in the resulting carbon black of alkali or alkaline earth materials is low. Preferably, the substance contains at least one alkali metal or alkaline earth metal. The potassium ion can be added to the feedstock and eventually incorporated into the carbon black, while the total Group IA and IIA element concentration remains low. Other examples of Group IA and IIA elements that may be used include lithium, sodium, potassium, rubidium, cesium, francium, calcium, barium, or strontium, or any combination of two or more of these. The substance can be a solid, solution, dispersion, gas, or any combination thereof. More than one substance having the same or different Group IA or Group IIA element can be used. If multiple substances are used, the substances can be added together, separately, sequentially, or in different reaction locations. For purposes of the present invention, the substance can be the metal (or metal ion) itself, a compound containing one or more of these elements, including a salt containing one or more of these elements, and the like. Exemplary salts include both organic and inorganic salts, for example, salts, e.g., of sodium and/or potassium, with any of chloride, acetate, or formate, or combinations of two or more such salts. Preferably, the substance is capable of introducing a metal or metal ion into the reaction that is ongoing to form the carbon black core.

The substance having the Group IA or Group IIA element can be added at any point prior to introduction of the second (metal/metalloid containing compound) feedstock. The substance having the Group IA or Group IIA element can be added, e.g., prior to the introduction of the carbon black yielding feedstock in the first stage; during the introduction of the carbon black yielding feedstock in the first stage; or after the introduction of the carbon black yielding feedstock in the first stage and before introduction of the second (metal/metalloid containing compound) feedstock. More than one point of introduction of the substance can be used. The substance can be added at one point or several points and can be added as a single stream or a plurality of streams. The substance can be added in any fashion including any conventional means. In other words, the substance can be added in the same manner that a carbon black yielding feedstock is introduced. The substance can be added as a gas, liquid, or solid, or any combination thereof. The substance can be mixed in with the first feedstock, fuel, and/or oxidant prior to and/or during their introduction. The substance containing at least one Group IA or Group IIA element can be introduced, as an option, by incorporation of a salt solution into the carbon black-yielding feedstock. Upon combustion, the metal ions of the substance can become incorporated into the carbon black core. The amount of the metal-containing substance can be any amount as long as a carbon black core product can be formed. As an option, salt solutions can be mixed with the carbon-black yielding feedstock such that the concentration of all alkali metal and/or alkaline metal ions is between 0 to about 1 weight percent. As an option, the substance introduces a Group IA element; for example, the substance may introduce potassium or potassium ion.

With introduction of the first feedstock comprising carbon black-yielding feedstock and auxiliary hydrocarbon, carbon black aggregates are formed which are suspended in the reaction stream in transition zone 12. The reaction stream, which can be a mixture of suspended carbon black aggregates and any remaining carbon black-yielding feedstock and hot combustion gases, flows downstream through transition zone 12, then through zone 14, and into transition zone 13. Located downstream of the point where the first feedstock comprising carbon black-yielding feedstock and auxiliary hydrocarbon is introduced into the feedstock injection zone 12 of the reactor, a second feedstock 31 comprising a metal/metalloid containing compound is introduced, for example, at location 33 into the second feedstock injection zone 13. The second feedstock can enter the feedstock injection zone for instance, at entry point 77 or multiple entry points such as 77 and 78, or more entry points, which may be arranged at equidistant locations or specifically in a ring pattern around the reaction stream. As an option, diluent introduction orifices or injection devices 34 can be included at or near location 33. The second and any subsequent feedstocks are preferably added after the zone of substantial reaction of the first feedstock, which is where the earlier feedstocks will have already primarily reacted to provide well-formed carbon black aggregates.

As an option, after carbon black-yielding feed stock and auxiliary hydrocarbon are introduced as first feedstock into a stream of combustion gases at first introduction points to form a reaction stream in zone 12 in which carbon black aggregates are allowed to form in the presence of additionally added Group IA/IIA element(s), only then is a metal containing compound and/or metalloid-containing compound introduced as second feedstock into the reaction stream at a second downstream introduction point 33 to provide another transition zone 13 of the reactor. As an option, the carbon black reactor is configured such that the separation distance G-1 in the reactor between the completion of the introduction of the first feedstock at point 32 and the initial introduction of the second feedstock at point 33 is extended to be sufficient for carbon black aggregates to form that have low structure (e.g., Oil Absorption Number (OAN) of 30-50 cc/100 g), low surface area (50-90 $m^2/g$), and well-formed particle shapes (such as can be defined by roundness of greater than 0.8 or other values), before commencing introduction of a metal-containing compound and/or metalloid-containing compound into the reaction stream for coated aggregate and then composite particle formation.

As shown in the examples of the present application, the residence time between the injection points of the carbon black yielding feedstock and the metal/metalloid-containing compound feedstock can have great effect on the structure and morphology of the initially formed carbon black particles, which in turn can have great effect on the ultimate particle product. As an option, the residence time can be controlled in the present invention by increasing the spacing distance G-1, increasing the diameter D-8, or both, to provide more residence time. As an option, the introductions points 32 and 33 in the reactor for the first and second feedstocks can be separated by a distance G-1 that is sufficient to allow the carbon black aggregates to form in the reaction stream after introduction of the first feedstock and cool into a well-formed low structure particle or aggregate before reaching the introduction point 33 of the second feedstock without the separation distance being so great to permit the reaction stream temperature to fall below a value necessary to support decomposition of the second feedstock upon its introduction. In view of this, it is not desirable to use any external heating means on the transition section of the reactor that defines zone 12 beyond the introduction point 32 of first feedstock 30. The separation distance G-1 in the reactor between the first feedstock and second feedstock introduction points can be at least 150 cm, or at least 200 cm, or at least 250 cm, or at least 300 cm, or at least 350 cm, or at least 400 cm, or at least 450 cm, or at least 500 cm, or at least 600 cm, or from 150 to 600 cm, or from 200 to 575 cm, or from 250 to 550 cm, or from 300 to 525 cm, or from 350 to 525 cm, or from 400 cm to 525 cm, or from 450 to 500 cm, or other values. These separation distances between the different feedstock introduction points are much longer, such as by a factor of at least 2 times (2×), three times (3×) or more, as compared to what previously has been shown for reactor designs used to produce multi-phase silica-carbon black particles or aggregates. As shown in examples in the present application, the lack of such an extensive separation distance between the introduction points of the carbon black yielding feedstock and metal/metalloid-containing compound feedstock can have failed results. Even at the high velocity rates of the reaction stream in the carbon black reactor, it surprisingly has been found that extending a transition zone of the reactor between the introduction points of the first and second feedstocks to delay introduction of the second (metal/metalloid-containing compound) feedstock can have great effect on the structure and morphology of the initially formed carbon black particles. In turn, this effect can greatly impact the structure and/or morphology of the coated aggregates formed with the carbon black core or seed particles, and the super-aggregate built from them. As an option, the metal/metalloid-containing compound feedstock can be introduced into the reaction stream at a second injection location in the reactor which occurs at least 30 milliseconds after the introducing of the carbon black yielding feedstock into the stream of combustion gases is completed at a first injection location, wherein this residence time can be defined by the total gas volume of the flow after the first injection location and the volume of the reactor between the first and second injection locations. This residence time between the indicated first and second injection locations can be from 30 to 400 milliseconds, or from 50 to 350 milliseconds, or from 75 to 300 milliseconds, or from 100 to 250 milliseconds, or from 150 to 225 milliseconds, or other values. Without being bound by any particular theory, it is believed that the extended residence time between the first and second injection locations provides sufficient time for the carbon black primary particles to finish fusing to form low structure aggregates. After injection of the metal/metalloid-containing compound, the oxide shell forms on the outside of the aggregate and cluster by fusion of the oxide shells as described below.

The second feedstock portion containing the metal/metalloid-containing compound undergoes volatilization and decomposes, and preferably reacts with other species in the reaction zone and forms a metal/metalloid-containing species mantle, such as a metal/metalloid oxide mantle. The presence of the metal/metalloid-containing compound in the second transition zone 13 of the reactor leads to the coated aggregate comprising a carbon phase core and a metal/metalloid-containing species mantle, such as metal/metalloid oxide mantle. The metal/metalloid-containing species are an intrinsic part of the mantle of the coated aggregate and are part of the super-aggregate structure.

Coated aggregates that are formed in the reactor, such as in zone 13 or later reaction zones, are suspended in the reaction stream and carried downstream through reactor zones 18 and 19. These reactor zones have sufficient length before the reaction stream reaches quench 60 to allow pluralities of the coated aggregates to cluster and unite into a discrete larger aggregate particle by thermal fusion and/or condensation under the reactor conditions to form a composite particle of the present invention. The individual coated aggregates can have an average size of from 12 to 250 nm, or from 17 to 200 nm, or from 25 to 125 nm, or other values. As indicated, the composite particles can have an average size of from 35 to 500 nm, or from 50 to 400 nm, or from 75 to 250 nm, or other values.

The second feedstock comprises decomposable and/or volatizable metal/metalloid-containing compounds. The second feedstock preferably contains very limited or no amount of carbon black-yielding feedstock. The second feedstock preferably has a composition that has less than 1 wt %, or from 0 to 0.1 wt %, or from 0 to 0.5 wt %, or from 0 to 0.05 wt %, or from 0 to 0.01 wt %, total carbon black-yielding feedstock. The presence of carbon black-yielding feedstock in the second stage of the reaction can disrupt or interfere with the desired metal/metalloid oxide mantle formation on the particles or have other undesired effects.

As an option, a coated aggregate part of the composite particle of the present invention comprising an aggregate core that is a low structure carbon core, and a metalloid-containing species mantle, can be made using the multi-stage reactor, wherein the reactor includes the two distantly spaced-apart stages for introducing the different first and second feedstocks into the reactor. The metalloid-containing species can be silica, or other metalloid oxides. The metalloid-containing species can be entirely or essentially entirely (>99 wt %) metalloid oxide, such as all silica.

The metalloid-containing compound that can be used in the second feedstock (e.g., that can be introduced at location 33) can comprise volatizable or decomposable compounds of silicon, boron, germanium, or any combinations thereof. Useful silicon-containing compounds include any such compound which is volatilizable or decomposable at carbon black reactor temperatures. Non-limiting examples of suitable silicon-containing compounds include tetraethoxyorthosilicate (TEOS), silanes (such as alkoxysilanes, alkylalkoxysilanes, and aryl-alkylalkoxysilanes), silicone oil, polysiloxanes and cyclic polysiloxanes (such as octamethylcyclotetrasiloxane (OMTS), decamethylcyclopentasiloxane, dodecamethylcyclohexasiloxane, and hexamethylcyclotrisiloxane), and silazanes (such as hexamethyldisilazane). Examples of suitable silanes include tetramethoxysilane, tetraethoxysilane, methyltrimethoxysilane, methyltriethoxysilane, dimethyldimethoxysilane, dimethyldiethoxysilane, trimethylmethoxysilane, trimethylmethoxysilane, diethylpropylethoxysilane, and halogen-organosilanes such as, for example, tetrachlorosilane, trichloromethylsilane, dimethyldichlorosilane, trimethylchlorosilane, methylethyldichlorosilane, dimethylethylchlorosilane, and dimethylethylbromosilane. As an option, decomposable silicon-containing compounds which are not necessarily volatilizable can be used. Other suitable silicon-containing compounds that can be used to yield the silica-treated carbon black include cyclic polysiloxanes of the types D3, D4, and D5, and polysiloxanes or silicone oils, many of which are well known in the art. The usefulness of these compounds can be readily determined by their volatilizability and/or decomposability. Low molecular weight silicon-containing compounds are preferred. Useful boron and germanium-containing compounds may be alkyl borates, such as trimethyl or triethyl borate; boranes, such as diborane ($B_2H_6$); and germanes, such as $GeH_4$. The usefulness of these compounds can be readily determined for their volatilizability and/or decomposability. Low molecular weight silicon-containing compounds are preferred. The flow rate of the volatilizable/decomposable metalloid-containing compound will determine the weight percent of the metalloid compound in the coated aggregate (and the composite particle). The weight percent of silicon or other metalloid in the coated aggregate (and composite particle) preferably ranges from about 1% to about 30%, and more preferably from about 2.5% to about 20%, and most preferably from about 4% to about 15% by weight or from about 8% to about 12% by weight of the coated aggregate (and composite particle). From an economical point of view, the use of less silicon or other metalloid is preferable to the extent that it reduces the cost to make the aggregate, provided acceptable performance characteristics are achieved.

Generally, since the metalloid-containing compound is introduced to the reaction zone at a point after carbon black formation is well-progressed, but before the reaction stream has cooled below a decomposition/volatization temperature of the metalloid-containing compound or has been subjected to the quench, the metalloid-containing species material is present primarily at or near the surface of the coated aggregate but is still part of the same aggregate as the carbon core. The metalloid-containing species can be provided in highly controllable surface coverage rates on the coated aggregates, and thus the composite particles, of the present invention.

The second feedstock, as an option, can include diluent, such as an alcohol. The diluent should be volatilizable and/or decomposable since it will be preferably injected into the reactor along with the metal/metalloid-containing compound. If used, the diluent can be premixed with the decomposable and/or volatizable metalloid-containing compounds before injection into the reactor or these components can be separately injected into the reactor at the same reactor location. The diluent can comprise a lower alcohol or mixtures thereof, such as C2-C4 alcohols (e.g., isopropanol), or others. The diluent can comprise a liquid and/or a gas and is preferably miscible with the metalloid-containing compounds though this is not necessary. Further examples of diluents are water and aqueous based solutions. The diluent can be present in any amount and is preferably present in amounts which will increase the mass flow rate of the second feedstock and/or lower the temperature of the reactor at about the point of introduction of the second feedstock. The diluent can also be included in feedstocks which do not contain any metalloid-containing compound, or can be introduced in a separate stage.

As an option, a coated aggregate part of the composite particle comprising an aggregate core that is a low carbon core and a metal-containing species mantle can be made using the multi-stage reactor in FIG. 2, wherein the reactor includes the two distantly spaced-apart stages for introducing the different first and second feedstocks into the reactor. As an option, the metal-containing species include compounds containing aluminum, zinc, magnesium, calcium, titanium, vanadium, cobalt, nickel, zirconium, tin, antimony, chromium, neodymium, lead, tellurium, barium, cesium, iron, molybdenum, or any combinations thereof. The metal-containing species include, but are not limited to, oxides of metals. The metal-containing species can be entirely or essentially entirely (>99 wt %) metal oxide.

Useful metal-containing compounds include any metal-containing compound which is volatilizable or decomposable at carbon black reactor temperatures. Examples include volatilizable or decomposable compounds containing aluminum, zinc, magnesium, calcium, titanium, vanadium, cobalt, nickel, zirconium, tin, antimony, chromium, neodymium, lead, tellurium, barium, cesium, iron, and molybdenum. Specific examples include, but are not limited to, butoxides such as Aluminum III n-Butoxide and Aluminum III s-Butoxide, and propoxides, such as Al III iso-propoxide. Examples of suitable zinc-containing compounds include, but are not limited to, zinc napthenate and zinc octoate. Other examples include, but are not limited to, magnesium ethoxide, magnesium isopropoxide, calcium propoxide, titanium isopropoxide, cobaltous napthenate, tin diethyl oxide, neodymium oxalate, and the like. The flow rate of the volatilizable compound will determine the weight percent of metal in the coated aggregate (and the composite particle). The weight percent of the elemental metal (e.g., elemental aluminum or zinc) in the coated aggregate and composite particle generally ranges from about 0.1% to 25%, by weight of the coated aggregate or composite particle, by may be adjusted to any desired level, such as up to 50% by weight, greater than 50% by weight, or up to 99% by weight of the coated aggregate or composite particle.

As an option, additional feedstocks can be introduced into the reactor by additional entry points which can be located upstream and/or downstream of the second entry point for the second feedstock, such as through passages 76 in the walls which form the boundaries of zones 18 and/or 19 of the composite particle forming process, or other locations in the reactor, provided that the additional feedstock does not interfere with or disrupt the low structure carbon black core-formation in zone 12 or downstream core aggregate and composite particle formations in zones 13, 18, and 19. As with the first feedstock, any additional feedstock introduced upstream from second feedstock preferably contains no or very little metal/metalloid oxide forming compounds. As with the second feedstock, any additional feedstock introduced downstream from the second feedstock preferably has a composition that has no or very limited carbon black-yielding feedstock content such as less than 1 wt %, or from 0 to 0.1 wt %, or from 0 to 0.5 wt %, or from 0 to 0.05 wt %, or from 0 to 0.01 wt %, or 0 wt % total carbon black-yielding feedstock.

At quench 60, located at point 62 of the reactor, injecting quenching fluid 50, which may be water, can be utilized to stop the chemical reaction after the composite particles are formed in the reactor. Quench point 62 may be determined in any manner known to the art for selecting the position of a quench to stop pyrolysis. One method for determining the position of the quench to stop pyrolysis is by determining the point at which an acceptable Spectronic 20 value for carbon black is reached. Q is the distance from the beginning of zone 18 to quench point 62, and will vary according to the position of quench 60.

After the composite particles are quenched in the reactor, the cooled gases and the composite particles can pass downstream into any conventional cooling and separating means whereby the composite particles and any coproduced carbon black and/or silica (or other side-product) are recovered. The separation of the composite particles from the gas stream can be readily accomplished by conventional means such as a precipitator, cyclone separator, bag filter, or other means known to those skilled in the art. After the composite particles have been separated from the gas stream, they are optionally subjected to a pelletization step. In general, the composite particles of the present invention can be used either in nonagglomerated form, i.e., fluffy, or in agglomerated form. The composite particles may be formed into pellets, wherein the pellets can be used in coatings and devices such as described herein. Generally known techniques or others for pelletizing carbon black can be applied to make the pellets.

As an option, the composite particles may be modified, as an option, before or after any pelletization, to attach a coupling agent and/or an organic group to the surface or to oxidize the surface. Modifications directed at the carbon black portion of the composite particle will be more efficient for composite particles having low levels of silica coverage, e.g., up to 50-60% coverage. Suitable oxidizing agents include, but are not limited to, nitric acid and ozone. Coupling agents which may be used with the oxidized carbon blacks include coupling agents such as those set forth in incorporated U.S. Pat. No. 6,057,387. The composite particle of the present invention may have an organic group attached. One process for attaching an organic group to the composite particle can involve the reaction of at least one diazonium salt with the composite particle. Processes using diazonium chemistries which can be used for attaching an organic group or groups to the composite particle can include those shown for attaching an organic group to an aggregate in the incorporated U.S. Pat. Nos. 6,057,387 and 9,267,048 B2.

Alternatively or in addition, the composite particles may be treated with a silica coupling agent or other silica modifying or hydrophobizing agent. Such an agent may be covalently or non-covalently attached to the composite particles. The agent may be applied to the composite particles in the gas or liquid phase. Exemplary hydrophibizing agents include silicone fluids. Non-limiting examples of useful silicone fluids include polydimethylsiloxanes, polydiethylsiloxanes, phenylmethylsiloxane copolymers, fluoroalkylsiloxane copolymers, diphenyl siloxane-dimethylsiloxane copolymers, phenylmethyl siloxane-dimethyl siloxane copolymers, phenylmethylsiloxane-diphenylsiloxane copolymers, methylhydrosiloxane-dimethylsiloxane copolymers, polyalkylene oxide modified silicones, cyclic polysiloxanes of the D3, D4, and D5 types, and the like. Modified silicone fluids, such as hydroxyl-terminated siloxanes, may be used as well.

Alternatively or in addition, the silica modifying agent comprises a hydrophobizing silane. For example, the hydrophobizing silane can be a compound of the formula: $R^3_{4-n}SiX_n$ wherein n is 1-3, each $R^3$ is independently selected from the group consisting of hydrogen, a $C_1$-$C_{18}$ alkyl group, a $C_3$-$C_{18}$ haloalkyl group, and a $C_6$-$C_{14}$ aromatic group, and each X is independently a $C_1$-$C_{18}$ alkoxy group or halo.

Alternatively or in addition, the silica modifying agent comprises a silazane. For example, the hydrophobizing agent can be hexamethyldisilazane, octamethyltrisilazane, a cyclic silazane, and the like. In certain embodiments, the silica modifying agent comprises a charge modifying agent such as one or more of those disclosed in U.S. Patent Application Publication 2010/0009280, the contents of which are incorporated herein by reference. Alternatively, or in addition, the dimethylsiloxane co-polymers disclosed in U.S. Patent Application Publication 2011/0244382 A1, the contents of which are incorporated herein by reference, may be used to treat the composite particles.

Alternatively or in addition, a silica coupling agent may be used. The coupling agent can be or include one or more silane coupling agents, one or more zirconate coupling agents, one or more titanate coupling agents, one or more nitro coupling agents, or any combination thereof. The coupling agent can be or include bis(3-triethoxysilylpropyl) tetrasulfane (e.g., Si 69 from Evonik Industries, Struktol SCA98 from Struktol Company), bis(3-triethoxysilylpropyl) disulfane (e.g., Si 75 and Si 266 from Evonik Industries, Struktol SCA985 from Struktol Company), 3-thiocyanato-propyl-triethoxy silane (e.g., Si 264 from Evonik Industries), gamma-mercaptopropyl-trimethoxy silane (e.g., VP Si 163 from Evonik Industries, Struktol SCA989 from Struktol Company), gamma-mercaptopropyl-triethoxy silane (e.g., VP Si 263 from Evonik Industries), zirconium dineoalkanolatodi(3-mercapto) propionato-O, N,N'-bis(2-methyl-2-nitropropyl)-1,6-diaminohexane, S-(3-(triethoxysilyl)propyl) octanethioate (e.g., NXT coupling agent from Momentive, Friendly, W. Va.), and/or other silica coupling agents known to those of skill in the art. Appropriate coupling agents can increase the compatibility of the composite particles with a polymer matrix, enhance coating adhesion to the substrate, and improve the development properties of photoresists. Alternatively or in addition, including coupling agents in the polymer matrix can improve the compatibility of a photoresist with both the composite particles and glass substrates.

Figure 3:
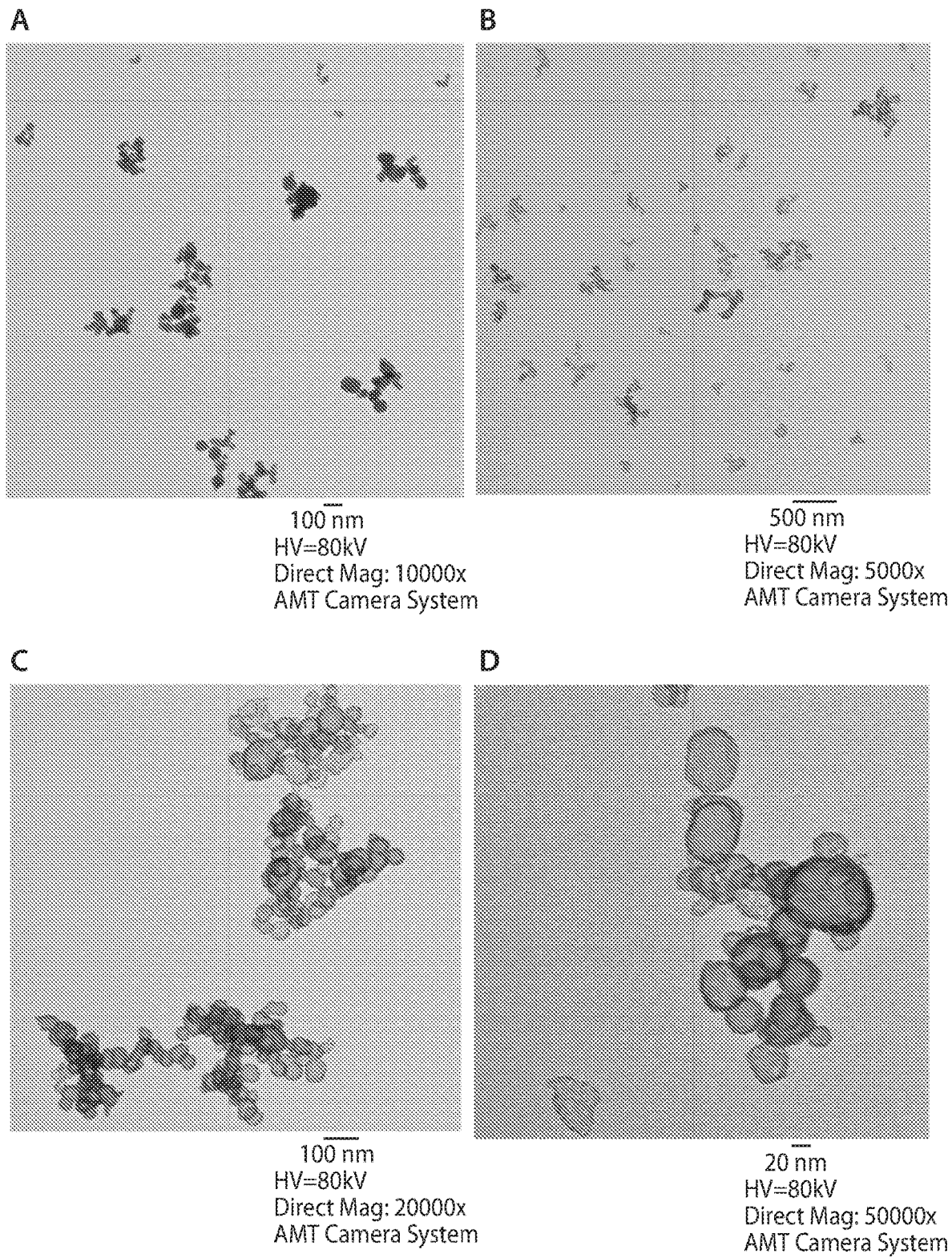
Figure 4:
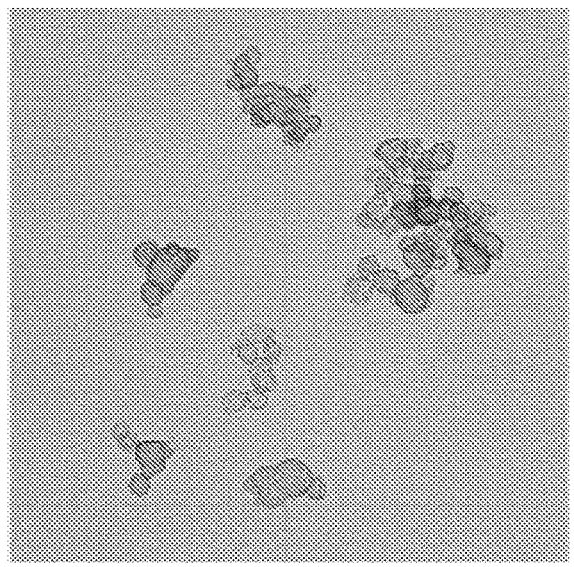
FIGS. 4A-4C are TEM images for composite particles according to the present invention with various levels (FIG. 4A: 60%, FIG. 4B: 80%, and FIG. 4C: 90%) of silica coverage following ashing (scale bar=100 nm).
Figure 4:
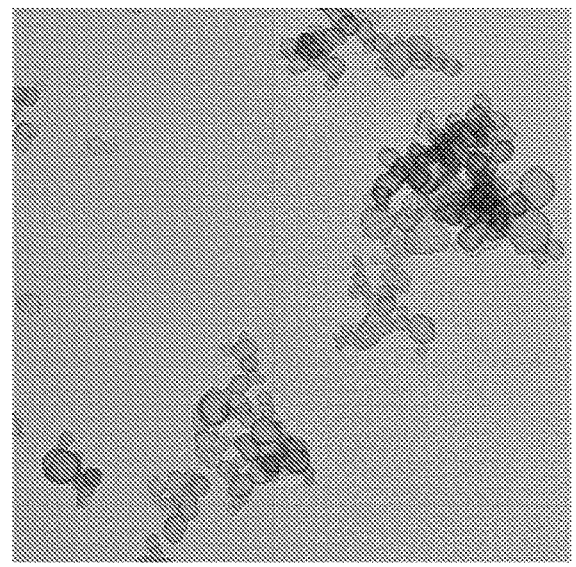
Figure 4:
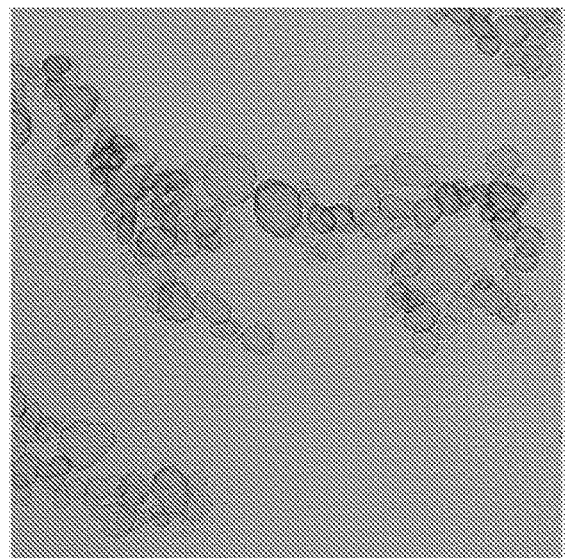

As indicated, the different structure of the composites particles of the present invention can be observed and confirmed by examination with electron microscopy. FIGS. 3A-3D and 4A-4C show composite particles of the present invention at varying silica surface coverage percentages, as made and as ashed, which were made by a method and using a reactor arrangement as described with reference to FIG. 2 and examples described herein. The composite particles of the present invention were a super-aggregate of coated aggregates having a carbon core and silica mantles. Specifically, FIGS. 3A-3D are TEM images for composite particles with 80% silica surface coverage, wherein FIG. 3A shows a material as made and FIGS. 3B-3D show ashed samples at various magnifications. FIGS. 4A-4C are TEM images for the ashed composite particles with various levels of silica coverage, wherein FIG. 4A shows 60%, FIG. 4B shows 80%, and FIG. 4C shows 90%. As shown in these images, the overall particles are discrete aggregates of constituent coated aggregates that are well-formed and regular in shapes.

Figure 5A:
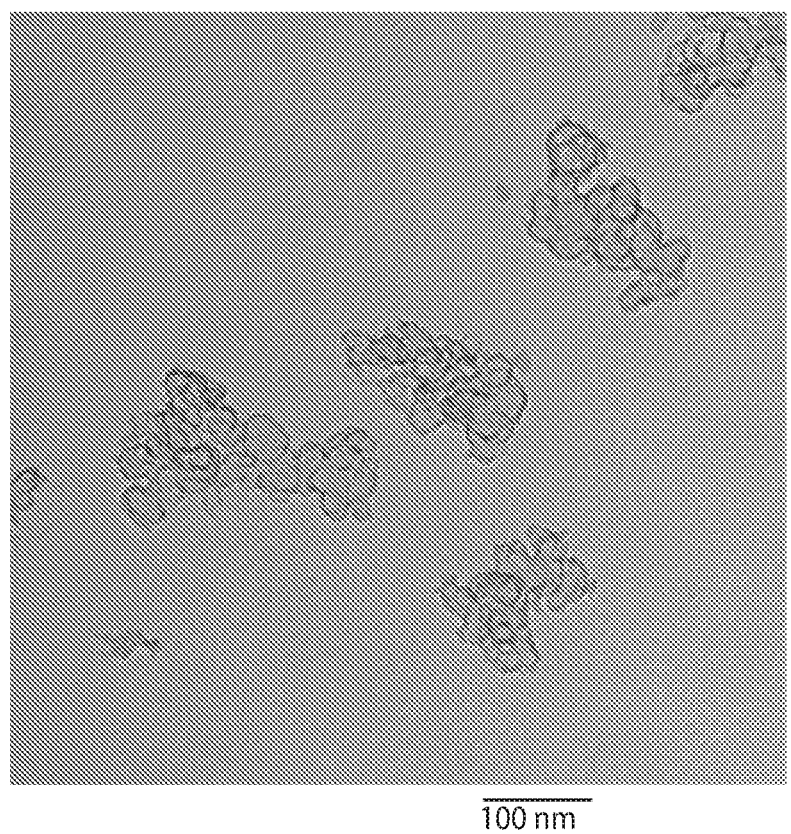
FIGS. 5A-5B show a comparison of TEM images for ashed samples, wherein the ashed sample in FIG. 5A is a comparison dual phase filler derived from a high structure carbon black core with 90% silica coverage (scale bar=100 nm), and the ashed sample in FIG. 5B is derived from composite particles that were super-aggregates of coated aggregates that have an aggregate core that is a low structure carbon black and silica mantles providing 87% silica coverage according to an example of the present application (scale bar=100 nm).
Figure 5B:
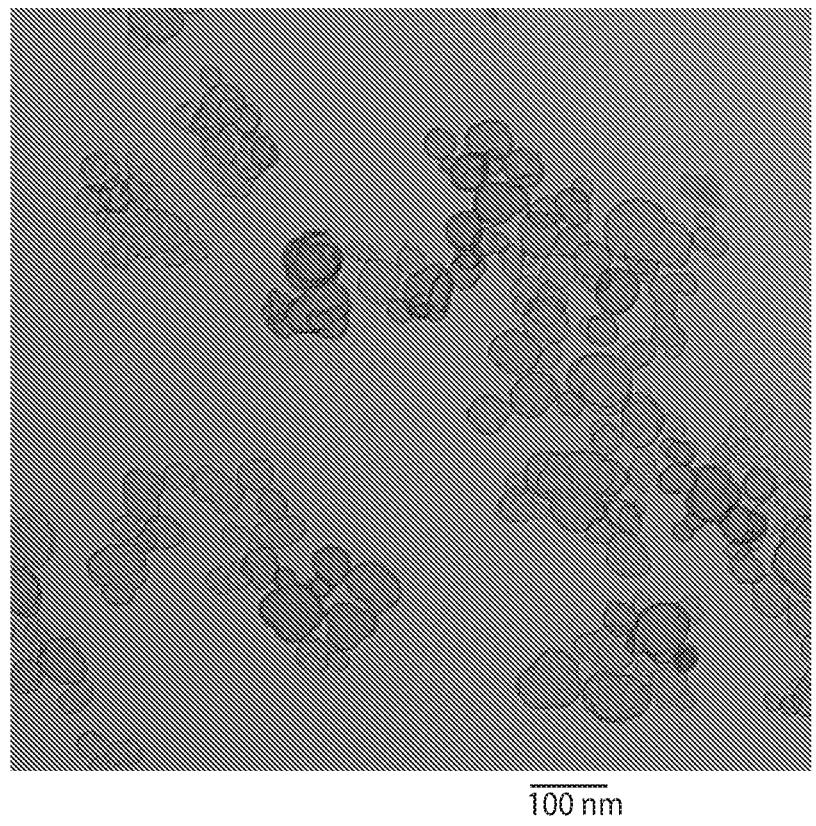
Figure 6:
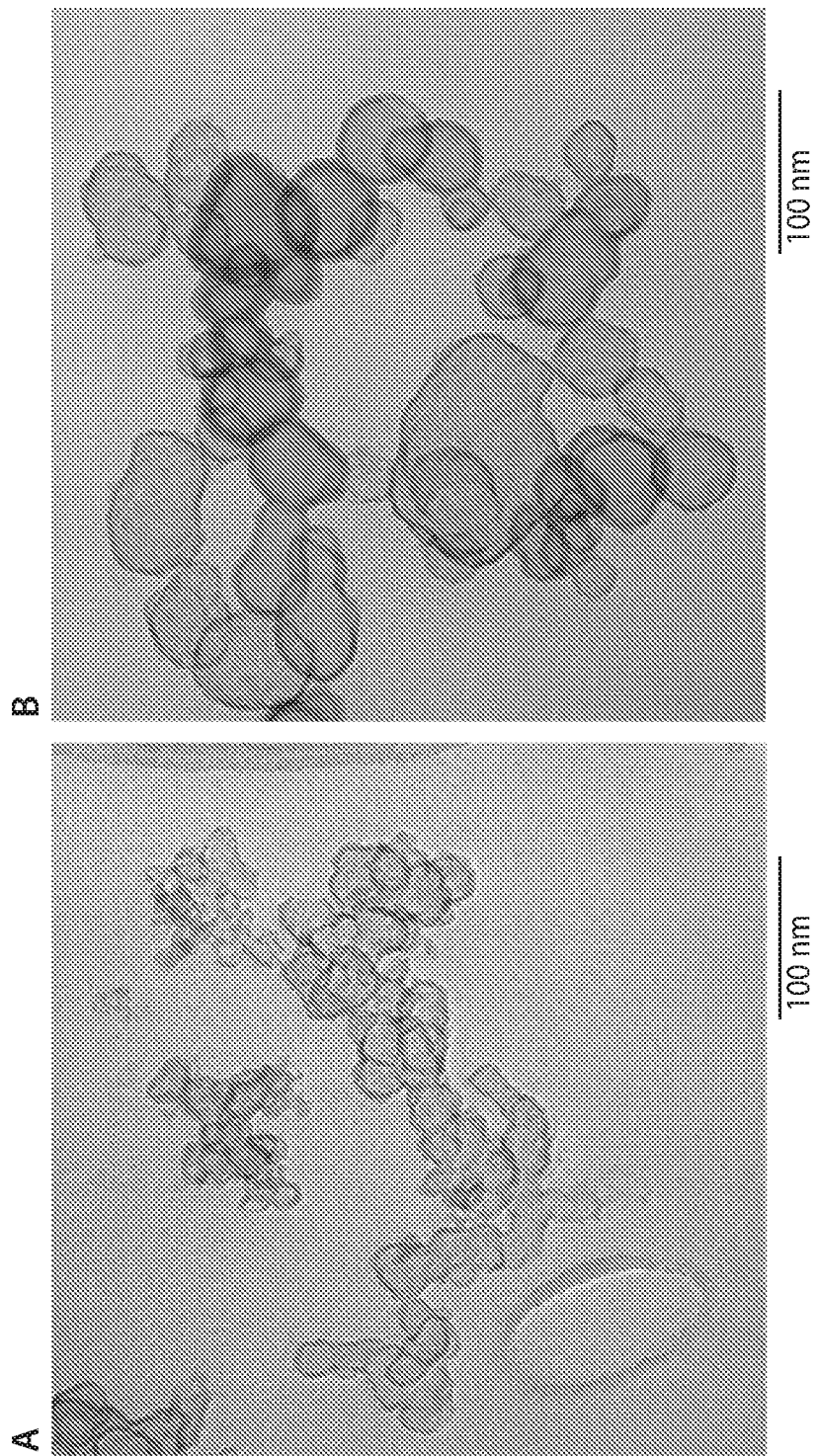
FIGS. 6A-6B show higher magnification TEM images (magnified, scale bars=100 nm) for the ashed samples of FIGS. 5A-5B, respectively.

FIGS. 5A-5B and 6A-6B show side-by-side comparisons of ashed samples of high structure dual phase filler with 90% silica coverage, such as made according to WO 2012/082484 in FIG. 5A (derived from Sample H with 90% coverage) and FIG. 6A (higher magnification of FIG. 5A), and ultra-low carbon structure core-shell composite particles with 87% silica coverage (FIGS. 5B and 6B) made using a method according to the present invention as described for Example A7 and its product Sample 7 described in Table 4 in the examples section herein. Distinct borders can be observed between nearly spherical mantles in the case of samples of the present invention shown in FIG. 5B and FIG. 6B (higher magnification of FIG. 5A), and there is lack of such distinct borders in the comparison samples shown in FIGS. 5A and 6A, even though both ashed materials were derived from samples with identical silica surface coverage.

Figure 7:
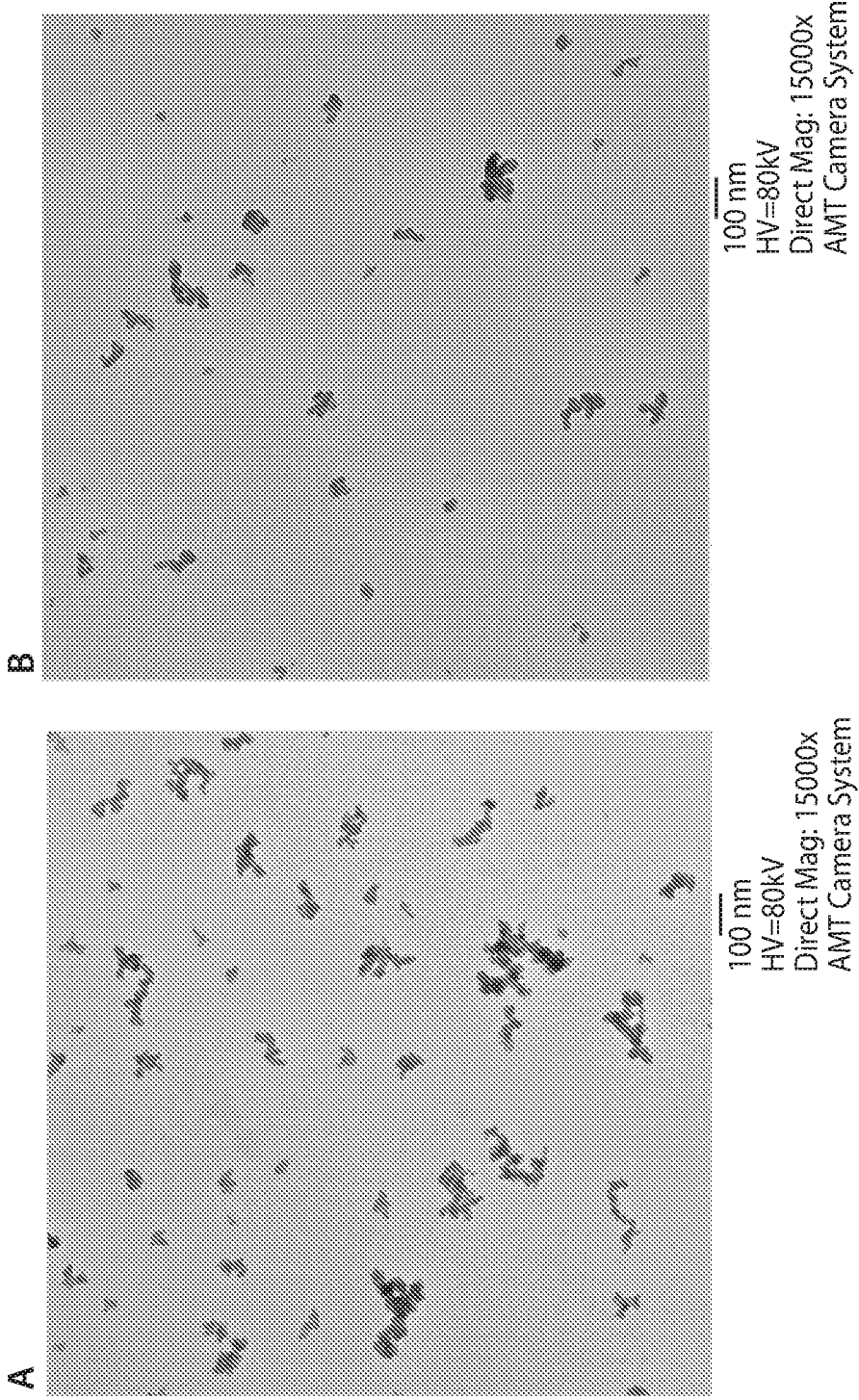
FIGS. 7A-7B show representative TEM images for several different dual phase silica-carbon hybrid particles made by comparison methods, after HF treatment of the particles to remove silica (scale bars=100 nm).
Figure 8:
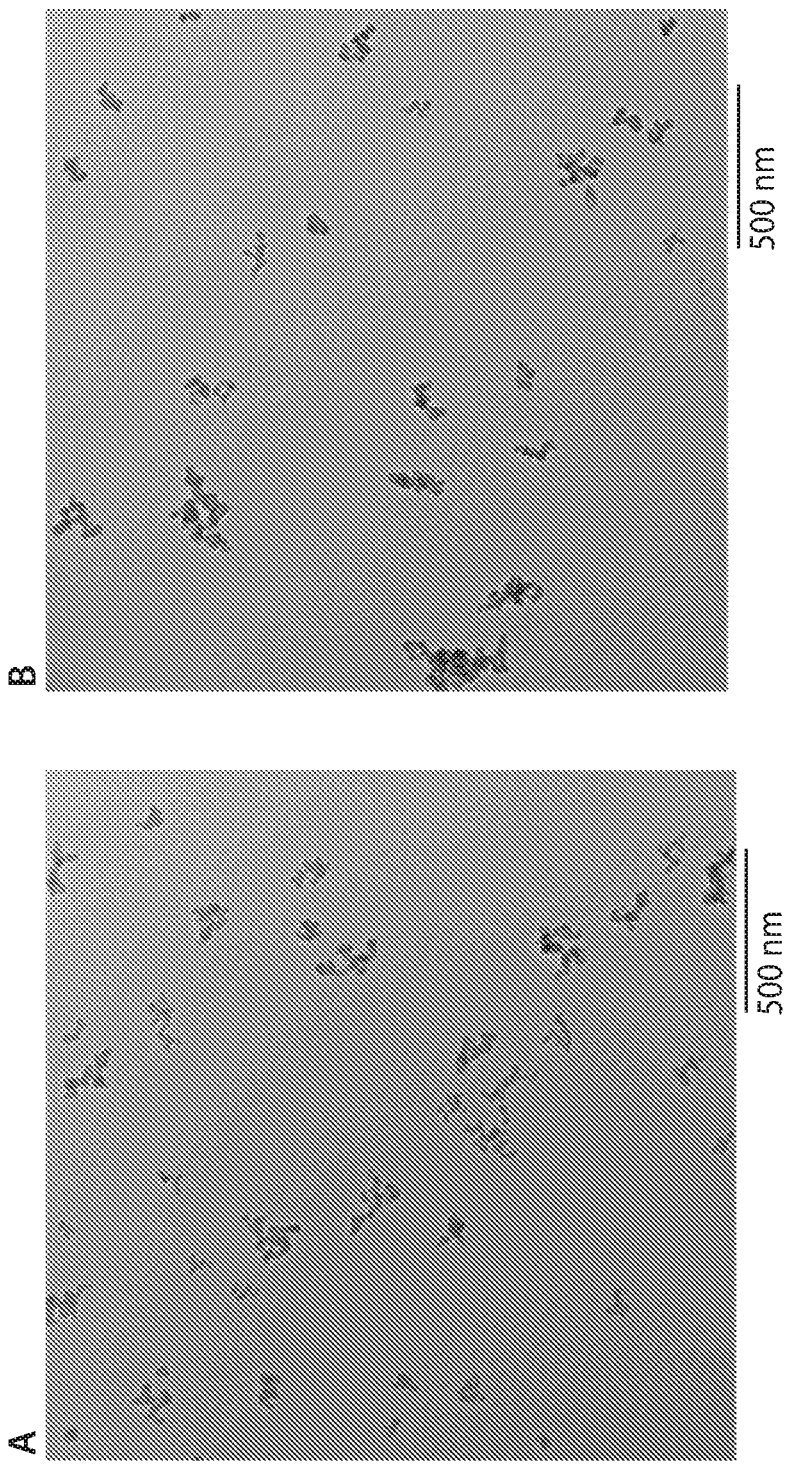
FIGS. 8A-B are TEM images of the samples shown in FIGS. 7A-7B prior to HF treatment (scale bars=500 nm).
Figure 9:
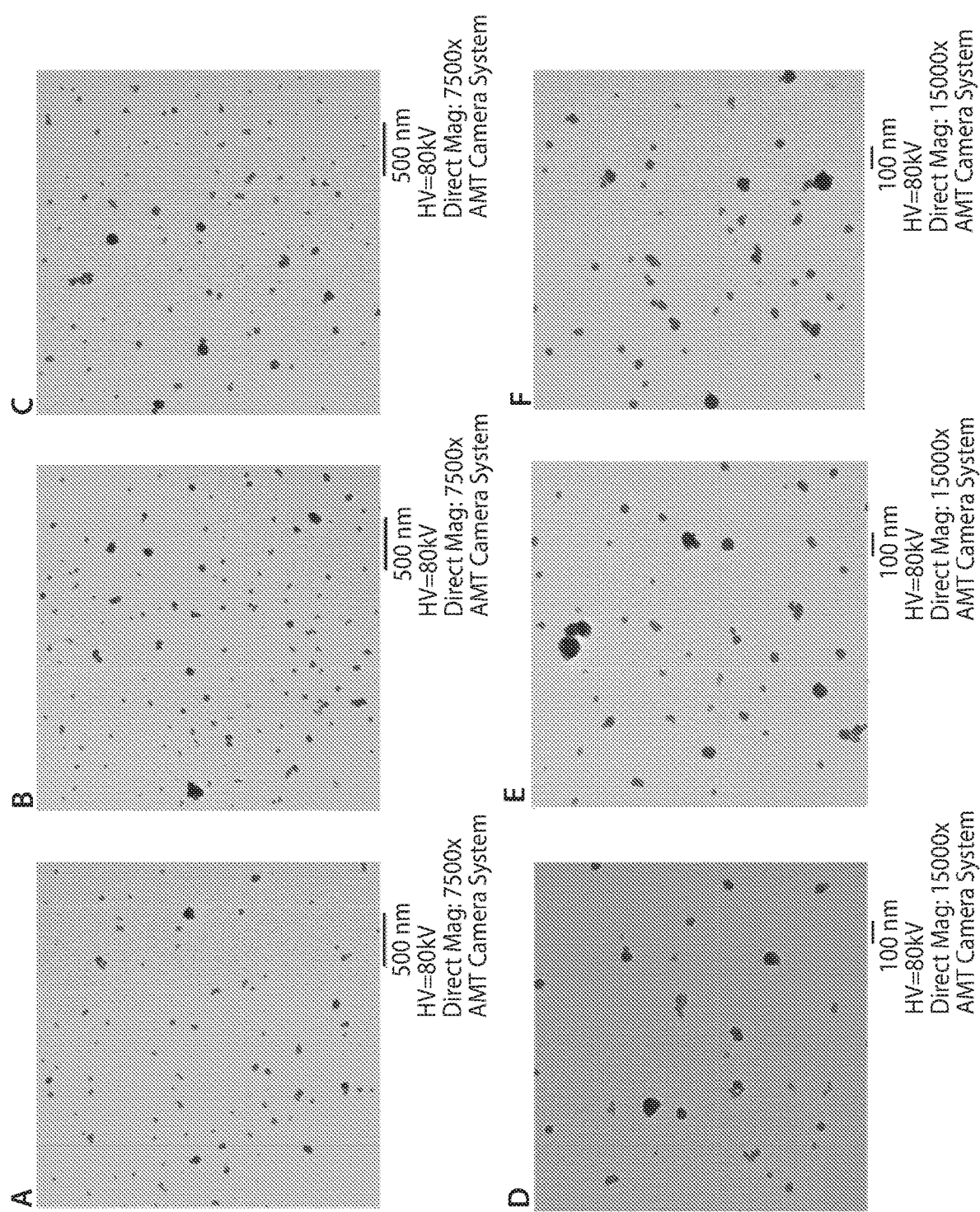
FIGS. 9A-9F are representative TEM images of composite particles according to an example of the present application after removal of silica by HF treatment at low and higher magnifications (scale bars=100 nm). The particles in FIGS. 9A and 9D were derived from particles with 30% silica coverage, the particles in FIGS. 9B and 9E were derived from particles with 60% silica coverage, and the particles in FIGS. 9C and 9F were derived from particles with 80% silica coverage.

FIGS. 7A-7B and 8A-B show TEM images of comparison dual silica-carbon particles wherein FIGS. 7A and 8A are derived from CRX4210 silica-carbon black dual phase filler, available from Cabot Corporation, and FIGS. 7B and 8B are derived from the lowest structure dual phase particles (OAN=70 mL/g) disclosed in WO 2014/0165151 ("Sample P"), after removing the silica from the filler with carbon regions remaining (FIGS. 7A and 7B) and before removing the silica from filler (FIGS. 8A and 8B). The silica was removed from the dual phase particles by treatment with HF and extensive washing prior to TEM imaging. The highly aggregated structure and high irregularity of the shapes of these comparison aggregates can be observed in these figures.

FIGS. 9A-9F show TEM images at low and high magnifications of carbon cores of composite particles of several different silica coverages made according to a method of the present invention after removal of silica by HF treatment. The samples shown in FIGS. 9A and 9D were derived from 30% silica coverage composite particles; the samples of FIGS. 9B and 9E were derived from composite particles with 60% surface silica coverage; and the samples of FIGS. 9C and 9F were derived from composite particles with 80% surface silica coverage. As can be observed in these images, the carbon cores in the composite particles of the present invention retained well-formed regular shapes. This indicates that the original low structure of the carbon black cores was also well-preserved.

Figure 10:
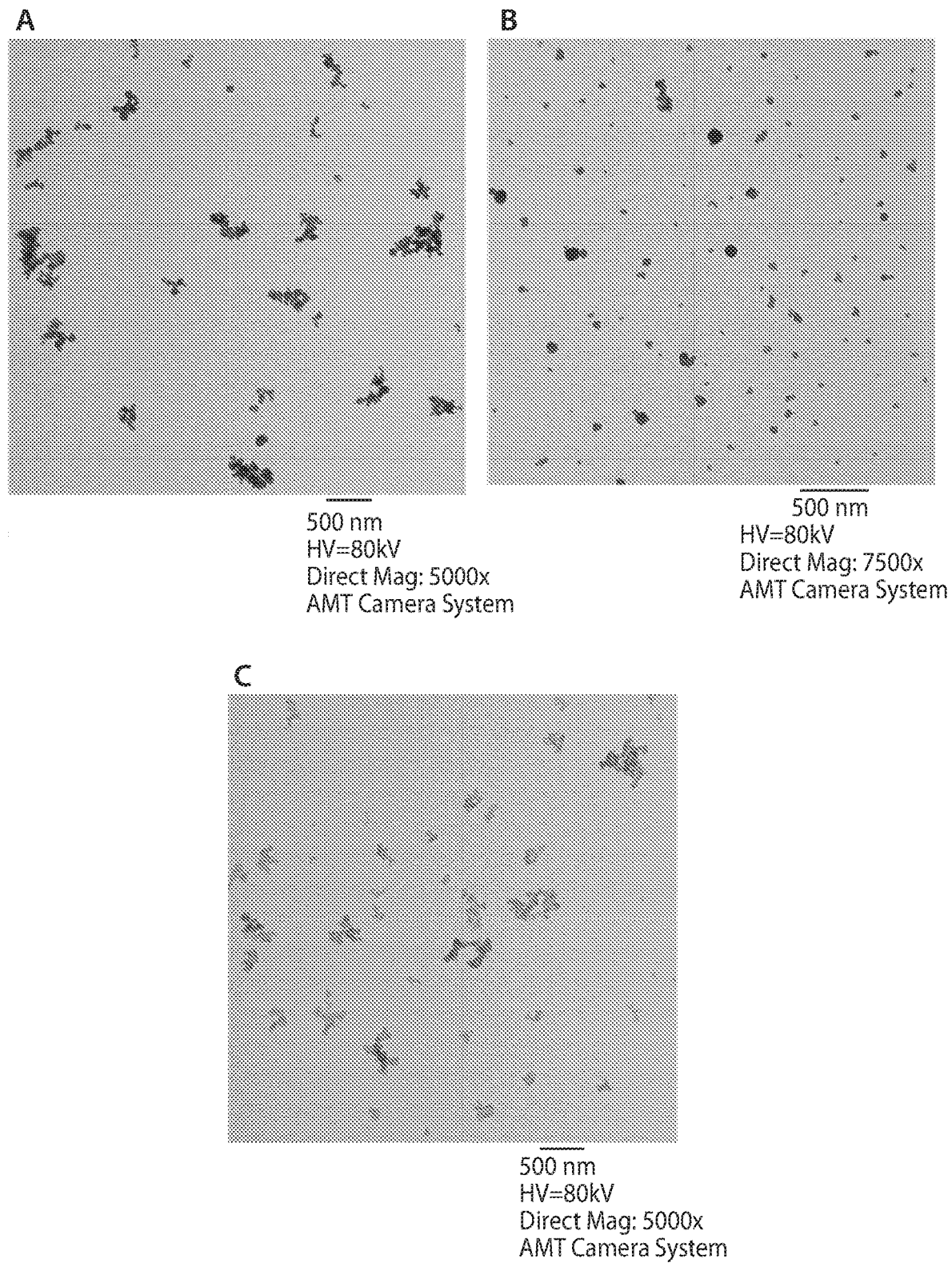
FIG. 10A shows composite particles that are "super-aggregates" of coated aggregates that have aggregate cores that are ultra-low structure carbon black and metal/metalloid oxide mantles, according to an example of the present application.
FIG. 10B shows a demonstration of disintegration of the "super-aggregate" structure upon exposure to HF in water.
FIG. 10C shows preservation of "super-aggregate" structure of the remaining ash upon removal of carbon by ashing the super-aggregates at 550° C. in air.

FIG. 10A shows composite particles of the present invention as "super-aggregates" of coated aggregates that have aggregate cores that are ultra-low structure carbon cores and metal/metalloid oxide mantles, and FIG. 10B shows a demonstration of disintegration of the "super-aggregate" structure upon exposure to HF. FIG. 10C shows the preservation of "super-aggregate" structure of the remaining ash upon removal of carbon by ashing at 550° C. These TEM images show the very different structure and characteristics of the composite particles of the present invention as compared to several comparison dual phase filler materials made by other methods and reactor arrangements. The unique structure of the composite particles may reduce the viscosity of resin formulations, allowing the production of coatings with increased surface smoothness. This in turn permits the coatings to be thinner without risking pinholes and other defects. When used in photoresists, the composite particles may also enable the formation of higher resolution features or thinner walls during photolithographic processes.

The invention further provides a population or collection of (e.g., a composition comprising, consisting essentially of, or consisting of) of the composite particles, or pellets or other particulates formed therefrom. The population or collection of, or the composition, can comprise any suitable number of the composite particles. The population, collection, or composition can comprise about 2000 or more, or about 5000 or more, or about 10,000 or more of the composite particles, or other numbers thereof. The population, collection, or composition also can comprise about 1 g or more, or about 10 g or more, or about 100 g or more, or about 1 kg or more of the composite particles, or other amounts thereof. The population, collection, or composition can be in a dry, wet or dispersed form by itself or in combination with other materials. As an option, the population, collection, or composition can be in a flowable dry particle form.

The composite particles made in accordance with the process of the present invention can be incorporated into filler-polymer compositions, inks, dispersions, and elastomeric compounds, and other compositions and products. For example, the composite particles may be incorporated into inks for electrostatic printing or other inkjet printing methods. In general, in inkjet printing, ink is ejected from a nozzle under the influence of e.g., a piezeoelectric element or a heater. In electrostatic printing, an electric field is generated to cause ejection of the ink away from the printhead and towards a recording substrate.

As indicated, the composite particle can be used as a filler in polymer compositions used in curable coatings, radiation or thermally-curable coatings, cured coatings or films, black matrices, black column spacers and other light shielding elements in LCDs and other displays, or in inks, and other applications where high resistivity in combination with good optical, dielectric, processability, and/or other property is desired.

The composite particle filler-polymer compositions can be used to make composites, such as in the forms of layers, coatings or films, with high electrical resistivity that are used in making black matrices, black column spacers or other light shielding elements in an LCD or other display. A black matrix, black column spacer, or other light shielding elements can be prepared, for example, with a coating film containing the composite particle and polymer, wherein the composite particle has good thermal stability when exposed at elevated temperature (e.g., a baking step). The good thermal stability of the composite particle (that provide electrical and color functions in black matrix, black column spacer or other light shielding elements in LCDs and other displays) is very useful, particularly where more aggressive baking conditions or several temperature cycles are used. Since the black matrix layer, black column spacer or other light shielding coating element is loaded with particles, even small changes in their surface composition during baking step(s) can lead to the variability in resistivity performance.

A robust manufacturing process for preparing curable or radiation or thermally-curable coatings, cured coatings or films, black matrices, black column spacers or other light shielding elements in a LCD or other display can be provided using filler-polymer compositions containing the composite particle of the present application. The present invention also relates to color filters on arrays having these black matrices, and liquid crystal displays including these color filters on arrays. Processing steps used to provide other components in these devices that may expose the black matrix, black column spacer or other light shielding elements in a LCD or other display to additional heating can be better tolerated as a result of the composite particles in the photoresist.

A black matrix, black column spacer or light shielding elements in a LCD or other display of the present application can be provided as a patterned thin film of the filler-polymer composition on a substrate of a liquid crystal or other color display device. A patterned, thin film form of the filler-polymer composition as present in a black matrix, black column spacer or other light shielding elements in a LCD or other display can be formed, for example, from a filler-polymer composition in a coatable and curable dispersion form. A coatable and curable dispersion form of the composition can further contain a vehicle, such as a volatizable liquid solvent, in addition to the filler and polymer. Optionally, a dispersing aid can be present to facilitate the dispersion of filler into the formulation. The polymer can be a heat, radiation, and/or catalytically curable polymer, such as a curable acrylic-based resin or other curable resins.

The present invention further relates to a Color Filter on Array (COA) which includes the black matrix. COA can be used to make a LCD or other display with better aperture ratio and more energy efficiency. The COA design includes the black matrix, which can be directly coated on a thin film transistor (TFT). The COA-TFT configuration necessitates materials for the black matrix that show low dielectric constant and high electrical resistivity to prevent capacitive interference and signal delays in LCDs and other displays. In view of these considerations, low dielectric constant and highly resistive particles that provide good optical density for use in black matrices are desired which can be provided by the composite particles of the present invention as used in filler-polymer compositions.

The present invention further relates to a method of forming a cured or radiation or thermally-cured coating, black matrix, black column spacer or other light shielding elements in an LCD or other display by applying a curable coating composition containing the composite particle filler, a curable polymer and a vehicle onto a substrate to form a curable coating, curing the curable coating imagewise to form a cured coating, and developing and drying the cured coating.

Curable coating forms of the indicated filler-polymer composition used for forming a black matrix can comprise, for example, a volatizable vehicle, a curable polymer, and the composite particle. The vehicle may be either an aqueous vehicle or a non-aqueous vehicle. While both aqueous and non-aqueous liquid vehicles can be used, the liquid vehicle can preferably be a non-aqueous vehicle for some uses. Examples include non-aqueous vehicles comprising butyl acetate, ethylcellosolve, ethylcellosolve acetate, butylcellosolve, butylcellosolve acetate, ethylcarbitol, ethylcarbitol acetate, diethyleneglycol, cyclohexanone, propyleneglycol monomethylether, propyleneglycol monomethylether acetate, lactate esters, dimethyl formamide, methyl ethyl ketone, dimethylacetamide, and mixtures thereof. Aqueous solvents may also be added, including, for example, water and water soluble alcohols. The vehicle can be a fluid at room temperature that can be selectively volatized for removal from the filler-polymer compositions after coating, such as by baking the coated composition at elevated temperature(s).

The curable polymer may be any resin known in the art. For example, the resin may be an acrylic resin, or a methacrylic resin. The resin, for example, may be an epoxy bisphenol-A resin, or an epoxy novolac resin. The resin may be a polyimide resin, a urethane resin, a polyester resin, or a gelatin. Combinations of these resins may be used. Additional examples of resins are indicated hereinbelow. The resin is one that may be cured by a variety of known methods, including, for example, by any source of radiation such as, for example, infrared or ultraviolet radiation or in combination with thermal curing. The curable coating composition may be photosensitive (i.e. may be cured by irradiation, such as by exposure to and absorbing actinic radiation). When the resin is curable by irradiation, the curable coating composition may further comprise a photoinitiator, which generates a radical on absorbing light with the respective pigment. Conventional photoinitiators for photosensitive resins can be used, for example, in this respect in any effective amount. Also, monomers, such as acrylates, methacrylates, epoxides, or styrenics, may be included. The curable coating composition can be formed with a minimum of additional components (additives and/or cosolvents) and processing steps. However, additives such as dispersing aids, surfactants and cosolvents may be included. For example, when a photosensitive resin is used, such as epoxy bisphenol-A or epoxy novolac, a photoinitiator can also be added. Monomers and/or oligomers may be added.

The curable coating composition may be formed using any method known to those skilled in the art, including, for example, using high shear mixing. Furthermore, the compositions may be prepared using a dispersion of the composite particle filler, such as a millbase. In formulating curable coating compositions (or dispersions) of the present invention, for example, the total amount of composite particle as filler can be from about 1 wt % up to about 20 wt %, or from about 2 wt % to about 18 wt %, or from about 3 wt % to about 18 wt %, or from about 4 wt % to about 15 wt %, or from about 5 wt % to about 10 wt %, of the total weight of the curable coating composition (i.e., including solvent and any other ingredients in addition to the filler), or other loading amounts. On a dry basis (solvent free), the total amount of composite particle filler can be such that, when the coating composition or dispersion is used to form a curable coating and is subsequently cured and dried, the resulting cured/dried coating comprises from about 1 wt % up to about 65 wt %, or from about 2 wt % to about 60 wt %, or from about 3 wt % to about 55 wt %, or from about 4 wt % to about 50 wt %, or from about 5 wt % to about 45 wt %, or from 6 wt % to about 40 wt %, or from 7 wt % to about 35 wt %, or from 8 wt % to about 30 wt %, or from about 9 wt % to about 25 wt %, or from about 10 wt % to about 20 wt %, total composite particle filler based on the total weight of the cured/dried coating, or other amounts. The polymer content in the blend with the filler and vehicle used to formulate the curable coating composition may vary, such as depending on the type of polymer, and can vary, for example, from about 5 to about 95 wt %, or from 10 wt % to about 90 wt %, or from 15 wt % to about 80 wt %, or from about 20 wt % to 70 wt %, or from about 25 wt % to about 60 wt %, or other values. The vehicle (e.g., solvent) content in the blend with the filler and polymer may vary from about 0 to about 90 wt %, or from 1 wt % to about 95 wt %, or from 5 wt % to about 75 wt %, or from about 10 wt % to 50 wt %, or other values. The polymer content in the cured coating or film containing the filler and polymer can comprise, for example, from about 99 wt % to about 20 wt %, or from about 50 wt % to about 20 wt %, or from about 95 wt % to about 50 wt %, or from about 95 wt % to about 60 wt %, or from about 95 wt % to about 65 wt %, or from about 90 wt % to about 70 wt %, or from about 85 wt % to about 65 wt %, or from about 80 wt % to 60 wt % polymer based on the total weight of the cured coating, or other amounts.

Additional ingredients for the filler-polymer compositions may include those such as described in U.S. Patent Application Publication Nos. 2011/0009551 and 2012/0092598, which are incorporated herein by reference in their entireties. Carbon blacks and/or other types of black pigments or even pigments colored different from black pigments may be used in combination with the composite particle in the polymer compositions. Representative examples of black pigments and colored pigments are provided, for example, in the above-indicated patent application publications, and reference can be made thereto. Suitable black pigments include aniline blacks, perylene blacks, and titanium blacks. Such carbon blacks and pigments are commercially available in either powder or press cake form from a number of sources including, for example, Cabot Corporation, BASF Corporation, Engelhard Corporation and Sun Chemical Corporation, and others. As an option, low structure carbon black can be used in combination with the composite particles in the filler. The low structure carbon black preferably can have an OAN of 30 to 50 cc/100 g. The combination of organic blacks or titanium black with composite particles according to various embodiments can enable polymer films with higher optical density (with respect to visible light) than the organic or titanium blacks can provide, while increasing the films' ability to transmit UV or IR radiation. Absorption of UV radiation may interfere in polymerization or cross-linking of UV curable films, while IR radiation is frequently used to align the different layers of multi-component structures. Alternatively or in addition, blends of the composite particles of according to various embodiments with lower dielectric constant pigments such as organic blacks and/or titanium blacks can also provide greater flexibility in controlling the dielectric constant of polymer films.

In filler-polymer compositions that further combine the composite particle with at least one carbon black (e.g., low structure carbon black) and/or colorant or pigment mixture, the composite particle of the present invention can comprise about 1 wt % or more, about 5 wt % or more, about 10 wt % or more, about 20 wt % or more, about 30 wt % or more, about 40 wt % or more, about 50 wt % or more, about 60 wt % or more, about 70 wt % or more, about 80 wt % or more, about 90 wt % or more, about 95 wt % or more, or 100%, or from about 1 wt % to about 100%, or from about 5 wt % to about 95 wt %, or from about 10 wt % to about 90 wt %, or from about 20 wt % to about 80 wt %, or from about 30 wt % to about 70 wt %, or from about 50 wt % up to about 100 wt % of all filler (by weight percent of filler present) in the filler-polymer composition. As indicated, the composite particle can be the predominant ($\geq 50\%$) type or only type of all filler used in the filler-polymer composition.

High shear mixing equipment which can be used to form a blend of the filler, polymer, vehicle, and any other additives, is known in the art and includes, for example, equipment capable of providing a grinding, impact, or similar impingement action, such as horizontal media mills, vertical media mills such as attritors, ball mills, hammer mills, pin disk mills, fluid energy mills, jet mills, fluid jet mills, impingement jet mills, rotor-stators, pelletizers, homogenizers, sonicators, cavitators, and the like.

With further regard to the polymer that can be used in forming the filler-polymer composition, the polymer can be any one or more other polymers than those above-described. For instance, further to the polymers indicated above, the polymer alternatively or additionally can be any other thermoplastic or thermoset polymer which can be used in combination with the filler to form a curable coating, radiation or thermally-curable coating, cured coating, black matrix, black column spacer coating or other light shielding elements in an LCD or other display. Preferably, the polymer is an acrylic polymer, or a methacrylic polymer, but would largely depend upon the intended application in a black matrix.

The polymers that form the filler-polymer composition can be pre-formed prior to combining with the one or more fillers, or one or more polymers can be formed in situ in the presence of one or more fillers. Any polymerization technique can be used to form the one or more polymers, such as emulsion polymerization, suspension polymerization, free radical polymerization, and the like.

Generally, any known polymer or combination of polymers especially used to form articles can benefit from the present invention with respect to controlling electrical resistivity, dielectric constant and forming products with controlled resistivity and dielectric constant.

The filler and polymer(s) can be combined using conventional techniques, such as blending, mixing, extruding, and the like.

With regard to the filler, at least one of the fillers used is a composite particle of the present invention. As indicated, the coated aggregates that are fused together to form the composite particle can have an aggregate core that can be a low structure carbon core and a metal/metalloid oxide mantle. These different aggregate core and mantle materials of the coated aggregates are carried over into and retained at least in part, predominantly or completely in the composite particle used as a filler (e.g., at least 10%, or at least 20%, or at least 30%, or at least 40%, or at least 50%, or at least 60%, or at least 70%, or at least 80%, or at least 90%, or at least 95%, or at least 99% retained).

As an option, the filler that is composite particles of the present invention can have metal/metalloid oxide surface coverage and content that are the same as indicated above. The weight percent of the metal/metalloid oxide in filler can be found by thermogravimetric analysis at 600° C. conducted in the presence of air. As indicated, the amount of the metal/metalloid oxide mantle present on the exposed surface area of the filler can be up to 100% by surface area or a partial coverage percentage. High resistivity and optical density suitable for black matrices can be reached with composite particles having a silica or other metal/metalloid oxide coverage in the indicated ranges (e.g., 30% to 100%, or 30% to 70%, or the other indicated ranges). A test that can be used to determine the amount of oxide surface coverage is provided in the paper entitled "New Generation Carbon-Silica Dual Phase Filler Part I. Characterization And Application To Passenger Tire" Rubber Chemistry And Technology, Vol 75(2), pp. 247-263 (2002), incorporated in its entirety by reference herein. As an option, the remaining amount of the filler, if not metal/metalloid oxide, is generally carbon. Trace amounts of other components and/or impurities typically found in carbon black feedstocks and/or silica or other metal/metalloid oxide feedstocks can be present in the filler.

The composite particles that are comprised of coated aggregates that have aggregate cores that are carbon cores, and silica mantles providing surface coverage on the aggregate cores, are sometimes used for illustration herein, and it will be understood that the composite particle can contain other metal or metalloid oxide-containing mantle materials in addition to or instead of silica and/or metal oxide mantle materials.

The composite particles can have high surface electrical resistivity, low dielectric constant, and high or at least adequate tinting strength for uses in black matrix, black column spaces or in other light shielding coatings, such as those made with polymer materials loaded with particles of these fillers and coatings made therefrom.

With the present invention, any one or more of conventional or optional additional ingredients used in filler-polymer compositions for forming curable and radiation or thermally-curable films and cured films in black matrices, black column spacers or other light shielding elements in an LCD or other display can be used herein, for instance at the conventionally used amounts.

Curable coating compositions used to form black matrices, black column spacers or other light shielding elements of the present invention can be prepared, for example, with the above-described composite particle filler, polymer and vehicle to provide stable dispersions that can be used in coatings that form curable films. Optionally, at least one suitable dispersant aid can be added to the formulation to facilitate dispersion of the composite particle filler to aggregate level. This can permit the preparation of curable coatings, radiation or thermally curable coatings, cured coatings, black matrices, black column spacers or other light shielding elements having improved overall properties and performance, including improved balance of electrical properties, such as high surface resistivity, and/or low dielectric constant, and/or high optical density, or any combinations of these.

Curable coatings, radiation or thermally-curable coatings, cured coatings, black matrices, black column spacers and other light shielding elements in an LCD or other display containing these products can have a surface resistivity, optical density, and/or dielectric constant such as indicated above. Surface resistivity is a measure of the resistance to leakage current along the surface of an insulating material and can be measured using a variety of techniques known in the art including, for example, the method defined in ASTM procedure D257-93. Volume resistivity can be determined using ASTM D-257. For example, Keithley Application Note Number 314 "Volume and Surface Resistivity Measurements of Insulating Materials Using the Model 6517A Electrometer/High Resistivity Meter" describes the measurements of surface and volume resistivity in details. Optical density (OD) is a measure of the opacity of a material and is typically measured using a densitometer. OD is dependent on several factors, including the thickness of the film. Optical density can be measured with an X-RITE 361T densitometer (X-RITE, Grand Rapids, Mich., U.S.A.). The coatings of the present invention can have the above-described electrical resistivities, which can apply to curable, cured, or both forms of coatings of the present invention. Coatings of the present invention can have volume resistivities, for example, which are the same as the indicated range values for surface resistivities, or other values (e.g., per 1 micron coating thickness). The coatings of the present invention may have similar electrical properties (such as resistivity) at greater film thicknesses, including, for example, 1-250 micron (μm) thickness, or from 10-100 micron thickness, or from 20-50 micron thickness, or from 1-4 micron thickness or other thicknesses, depending on the application of the coating. The dielectric constant measurements can be measured, for example, with Solartron 1260A Impedance/Gain-phase Analyzer (FRA) complemented with 1296A Dielectric Interface (Solartron Analytical). The frequencies of interest under which the capacitance measurements are made for determining a dielectric constant of coatings for black matrix applications can range from 100 Hz to 1 MHz. The selection of a more specific dielectric constant value below 20 may take into consideration factors, such as whether an organic layer is formed on the black matrix where used in a color filter on transistor type LCD or other display device. For example, a dielectric constant less than 20 may be used where no organic layer is formed on the black matrix in such a device, whereas the dielectric constant may be selected to be less than 10 where an organic layer is formed on the black matrix, such as to minimize signal delays or other problems in the device. These dielectric constant values can apply to curable, cured, or both forms of coatings of the present invention. Tinting strength (Tint) of the composite particles can be determined according to ASTM Test Procedure D3265-07. Ash content can be measured as per ASTM D1506.

Figure 11:
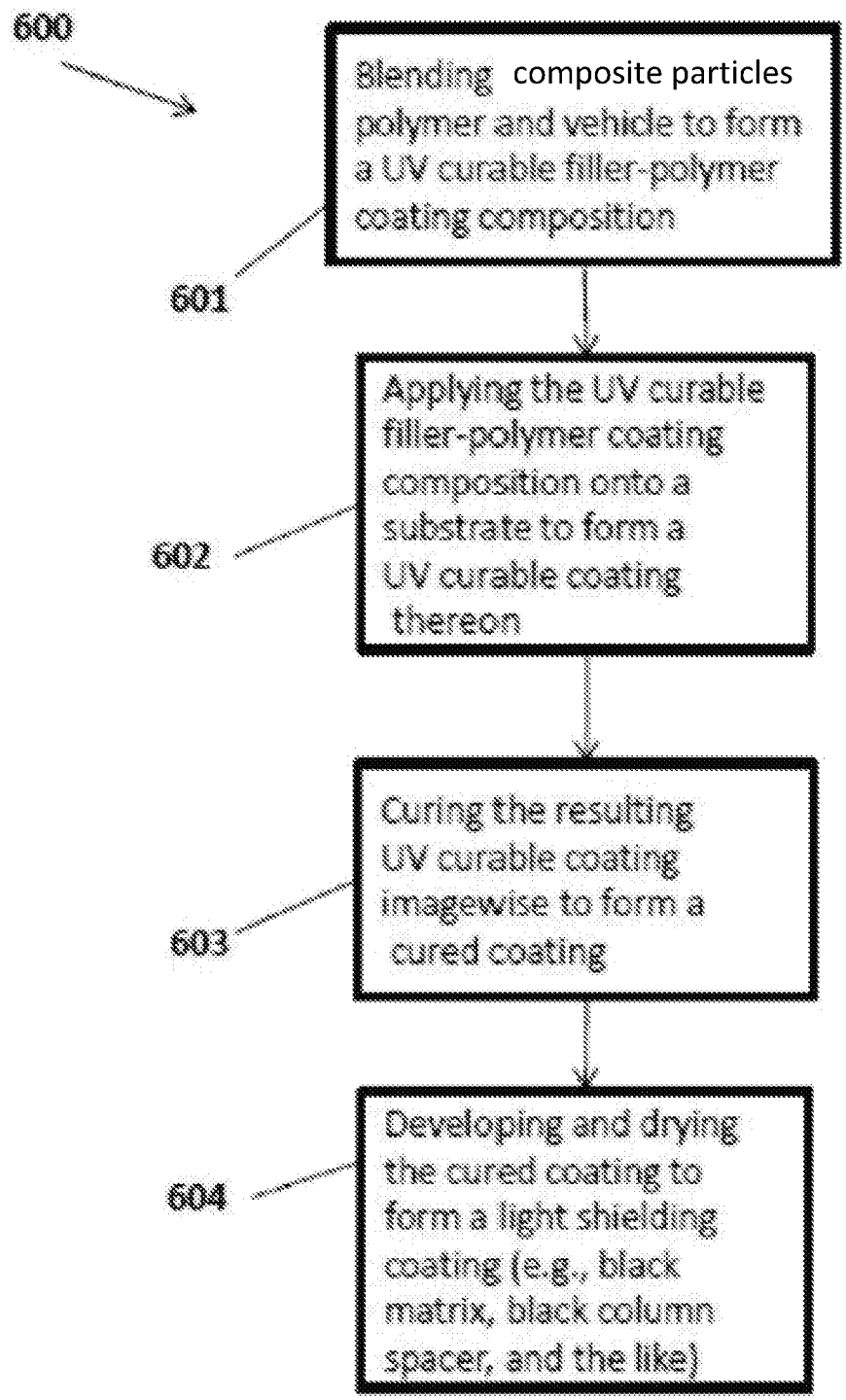
FIG. 11 is a flow chart which shows a method of making and using a filler-polymer composition according to an example of the present application.

The present invention further relates to a method of making a radiation or thermally—cured coating, black matrix, black column spacer or other light shielding elements. For example, and as illustrated in FIG. 11, a method is generally indicated by process flow (600) which can be used for making a UV curable coating, cured coating, black matrix, black column spacer or other light shielding coatings. The process can comprise steps of the blending composite particles, polymer and vehicle to form a curable filler-polymer coating composition (601), then applying the curable filler-polymer coating composition onto a substrate to form a curable coating thereon (602), curing the resulting curable coating imagewise (603), and developing and drying the cured coating to form a UV cured coating, black matrix, black column spacer or other light shielding coatings (604). Alternatively to step 601, a dispersion of composite particle filler with vehicle and optional dispersing aid can be made first and then combined with a curable polymer and other additives. Dispersing aids are additives that can enhance the dispersability of pigments/particles in solvents or aqueous medium. Polymer based dispersing aids are normally used in organic solvents. These polymeric dispersant aids typically have pigment affinity groups which interact with the pigment surface. They may also contain long chain polymers that are soluble in the solvent and thus provide steric stabilization of pigment particles. Commonly used dispersing aids include, for example, BYKJET 9131, Disperbyk®-161, LPN21324, and Disperbyk®-163 from BYK Chemie, Solsperse® 24000, Solsperse® 37500, and Solsperse® 35100 from Lubrizol Ltd, and Efka 4310 dispersant from BASF. The cured coating, radiation or thermally-cured coating, black matrix, black column spacer or other light shielding coatings can be prepared from the curable coating composition or other filler-polymer compositions such are described in more detail above and in the examples herein. Surface resistivity and optical density, for example, can be important properties for black matrix materials. Since the cured coating, radiation or thermally-cured coating, black matrix, black column spacer or other light shielding coatings of the present invention can be formed, for example, from the curable filler-polymer coating compositions of the present invention, which can be used to form a cured coating of the present invention, the curable coating, radiation or thermally-curable coating, cured coating, black matrix, black column spacer or other light shielding coatings can have performance properties (surface resistivity and optical density) such as described above in relationship to the coating. The total amount of the composite particles in the described coatings of the present invention can comprise the values indicated above. A single type or more than one type of composite particle filler can be used in any polymer composition used in a curable coating, radiation or thermally-curable coating, cured coating, black matrix, black column spacer or other light shielding coatings.

The present invention further relates to a liquid crystal display or other display that contains a curable coating, radiation or thermally-curable coating, cured coating, black matrix, black column spacer or other light shielding coatings as described herein. The present invention further relates to a color filter which can be used in combination with a black matrix as described herein. The color filter can be formed using any method known in the art and, in particular using a method that incorporates formation of a black matrix component such as described above. For this application, pigments can be used which correspond in color to the colors needed for the pixels of the display device. The present invention also relates to a color filter on array (COA) structure comprising at least one thin film transistor (TFT) array formed on a substrate, and an infrared or near-infrared radiation-transparent layer located directly on the array, wherein the radiation-transparent layer can comprise the black matrix such as indicated above. The present invention also relates to a liquid crystal display or other display comprising the color filter on array structure such as indicated herein.

Figure 12A:
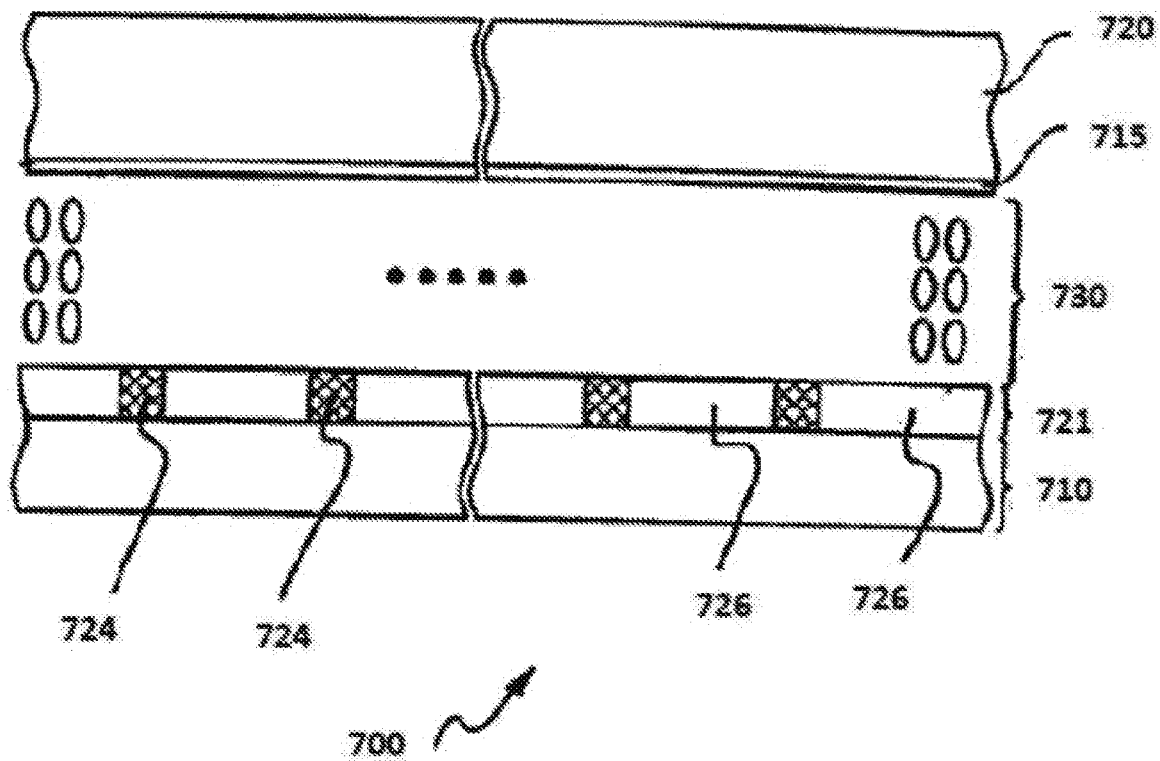
FIG. 12A is a schematic view of a liquid crystal display including a black matrix layer, according to an example of the present application.

Referring to FIG. 12A, for example, a liquid crystal display 700 according to the present invention is shown that can be made with a color filter on array (COA) technique which incorporates a black matrix component. A color filter 721 is formed on an active device array substrate 710 (e.g., a TFT array substrate). The color filter 721 includes black matrix 724 and a plurality of color filter thin films 726. Generally speaking, the material of the color filter thin film regions 726 can be red, blue, or green resins. A liquid crystal layer 730 is disposed between the color filter 721 and an opposite transparent insulation substrate 720. Patterned electrodes 715 can be provided on the side of the opposite substrate 720 which faces layer 730. The color filter 721 can be formed on active device substrate 710, for example, using photolithographic methods, inkjet printing, or combinations of these techniques such as known in the art. For example, the black matrix 724 can be formed as a patterned negative photosensitive back resin layer, and the color filter regions 726 can be formed as patterned photosensitive color filter layer regions and/or by ink jet printing. Use of the composite particles may enable patterns having higher resolution features and/or may reduce dissolution times during photolithography during production of LCDs and other devices. The design and fabrication of the active device array substrate 710 (e.g., a TFT array substrate) can be conventional or any configuration suitable for use in combination with color filters made with a black matrix composition such as disclosed herein. Other components not shown can be included in the liquid crystal display which are conventionally used in and with such devices. The formation of a color filter including a black matrix which contains the surface modified organic black pigment and optional carbon black on a TFT array can be provided, for example, using process steps and arrangements such as shown in U.S. Pat. Nos. 7,773,177 B2, 7,439,090 B2; 7,436,462 B2; and 6,692,983 B1, and U.S. Patent Application Publication Nos. 2007/0262312 A1 and 2011/0005063 A1, which are incorporated herein by reference in their entireties.

Figure 12B:
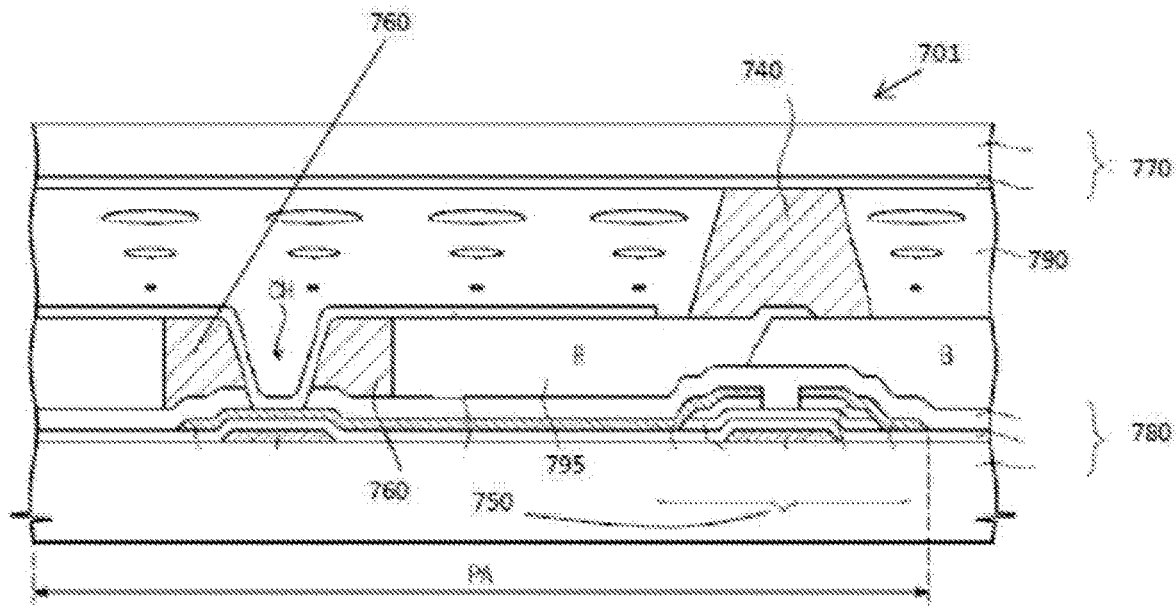
FIG. 12B is a schematic view of a liquid crystal display including black column spacer and black matrix layers, according to an example of the present application.

Referring to FIG. 12B, for example, a liquid crystal display 701 according to the present invention is shown that can be made with a black color spacer and a black matrix. A spacer 740 is formed in each pixel area and arranged on the thin film transistor 750. The spacer 740 may include the same material as a black matrix 760 and may be formed through the same process as the black matrix 760. When column spacers are black, they are also called black column spacers. Since each spacer 750 and black matrix 760 may include the same material, the opposite substrate 770 may not require a separate black matrix to prevent the thin film transistor 750 from being recognized from the outside. As a result, the number of manufacturing processes may be decreased and misalignment between the array substrate 780 and the opposite substrate 770 may be prevented. Layer 790 indicates a liquid crystal layer, 795 is a color filter (e.g., a red (R), blue (B), or green color filter), CH is a contact hole, and PA is a pixel area. Other components of LCD 701 can include those such as shown in the indicated U.S. Patent Application Publication No. 2011/0005063 A1.

The composite particles of the various embodiments disclosed herein can also provide benefits in other end-use applications requiring black color and high resistivity. For example, the composite particles can provide UV protection characteristics to electrically insulating materials. They may also be used as pigments for non-conductive black inks for ink jet, gravure, and other printing methods. The composite particles may be used in spray coatings, where they can impart both chemical and electrical resistance to the coating. They may also be used in energy dissipation and electrical stress-grading materials, in which the amount of metal/metalloid oxide coverage may be selected to control the dielectric constant of the final product. Composite particles may also be used in components such as rolls, belts, and drums of electrophotographic equipment where high resistivity is desired to reduce interference with the electrophotographic process. Composite particles with silica mantles may be used in adhesives and sealants in place of or in combination with traditional fumed silica fillers, especially in electronics and displays applications. Composite particles with silica mantles may also be used in silicone and fluoropolymer based items such as gaskets and belts.

The present invention will be further clarified by the following examples, which are intended to be exemplary of the present invention.

Example 1

Composite particles were prepared in a reactor as described above and shown in FIG. 2 utilizing the reactor geometry set forth in Table 2 and process conditions set forth in Table 3. Natural gas was employed as both the burner fuel and the auxiliary hydrocarbon. An aqueous solution of potassium acetate was used as the alkali metal-containing material, and was mixed with the carbon black-yielding feedstock prior to injection into the reactor. In Example A1-A8, a silicon-containing compound (OMTS, i.e., octamethyl-cyclotetrasiloxane, a compound sold as "D4" by Dow Corning Corporation) and isopropanol diluent (in some examples) were introduced in the reactor at a location that was 5.0 meters downstream of the location of the introduction of the carbon black-yielding oil feedstock and the natural gas used as auxiliary hydrocarbon gas. No D4 was introduced in the comparative example C1 shown in Table 3. The reaction was quenched with water purified by reverse osmosis. The liquid (oil) feedstock had the properties indicated in Table 1 below.

TABLE 1

Feedstock Properties

| | |
|---|---|
| Hydrogen/Carbon Ratio | 1.05 |
| Hydrogen (wt %) | 7.96 |
| Carbon (wt %) | 91.03 |
| Sulfur (wt %) | 0.46 |
| Nitrogen (wt %) | 0.32 |
| Oxygen (wt %) | 0.23 |
| Specific Gravity at 60° F. [ASTM D-287] | 1.0721 |

TABLE 2

Reactor Geometry

| | Example No. | |
|---|---|---|
| | A1-A8 | C1 |
| G-1 (m) | 5.0 | 5.0 |
| D-1 (m) | 0.18 | 0.18 |
| D-2 (m) | 0.11 | 0.11 |
| D-3 (m) | 0.69 | 0.69 |
| D-4 (m) | 0.91 | 0.91 |
| D-5 (m) | 0.91 | 0.91 |
| D-6 (m) | 0.91 | 0.91 |
| D-7 (m) | 0.91 | 0.91 |
| D-8 (m) | 0.46 | 0.46 |
| D-9 (m) | 0.13 | 0.13 |
| L-1 (m) | 0.61 | 0.61 |
| L-2 (m) | 0.30 | 0.30 |
| L-3 (m) | 5.2 | 5.2 |
| L-4 (m) | 6.7 | 6.7 |
| L-5 (m) | 0 | 0 |
| L-6 (m) | 0 | 0 |
| L-7 (m) | 0 | 0 |
| Q (m) | 8.1 | 8.1 |
| F-1, H-1 (m) | 0.1 | 0.1 |

TABLE 3

Operating Conditions

| Condition # | | C1 | A1 | A2 | A3 | A4 | A5 | A6 | A7 | A8 |
|---|---|---|---|---|---|---|---|---|---|---|
| Combustion Air Rate | nm³/hr** | 1600 | 1600 | 1600 | 1600 | 1600 | 1600 | 1600 | 1600 | 1600 |
| Air Temperature | ° C. | 480 | 480 | 480 | 480 | 480 | 480 | 480 | 480 | 480 |
| Burner Nat. Gas Rate | nm³/hr** | 41 | 41 | 41 | 41 | 41 | 41 | 41 | 41 | 41 |
| Feedstock Injection Orifice Diameter | cm | 0.17 | 0.17 | 0.17 | 0.17 | 0.17 | 0.17 | 0.17 | 0.17 | 0.17 |
| Number of Feedstock Orifices | | 3 | 3 | 3 | 3 | 3 | 3 | 3 | 3 | 3 |
| Feedstock Rate | kg/hr | 458 | 458 | 458 | 458 | 458 | 458 | 458 | 458 | 458 |
| Feedstock Temp | ° C. | 175 | 175 | 175 | 175 | 175 | 175 | 175 | 175 | 175 |
| K+ Concentration in Feedstock | ppm | 750 | 750 | 750 | 750 | 750 | 750 | 750 | 750 | 750 |
| Aux. HC Injection Orifice Diameter | cm | 0.51 | 0.51 | 0.51 | 0.51 | 0.51 | 0.51 | 0.51 | 0.51 | 0.51 |
| Number of Aux. Hydrocaron Orifices* | | 3 | 3 | 3 | 3 | 3 | 3 | 3 | 3 | 3 |
| Aux. Hydrocarbon Rate | nm³/hr** | 50 | 50 | 50 | 50 | 50 | 50 | 50 | 50 | 50 |
| D4+IPA Injection Orifice Diameter | cm | NA | 0.046 | 0.046 | 0.046 | 0.046 | 0.046 | 0.046 | 0.046 | 0.046 |
| Number of IPA+D4 Orifices | | NA | 3 | 3 | 3 | 3 | 6 | 6 | 6 | 6 |
| D4 Rate | kg/hr | 0 | 50 | 78 | 100 | 78 | 78 | 100 | 130 | 100 |
| IPA Rate | kg/hr | 0 | 50 | 22 | 0 | 78 | 22 | 0 | 0 | 30 |
| Quench Water Rate | kg/hr | 484 | 361 | 420 | 433 | 400 | 406 | 447 | 459 | 436 |

Explanations of abbreviations and headings in Table 3:

*The feedstock and auxiliary hydrocarbon orifices were arranged in the same ring pattern (axial plane) in an alternating sequences around the periphery of the reactor in the location of Point 30 as shown in FIG. 2.

**nm³ refers to normal cubic meters, where "normal" is defined as the volume of the gas corrected to 0° C. and 1 atm of pressure D4 rate: rate of OMTS (i.e., octamethyl-cyclotetrasiloxane, a compound sold as "D4" by Dow Corning Corporation.

IPA rate: Introduction rate of isopropanol alcohol.

Characterization of Composite Particles and Comparison Carbon Black

Various properties of composite particles and carbon blacks produced in Example 1 were measured as described elsewhere herein. Spectronic 20 is measured as per ASTM D1618-99. Table 4 shows characteristics of product samples nos. 1-8 which correspond to products of Examples A1-A8, respectively, and for a low structure carbon black (C1). In Table 4, the measured Ash content is a metric for the amount of $SiO_2$ that is incorporated into the composite particles on a weight basis. Table 4 shows that when compared to the reference condition where no D4 is injected (C1), when D4 is injected (Examples A1-A8), the total BET surface area ($N_2SA$) stays relatively similar or decreases slightly; however, the Iodine ($I_2$) Number decreases much more significantly because iodine does not absorb on the external surface of the particle that is covered by $SiO_2$. As explained in the above-cited reference: "New Generation Carbon-Silica Dual Phase Filler Part I. Characterization And Application To Passenger Tire" Rubber Chemistry And Technology, Vol 75(2), pp. 247-263 (2002), the $SiO_2$ coverage is calculated from the difference in Iodine Number and BET surface area. As Table 4 illustrates, using this unique reactor configuration and process conditions, composite particles with low surface area and high silica coverage were produced.

OAN analysis of the carbon phase recovered after HF treatment of composite particles produced according to Example A2 was 30 mL/100 g. The silicon content for the carbon phase recovered after HF treatment was 113 ppm by mass. The OAN value is comparable to that of Comparative Carbon Black C1 produced as described in Example 1.

Figure 13:
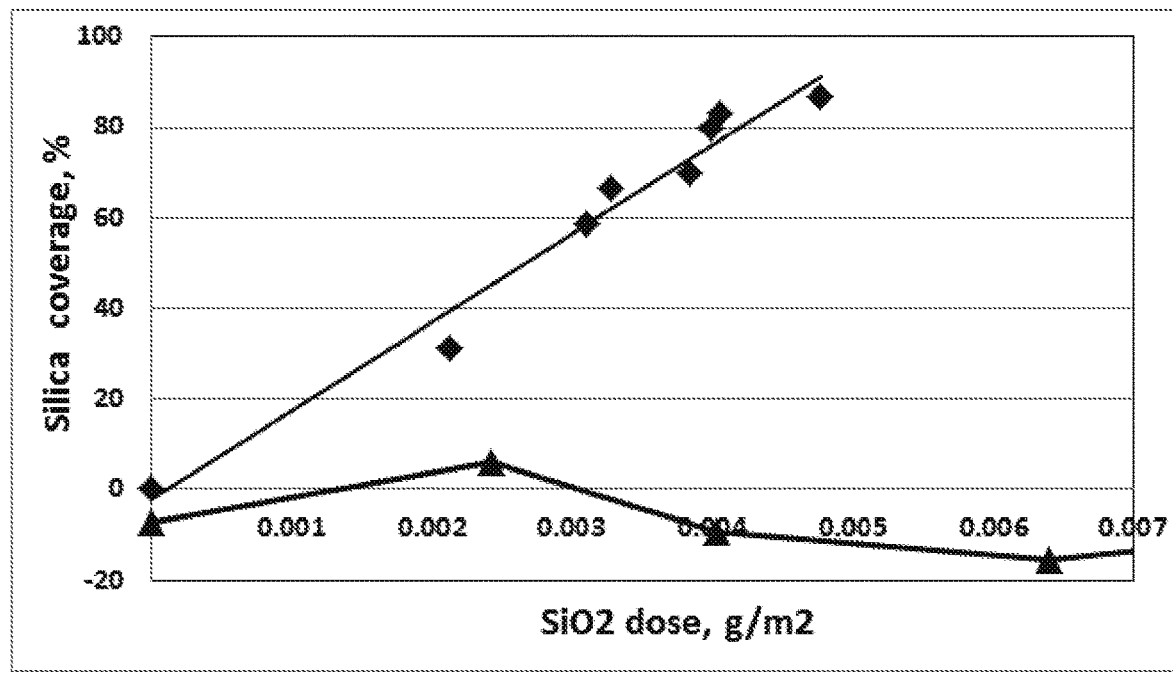
FIG. 13 is a plot that shows silica coverage (%) with respect to silica dose for composite particles (♦) made according to Example 1 of the present application. Data points (▲) show silica coverage for composite particles made according to Comparative Example 1.

FIG. 13 shows silica coverage (%) with respect to silica dose for the composite particle products (♦) made according Examples 1-8. Data points (▲) show silica coverage for CE2, CE3, CE4, and CE5 from Comparative Example 1 as described below.

Figure 14:
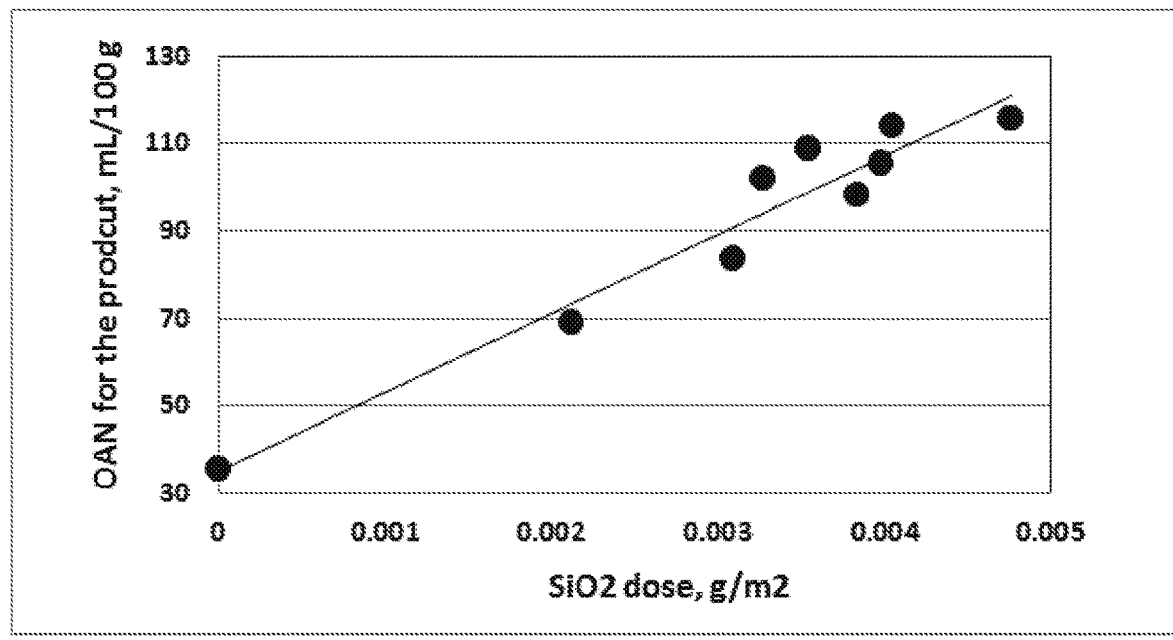
FIG. 14 is a plot that shows OAN of composite particle products of examples according to the present application with respect to silica dose.

FIG. 14 shows OAN of the final products (samples 1-8) of Examples A1-A8 with respect to silica dose. Control of structure of the "super-aggregates" with the dose of silicon-containing feedstock is shown as mass $SiO_2$ per BET surface area of carbon black.

Figure 15:
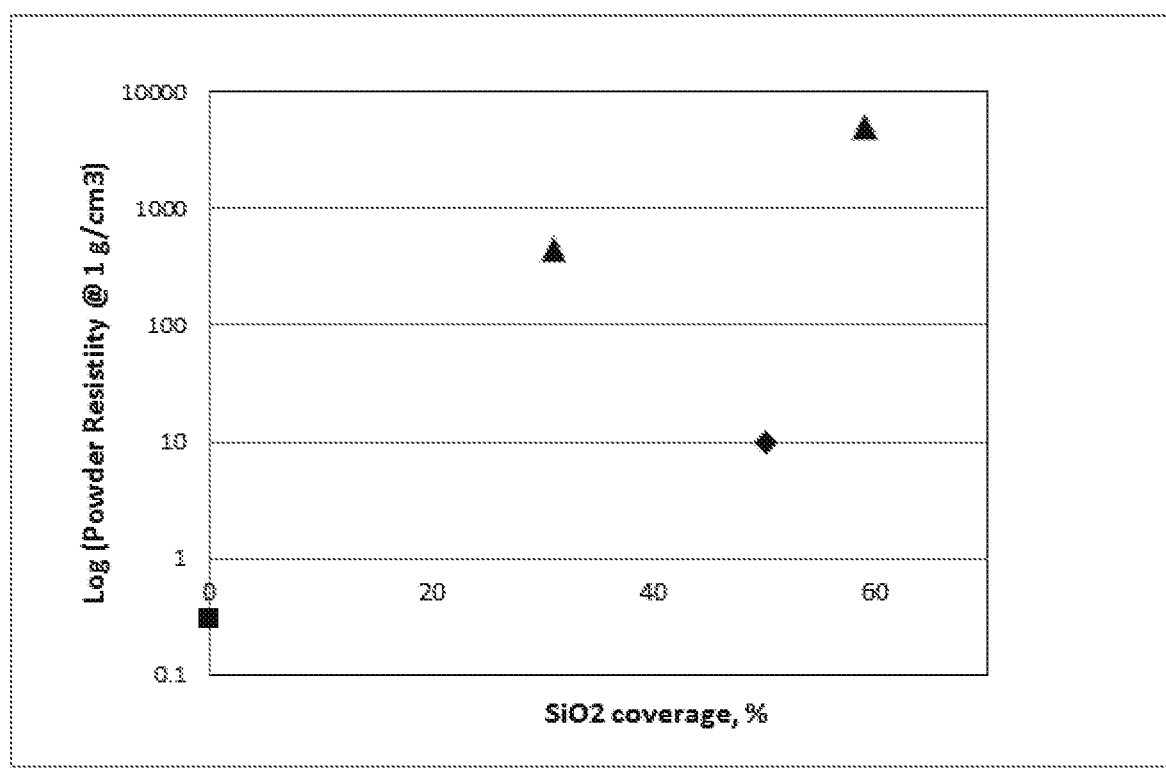
FIG. 15 is a graph showing a comparison of powder resistivity (ohm·cm at 1 g/cm$^3$) of composite particle products according to examples of the present application (▲) with a control example (C1: ■) with no silica and a commercial silica-carbon black dual phase particle (♦).

FIG. 15 shows a comparison of powder resistivity (Ohm·cm at 1 $g/cm^3$) of samples 1 and 2 of Examples A1 and A2 (▲) with control example C1 (■) with no silica (OAN=36), and a commercial silica-carbon black dual phase filler (CRX 4210 filler, available from Cabot Corporation) (♦). The composite particles of the present invention had greater powder resistivity per silica coverage than the control example and commercial dual phase filler. Moreover, the improved resistivity was achieved with less than 100% silica coverage of the composite particles.

TABLE 4

Characteristics of Materials

|  | C1 | 1 | 2 | 3 | 4 | 5 | 6 | 7 | 8 |
|---|---|---|---|---|---|---|---|---|---|
| $I_2$ No (mg/g) | 76.6 | 46.6 | 25.9 | 18 | 16.1 | 21 | 11.3 | 6.5 | 9.2 |
| OAN ($cm^3$/100 g) | 35.8 | 69.1 | 83.6 | 99.7 | 108.7 | 101.9 | 105.3 | 115.9 | 113.8 |
| Spec 20 | 95.9 | 75 | 78.5 | 82.3 | 3 | 73.7 | 82.5 | 49 | 22 |
| Moisture (wt %) | 0.1 | 0.5 | 0.6 | 0.48 | 0.7 | 0.5 | 0.4 | 0.3 | 0.5 |
| $N_2SA$ ($m^2$/g) | 67.8 | 73.9 | 68.7 | 65.6 | — | 69.3 | 64.3 | 57.7 | 60.9 |
| STSA ($m^2$/g) | 67.8 | 62.1 | 56.1 | 53.1 | — | 55.5 | 48 | 40.8 | 46.9 |
| TINT | 107 | 92.5 | 85.1 | 80.8 | 85.0 | 88.1 | 79.2 | 70.5 | 78.9 |
| ASH (wt %) | — | 14 | 21 | 26 | — | 22 | 27 | 32 | 28 |
| SiO2 Coverage – Calculated (%) | 0 | 31 | 58 | 70 | — | 66 | 80 | 87 | 83 |
| SiO2 – weight % |  | 14.4 | 21 |  |  |  | 27 |  |  |
| Powder Resistivity at 1 $g/cm^3$ (Ohm · cm) |  | 450 | 5000 |  |  |  | >$10^6$ |  |  |

Table 5 shows "structure" from TEM analysis on the carbon phase recovered after HF treatment of Samples 1, 2, and 6 of Examples A1, A2, and A6, respectively. As a reference, TEM structure for Sample 6 prior to HF treatment was 0.70. The silica content for the carbon phase recovered after HF treatment was <1%.

TABLE 5

| Sample No. | "Structure" from TEM analysis on carbon based recovered after HF treatment* |
|---|---|
| 1 (30% coverage) | 0.89 |
| 2 (60% coverage) | 0.88 |
| 6 (80% coverage) | 0.90 |

*TEM structure = Convex perimeter to perimeter ratio TEM image analysis for at least 2000 aggregates. The value is based on arithmetic number average.

Figure 16:
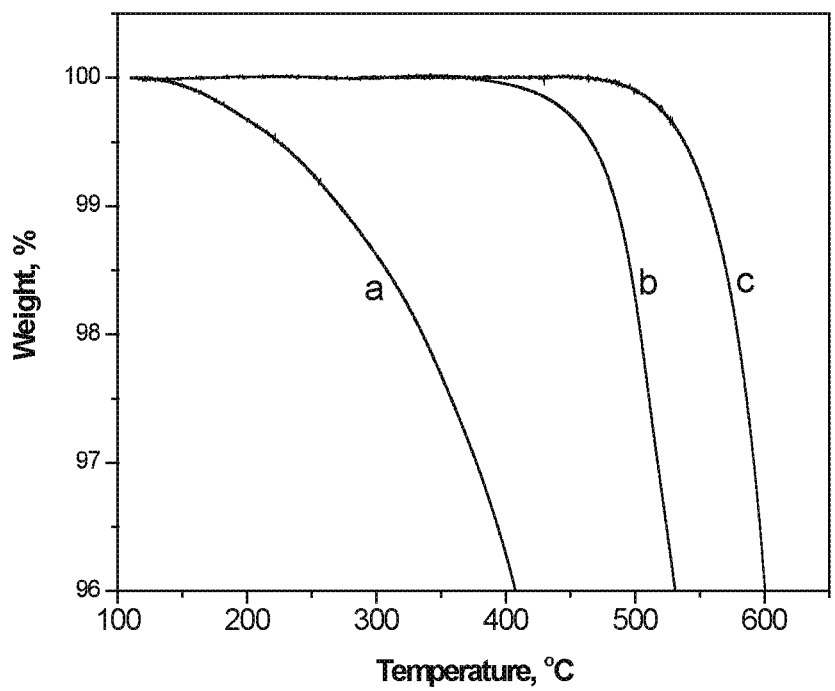
FIG. 16 is a graph showing a comparison of thermal stability of samples based on TGA measurements in air, wherein "a" is an oxidized carbon black for comparison, "b" is an ultra-low structure carbon black (not dual phase), and "c" are composite particles according to an example of the present application. Retained mass (wt %) is plotted versus temperature (° C.).

FIG. 16 shows a comparison of thermal stability of samples based on TGA measurements in air (temperature ramp of 5° C. per minute), wherein "a" is oxidized carbon black for comparison (Regal 400 carbon black, available from Cabot Corporation), "b" is carbon black C1, and "c" are composite particles according to Sample 6. The composite particle of the present invention had better thermal stability than all the comparison products under the test parameters that were used, as shown by its capability to retain similar mass to greater temperatures.

Comparative Example 1

A comparison experiment was conducted in a reactor that can also be described with reference to FIG. 2, but with a key difference to the reactor used in Example 1 for production of Examples A1-A8: the spacing between the feedstock introduction location and the D4 introduction location, i.e., distance G-1, was significantly shorter in the comparative example. Also, the diameter of the tunnel between the feedstock introduction location and the D4 introduction location (D-8) was significantly smaller. The result is that there is significantly less residence time between the feedstock and D4 injection. The detailed reactor geometry used in the comparative example is shown in Table 6. The liquid (oil) feedstock was identical to that used in Example 1 and is shown in Table 1. The operating conditions of the comparative example are shown in Table 7.

TABLE 6

Reactor Geometry - Comparative Examples

| | Example No. | | | |
|---|---|---|---|---|
| | CE1 | CE2 | CE3 | CE4-CE6 |
| G-1 (m) | 0.61 | 0.61 | 0.61 | 0.61 |
| D-1 (m) | 0.18 | 0.18 | 0.18 | 0.18 |
| D-2 (m) | 0.11 | 0.11 | 0.11 | 0.11 |
| D-3 (m) | 0.91 | 0.91 | 0.91 | 0.91 |
| D-4 (m) | 0.69 | 0.91 | 0.91 | 0.91 |
| D-5 (m) | 0.91 | 0.91 | 0.91 | 0.91 |
| D-6 (m) | 0.91 | 0.91 | 0.91 | 0.91 |
| D-7 (m) | 0.91 | 0.91 | 0.91 | 0.91 |
| D-8 (m) | 0.13 | 0.13 | 0.13 | 0.13 |
| D-9 (m) | 0.13 | 0.13 | 0.13 | 0.13 |
| L-1 (m) | 0.61 | 0.61 | 0.61 | 0.61 |
| L-2 (m) | 0.30 | 0.30 | 0.30 | 0.30 |
| L-3 (m) | 0.81 | 0.81 | 0.81 | 0.81 |
| L-4 (m) | 0.38 | 9.6 | 9.6 | 9.6 |
| L-5 (m) | 9.6 | 0 | 0 | 0 |
| L-6 (m) | 0 | 0 | 0 | 0 |
| L-7 (m) | 0 | 0 | 0 | 0 |
| Q (m) | 4.0 | 4.0 | 6.1 | 7.4 |
| F-1, H-1 (m) | 0.1 | 0.1 | 0.1 | 0.1 |

Two reference carbon blacks (CE1 and CE2) were produced without D4 injection and four materials intended to be silica-carbon composite particles (CE3-CE6) were made. Product CE1 was prepared on the initial reactor configuration, and Product CE2 and CE3-CE6 were made using the final configuration that included the water-cooled faceplate. Run conditions of the comparative examples are summarized in Table 7.

TABLE 7

Operating Conditions - Comparative Examples

| Condition # | | CE1 | CE2 | CE3 | CE4 | CE5 | CE6 |
|---|---|---|---|---|---|---|---|
| Combustion Air Rate | nm$^3$/hr** | 1600 | 1600 | 1600 | 1600 | 1600 | 1600 |
| Air Temperature | ° C. | 480 | 480 | 480 | 480 | 480 | 480 |
| Burner Nat. Gas Rate | nm$^3$/hr** | 41 | 41 | 41 | 41 | 41 | 41 |
| Feedstock Injection Orifice Diameter | cm | 0.17 | 0.17 | 0.17 | 0.17 | 0.17 | 0.17 |
| Number of Feedstock Orifices | | 3 | 3 | 3 | 3 | 3 | 3 |
| Feedstock Rate | kg/hr | | | | | | |
| Feedstock Temp | ° C. | 175 | 175 | 175 | 175 | 175 | 175 |
| K+ Concentration in Feedstock | ppm | | | | | | |
| Aux. HC Injection Orifice Diameter | cm | 0.51 | 0.51 | 0.51 | 0.51 | 0.51 | 0.51 |
| Number of Aux. Hydrocaron Orifices* | | 3 | 3 | 3 | 3 | 3 | 3 |
| Aux. Hydrocarbon Rate | nm$^3$/hr** | 50 | 50 | 50 | 50 | 50 | 50 |
| D4+IPA Injection Orifice Diameter | cm | NA | NA | 0.041 | 0.041 | 0.041 | 0.051 |
| Number of IPA+D4 Orifices | | NA | NA | 6 | 6 | 6 | 6 |
| D4 Rate | kg/hr | 0 | 0 | 42 | 65 | 125 | 180 |
| IPA Rate | kg/hr | 0 | 0 | 38 | 15 | 15 | 10 |
| Quench Water Rate | kg/hr | 558 | 470 | 444 | 450 | 498 | 543 |

Various properties of the composite particles and carbon blacks produced in Comparative Example 1 were measured as described elsewhere herein, and summarized in Table 8.

TABLE 8

Characteristics of Materials - Comparative Examples

| Condition # | CE1 | CE2 | CE3 | CE4 | CE5 | CE6 |
|---|---|---|---|---|---|---|
| I2 No. (m$^2$/g) | 70.4 | 62.9 | 40.8 | 44.0 | 51.0 | 45.4 |
| OAN (cm$^3$/100 g) | 38.0 | 38.2 | 61.3 | 54.0 | 59.5 | 72.4 |
| N2SA (m$^2$/g) | 62.1 | 57.0 | 45.4 | — | 46.0 | — |
| STSA (m$^2$/g) | 65.6 | 60.1 | 41.5 | 40.2 | 42.2 | 41.0 |
| Tint | 106.8 | 100.3 | 67.5 | 65.3 | 86.5 | 56.6 |
| Spec 20 | 92.2 | 88.6 | 38.4 | 82.0 | 94.3 | 88.2 |
| Ash Content (%) | 0.2 | 0.2 | 11.0 | 18.1 | 29.4 | 35.1 |
| SiO$_2$ Content Based on Ash (%) | 0.0 | 0.0 | 10.8 | 17.9 | 29.2 | 34.9 |
| SiO$_2$ Coverage - Calculated (%) | N/A | N/A | 6.1 | −9.5 | −15.6 | −10.73 |

Using the reactor configuration of Comparative Example 1 (Table 6), the characteristics of the carbon black with no D4 injection (CE1 and CE2) were actually quite similar to the characteristics of the carbon black with no D4 injection in Example 1 (C1). However, the effect of adding D4 to form SiO$_2$ in Comparative Example 1 (CE3-CE6) was very different than in Example 1 (A1-A8). CE3-CE6 had a significantly lower surface area than A1-A8. In addition, the calculated SiO$_2$ coverage of CE3-CE6 was extremely low, whereas the calculated SiO$_2$ coverage of A1-A8 was high. This trend is more clearly illustrated in FIG. 13. In fact, the calculated SiO$_2$ coverage of CE3-CE6 indicates that these particles are likely to not be coated with SiO$_2$ but instead contain SiO$_2$ embedded into the particles. Surprisingly, this indicates that obtaining low surface area silica-carbon composite particles with high SiO$_2$ coverage requires a longer residence time, for example, between 30 and 400 ms, between the first and second injection locations, as described in Example 1. Downstream addition of D4 in a configuration similar to what is disclosed in U.S. Pat. No. 6,057,387 (as in Comparative Example 1) does not result in $SiO_2$ coated composite particles. Without being bound by any particular theory, it appears that in order to produce low surface area and low structure $SiO_2$-coated composite particles, the temperature of the carbon black forming first stage must be sufficiently low that previously-disclosed reactor configurations do not provide sufficient residence time for the carbon black formation reaction to proceed to a required level of completion before the $SiO_2$-forming material (D4) is introduced. At low reactor temperatures needed to produce a low surface area carbon black core, the kinetics of the carbon black reaction are significantly slower. The result is that the D4 introduction further cools the still-reacting mixture, reducing the surface area even further and resulting in $SiO_2$ incorporation into the particles as opposed to coating the surface.

Example 2

This example describes the preparation of dispersions comprising composite particles made according to Example A2 of Example 1. Two different dispersants were utilized: BYK LPN 21324 (40% active) available from BYK-Chemie and Efka® 4310 PX (50% active) available from BASF. Table 9 summarizes the compositions of four millbases comprising composite particles according to Example A2. The specified amount of dispersant was dissolved in propylene glycol methyl ether acetate (PGMEA) and was carefully combined with 20 g of composite particles along with 100 g of 0.5 mm glass beads. The mass ratio of active dispersant to composite particles was either 0.2 (example B1 and B3) or 0.25 (example B2 and B4). Each millbase formulation was dispersed in a LAU disperser (Model DAS200) for 4 hours. The resulting dispersions were filtered from glass media. The viscosity was measured using Brookfield DV-1+ viscometer at 10, 20, 50 and 100 rpm using a CPE-40 spindle and particle size distribution was evaluated using Nanotrac NPA252 instrument from Microtrac.

TABLE 9

|  | B1 | B2 | B3 | B4 |
|---|---|---|---|---|
| Dispersant | BYK ® 21324 | BYK ® 21324 | Efka ® PX 4310 | Efka ® PX 4310 |
| Mass of Particles (g) | 20 | 20 | 20 | 20 |
| Mass of Dispersant (g) | 12.5 | 16.7 | 10 | 13.33 |
| Mass of PGMEA (g) | 67.5 | 63.3 | 70 | 66.67 |
| Total | 100 | 100 | 100 | 100 |

Figure 17:
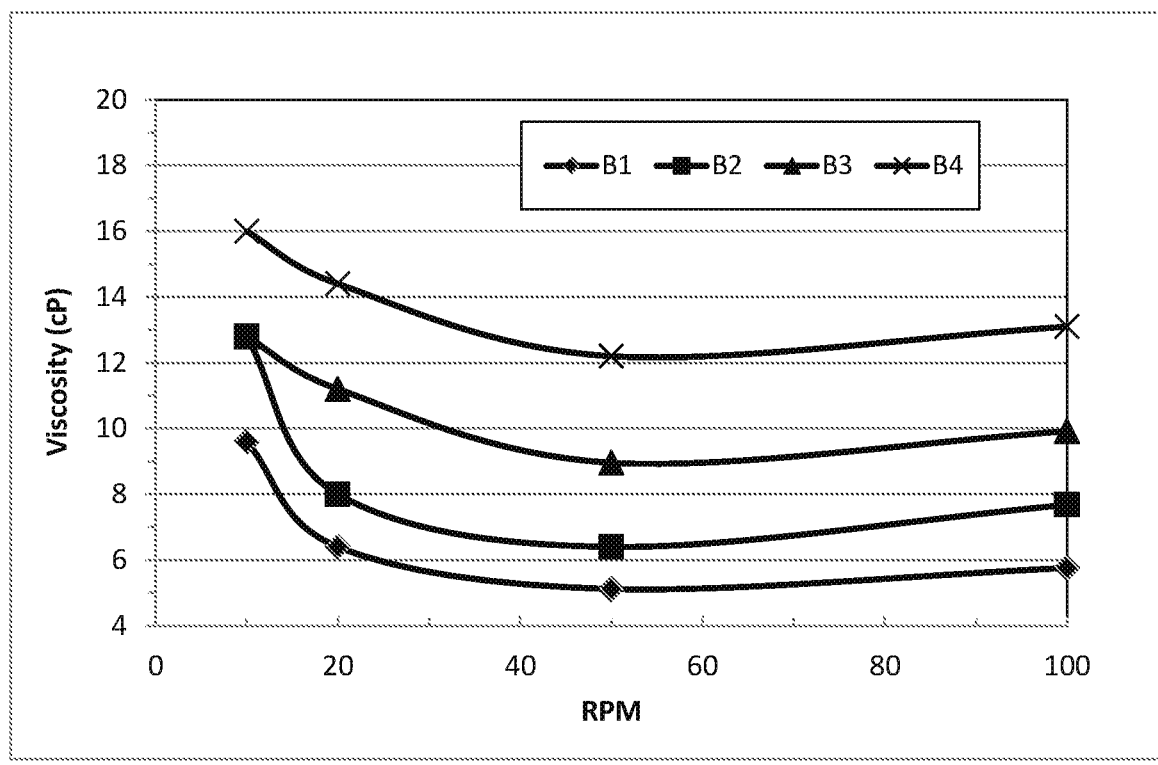
FIG. 17 shows plots of Brookfield viscosity (cP) for four dispersions B1 (♦), B2 (■), B3 (▲), and B4 (x) containing composite particles according to examples of the present application.
Figure 18:
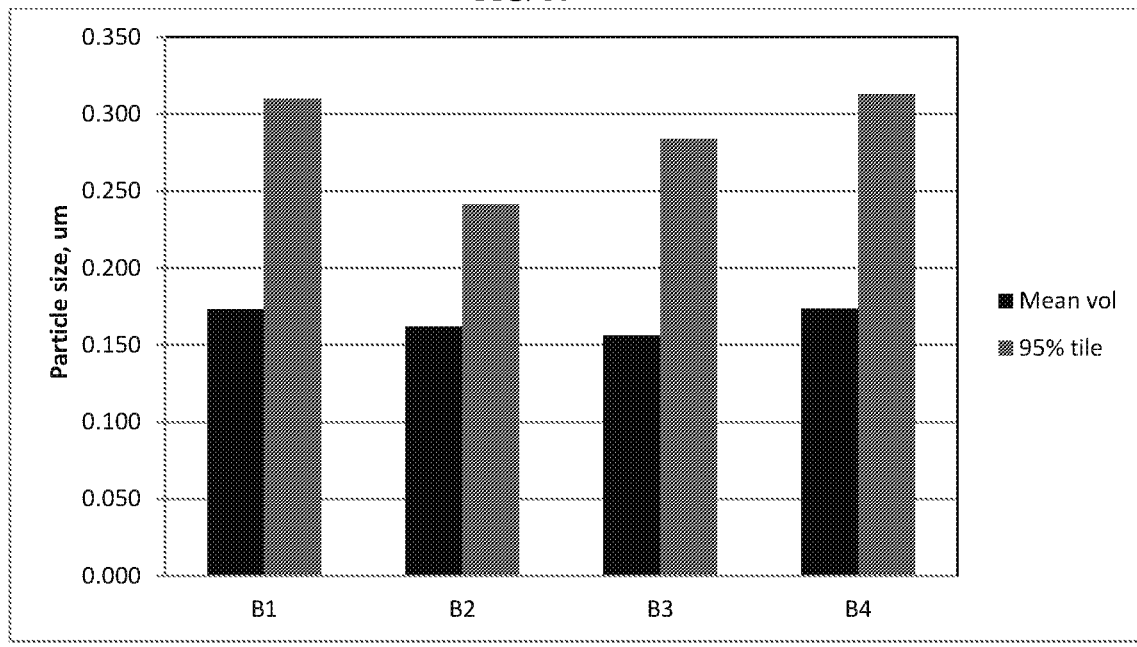
FIG. 18 shows bar graphs of particle size distributions (mean volume and 95 percentile (%)) for containing composite particles according to examples of the present application.

FIG. 17 and FIG. 18 show the Brookfield viscosity and particle size distribution for all four dispersions. The results show that nearly Newtonian dispersions were obtained that exhibited acceptable viscosity for use in inks, coatings or carbon millbase for black matrix applications. The particle size data, shown as mean volume and D95 (value of the particle diameter at 95% in the cumulative distribution), demonstrated that the composite particles were adequately dispersed with mean volume of ~150 nm and D95 of about 300 nm, which is in line with the typical requirements for black matrix millbases. The viscosity and particle size measurements were repeated on the same millbases after one week storage time and showed no significant changes, thus confirming adequate dispersion.

Example 3

In this example, the evaluation of composite particles of the present application was conducted using a standard method that includes preparation of a millbase, let-down and coating forming steps.

The composite particles of sample nos. 2 and 6 which were made according to Examples A2 and A6 from Example 1 were selected for the study.

Millbases with composite particles according to Sample Nos. 2 and 6 were prepared using the formulation of Example B1 and the method of Example 2 above. A black photoresist formulation was prepared with the millbase of composite particles, photopolymer (Miphoto MB2000 available from MiWon Chemical, Korea), photoinitiator (Irgacure® Oxe02 available from BASF), a crosslinker (dipentaerythritol hexaacrylate, Aldrich) and PGMEA solvent. To make black photoresist, the components were first dissolved in PGMEA to make 30 wt % Miphoto MB2000 photopolymer in PGMEA, 10 wt % Irgacure® Oxe02 in PGMEA and 20 wt % dipentaerythritol hexaacrylate in PGMEA. The millbase of composite particles was combined with solutions of photopolymer, photoinitiator, crosslinker and PGMEA to make 100 g of the black photoresist with the total % solids of about 18 wt %. The mass ratio of composite particle millbase to photopolymer solutions was varied to make formulations with 60 wt %, 65 wt %, 70 wt %, and 75 wt % composite particles on a dry basis. For example, 54 g of composite particle millbase was combined with 7 g of 30 wt % Miphoto MB2000 photopolymer solution, 9 g of 10 wt % Oxe02 solution, 9 g of 20 wt % dipentaerythritol hexaacrylate solution, and 21 g of additional PGMEA to make 100 g of the black photoresist having 60 wt % carbon-silica composite particles (on the dry basis) and total solid content of about 18 wt % in PGMEA. The composite particles with ultra low structure carbon black core could be formulated with up to 70-75 wt % of particles on a dry basis, which can dramatically enhance properties such as optical density.

All formulations were sonicated for 1 min and vortexed for additional 30 sec. A 10 g aliquot was syringe-filtered two times through a 0.7 micron glass filter using two separate filters and spun coated onto a glass wafer targeting a 1 micron thick (dry) coating. The coating was air dried for 5 min and soft baked at 90° C. for 2 min. Each black matrix was UV cured in Newport UV exposure unit (model 97436) using 350 Watt Hg lamp for 13.5 sec. The coatings were then hard baked at 220° C. for 1 h unless otherwise specified. Optical density was measured using a X-Rite 361T Transmission Densitometer, and the film thickness was measured using a KLA Tencor Alpha Step 500 Surface Profilometer. The surface resistivity of the coatings was measured using a Keithley Model 6517 Electrometer/High Resistance Meter.

Figure 19:
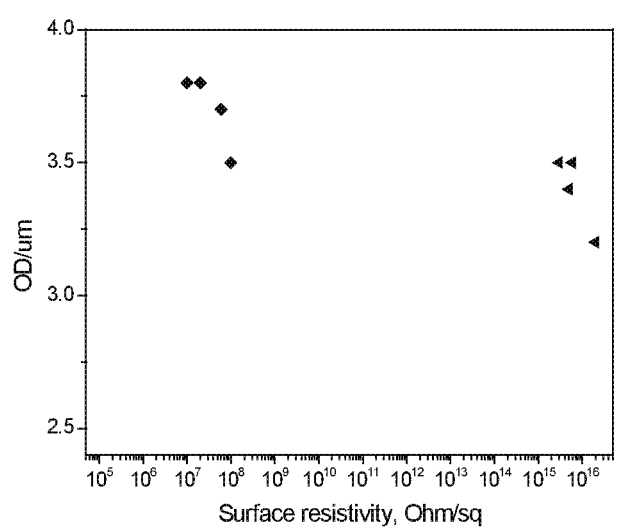
FIG. 19 is a plot of optical density (normalized to one micron (μm)) versus surface resistivity (Ohm/sq) of films containing two different composite particles according to examples of the present application (Sample 2: ♦, Sample 6: ◄).

The results of this study are shown in FIG. 19 and demonstrate that the composite particles with low structure carbon black cores provided high optical density. Coatings with particles according to Sample 6 (◄), which have a higher level of silica surface coverage than for Sample 2 (♦), also showed excellent surface resistivity, about $10^{16}$ Ohm/sq. The data in FIG. 19 show that the composite particles according to the invention allowed coatings to achieve high performance targets (both OD and electrical resistivity).

Figure 20:
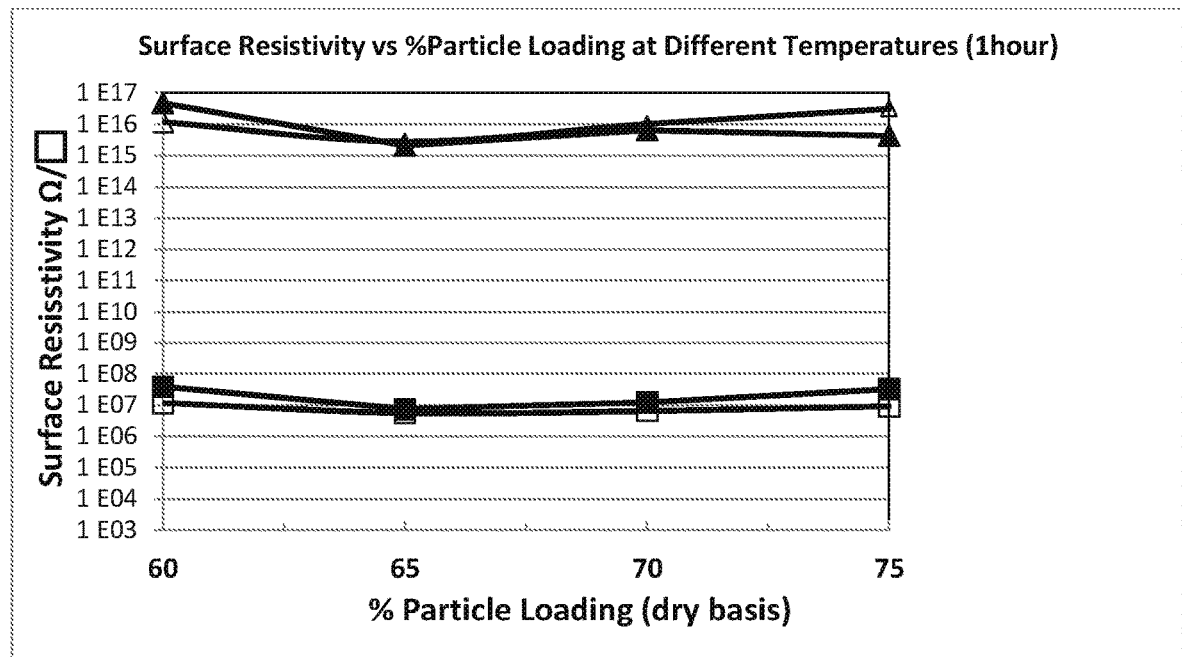
FIG. 20 shows plots of surface resistivity (ohm/square) of coatings comprising very high loadings of composite particles according to examples of the present application with respect to particle loading (wt %, dry basis) after exposure to 220° C. (■, ▲) and 280° C. (□, Δ) for 1 hour.

Some of the black matrix coatings prepared with composite particles according to Samples 2 and 6 as described above were hard baked at 280° C. for 1 hour and their electrical performance examined. FIG. 20 shows the electrical surface resistivity for the coatings hard baked at 220° C. and 280° C. for the formulations with very high loading of composite particle (squares: Sample 2, triangles: Sample 6, solid: 220° C., hollow: 280° C.). FIG. 20 shows the loading percentages for the composite particles on a dry basis, and the remaining solids content of the coatings was constituted by polymer solids. Generally, preserving electrical resistivity in coatings having high loadings of carbonaceous particles is generally very challenging since even small temperature-induced changes in the polymer matrix (for example, shrinkage) or particles (loss of surface groups, increased particle mobility and rearrangement) can result dramatic changes to the electrical properties due to percolation (increased connectivity of particles). As such, the results of FIG. 20 are particularly impressive and showed no significant change in the electrical properties of the coatings even at very high composite particle loadings. Therefore, the composite particles according to the invention can enable coatings with high optical density, high electrical resistivity and stable electrical resistivity performance under high temperature exposure.

Example 4

The water spreading pressure of an oxidized carbon black (Regal 400R carbon black from Cabot Corporation) and composite particles produced according to Examples C2 and C6 were measured by observing the mass increase of each sample as it adsorbed water from a controlled atmosphere. In the test, the relative humidity (RH) of the atmosphere around the sample is increased from 0% (pure nitrogen) to ~100% (water-saturated nitrogen). If the sample and atmosphere are always in equilibrium, the water spreading pressure ($\pi_e$) of the sample is defined as:

$$\pi_e = \frac{RT}{A} \int_o^{P_o} \Gamma d\ln P$$

where R is the gas constant, T is the temperature, A is the nitrogen surface area of the sample, $\Gamma$ is the amount of adsorbed water on the sample (converted to moles/gm), P is the partial pressure of water in the atmosphere, and $P_o$ is the saturation vapor pressure in the atmosphere. In practice, the equilibrium adsorption of water on the surface is measured at one or (preferably) several discrete partial pressures and the integral is estimated by the area under the curve.

Before analysis, 100 mg of the material to be analyzed was dried in an oven at 125° C. for 30 minutes. After ensuring that the incubator in a Surface Measurement Systems DVS1 instrument (supplied by SMS Instruments, Monarch Beach, Calif.) had been stable at 25° C. for 2 hours, sample cups were loaded in both the sample and reference chambers. The target RH was set to 0% for 10 minutes to dry the cups and to establish a stable mass baseline. After discharging static and taring the balance, approximately 8 mg of the sample was added to the cup in the sample chamber. After sealing the sample chamber, the sample was allowed to equilibrate at 0% RH. After equilibration, the initial mass of the sample was recorded. The relative humidity of the nitrogen atmosphere was then increased sequentially to levels of approximately 5, 10, 20, 30, 40, 50, 60, 70, 78, 87, and 92% RH, with the system allowed to equilibrate for 20 minutes at each RH level. The mass of water adsorbed at each humidity level was recorded, from which water spreading pressure is calculated via the above equation.

The water spreading pressure of the oxidized carbon black was between 45 and 50 mJ/m$^2$, while that of the composite particles was only 26 mJ/m$^2$, indicating that the composite particles exhibit lower moisture adsorption. Entrapped water can impact the electrical resistivity and dielectric performance of black matrix and black column spacer materials and also inhibit curing of moisture sensitive polymer systems. Thus, the use of composite particles as opposed to carbon blacks which have been oxidized or otherwise surface treated to introduce acidic and other hydrophilic groups can provide improved manufacturability and electrical performance in light shielding compositions.

Example 5

In this example, the evaluation of composite particles of the present application was conducted using a standard method that includes preparation of a millbase, let-down and coating forming steps. The performance of the composite particles was compared to alternative pigments and also evaluated in combination with alternative pigments.

The composite particles made according to Example A6 from Example 1 were selected for the study. Also included were Lumogen FK4280 perylene black and Paliotol Black L 0080 aniline black, both from BASF SE, and Ti-lack D TM-B titanium black from Ako-Kasei Co. Ltd.

Millbases including either aniline black or titanium black were prepared with 20 g pigment, 12.5 g BYKJET 9131 dispersant solution (40% active material in solution), and 67.5 g propylene glycol methyl ether acetate (PGMEA). Millbases including perylene black were prepared with 20 g pigment, 20 g Solsperse 37500 dispersant (40% active material in solution), 2 g Solsperse 12000S (100% active material), and 58 g PGMEA. Millbases including silica-carbon composite particles produced according to Example A6 included 20 g composite particles (containing 14.6 g carbon black and 5.4 g silica), 5 g BYKJET 9131 dispersant, and 75 g PGMEA. All components were charged into an appropriately sized metal paint can along with equal parts of 0.5 mm glass beads by weight. Mill bases were dispersed for four hours using a LAU disperser. The dispersed mill bases were filtered using a paint strainer to remove bead fragments.

Photoresist inks were prepared according to the formulas in Tables 10 and 11, below (all quantities are weight percent except target film thickness, given in microns), and used in coating formulations as specified. Materials were weighed in to glass vials and vortexed for 30 seconds to ensure homogeneity. Table 10 indicates photoresist formulations for alternative pigments; aniline and titanium black pigments were formulated using the same ink formulation. Table 11 lists photoresist ink formulations with the composite particles produced according to Example A6 and BYKJET 9131 dispersant. Except as specified, the photopolymer solution was Miphoto MB2000 from Miwon Commercial Co., Ltd. (used as received from manufacturer, with 31% solids in PGMEA). The photoinitiator was Irgacure Oxe02 from BASF SE and was used as a 10 wt % solution in PGMEA. The monomer was dipentaerythritol hexaacrylate (DPHA, Aldrich), used as a 20 wt % solution in PGMEA for preparation of 1 micron films and 25% solution in PGMEA for 3 micron films. In Table 10, the column "% pigment in dry film" indicates the target amount of pigment in the resulting film. For the composite particles, this includes the carbon black component of the particle but not the silica.

TABLE 10

| Ink # | Pigments | Target film thickness | % pigment in dry film | Mill base | Polymer solution | Initiator solution | DPHA solution | PGMEA |
|---|---|---|---|---|---|---|---|---|
| 1 | Aniline black, titanium black | 3 | 30 | 37.50 | 29.39 | 24.25 | 4.53 | 4.33 |
| 2 | Aniline black, titanium black | 3 | 20 | 25.00 | 35.26 | 29.10 | 5.44 | 5.20 |
| 3 | Aniline black, titanium black | 3 | 10 | 12.50 | 41.14 | 33.95 | 6.34 | 6.07 |
| 4 | Aniline black, titanium black | 1 | 30 | 27.07 | 14.58 | 20.41 | 26.24 | 11.69 |
| 5 | Perylene black | 3 | 30 | 37.50 | 25.86 | 21.34 | 3.99 | 11.31 |
| 6 | Perylene black | 3 | 20 | 25.00 | 32.91 | 27.16 | 5.08 | 9.85 |
| 7 | Perylene black | 3 | 10 | 12.50 | 39.96 | 32.98 | 6.16 | 8.39 |
| 8 | Perylene black | 1 | 30 | 27.09 | 12.84 | 17.97 | 23.1 | 19.01 |

TABLE 11

| Ink # | Polymer in ink | Target film thickness | % pigment in dry film | Mill base | Polymer solution | Initiator solution | DPHA soln. | PGMEA |
|---|---|---|---|---|---|---|---|---|
| 9 | Miphoto MB 2000 | 3 | 30 | 51.37 | 22.86 | 18.87 | 3.53 | 3.37 |
| 10 | Miphoto MB 2000 | 3 | 20 | 34.25 | 30.91 | 25.51 | 4.77 | 4.56 |
| 11 | Miphoto MB 2000 | 3 | 10 | 17.12 | 38.97 | 32.16 | 6.01 | 5.75 |
| 12 | Miphoto MB 2000 | 1 | 30 | 36.91 | 11.36 | 15.90 | 20.40 | 15.43 |
| 13 | Miphoto MB 2000 | 1 | 47.5 | 58.41 | 4.42 | 6.19 | 7.96 | 23.01 |
| 14 | NeoCryl B817* | 3 | 30 | 37.00 | 43.77 | — | — | 19.23 |
| 15 | NeoCryl B817 | 3 | 20 | 24.70 | 59.18 | — | — | 16.12 |
| 16 | NeoCryl B817 | 3 | 10 | 12.30 | 74.59 | — | — | 13.11 |

*DSM Coating Resins; used as 20% solution in PGMEA

Films with pigment blends were produced by combining appropriate proportions of photoresist inks. For example, 27%/3% blends of the alternative pigments with particles produced according to Example A6 were achieved by blending 90 wt % of Ink #1 or 5 containing the appropriate pigment with 10 wt % Ink #9. 15%/5% blends of Sample 6 with the alternative pigment were achieved by blending 75 wt % Ink #10 with 25 wt % of Ink #2 or 6 containing the appropriate pigment. To produce photoresists, films were prepared on either 4" diameter Eagle XG glass or 1.5"×2" ITO glass using a CEE 200× spin coater. Conditions were chosen to yield 1 and 3 μm films. Coated glass was then subjected to a two minute soft bake at 90° C. (for 1 micron films) or a five minute soft bake at 100° C. (for 3 micron films) to remove solvent, film was then UV cured if needed and subsequently hard baked at 220° C. for 30 minutes unless otherwise noted. Films were then analyzed for the properties listed in Table 12 as described in the table. The measured optical density was normalized to one micron. The current flow at 10V is an indicator of whether the film experiences dielectric breakdown at less than 10V potential and is reported as a logarithm in the tables below.

TABLE 12

| Measurement | Instrument | Film Substrate |
|---|---|---|
| Surface resistivity | Keithley 6517A resistance electrometer with Keithley 8009 Test Fixture | 4" diameter Eagle XG glass |
| Dielectric constant | Solartron 1296A Dielectric Interface System with Solartron 1260A Impedance/Gain-Phase Analyzer | 1.5" × 2" ITO glass that was gold sputtered |
| Current flow at 10 V | Keithley 6517B resistance electrometer with Keithley 8009 Test Fixture | 4" diameter Eagle XG glass or 1.5" × 2" ITO glass |
| Optical density | X-Rite 361T transmission densitometer | 4" diameter Eagle XG glass or 1.5" × 2" ITO glass |
| Film thickness | Mahr Pocket Surf PS-1 | 4" diameter Eagle XG glass or 1.5" × 2" ITO glass |

TABLE 12-continued

| Measurement | Instrument | Film Substrate |
|---|---|---|
| % Transmission at 950 nm | Perkin Elmer Lambda 750 UV/Vis/NIR Spectrophotometer | 1.5" × 2" ITO glass |

Films were evaluated for stability by baking at the times and temperatures indicated in Table 13 below (all films produced with Miphoto MB2000 photoresist on Eagle XG glass plates). The column "Pigment loading in film" only accounts for the carbon content of the particles produced according to Example A6, not the silica content. The results show that films prepared with composite particles produced according to Example A6 retain their resistivity properties and avoid dielectric breakdown at voltages less than 10V, even after extended exposure to high heat (280° C.).

The properties of films produced with composite particles produced according to Example A6 was compared to those of films produced with alternative pigments. The column "Pigment loading in film" only accounts for the carbon content of the particles produced according to Example A6, not the silica content. The results in Table 14 (all for films with a 3 micron target thickness on ITO; empty spaces indicate data not collected) show that the optical density and dielectric constant of films prepared with composite par-

TABLE 13

| Pigment | Pigment loading in film (wt %) | Target film thickness (μm) | Hard bake time (min) | Hard Bake Temp (° C.) | Log surface resistivity | Log current at 10 V |
|---|---|---|---|---|---|---|
| Example A6 | 30 | 1 | 30 | 220 | 16.74 | −12.9 |
| Example A6 | 30 | 1 | 30 | 280 | 17.34 | −12.64 |
| Perylene Black | 30 | 1 | 120 | 280 | 16.39 | −13.79 |
| Perylene Black | 30 | 1 | 30 | 220 | 16.78 | No data |
| Example A6 | 47.5 | 1 | 120 | 280 | 16.32 | −12.93 |
| Example A6 | 47.5 | 1 | 30 | 220 | 14.58 | −12.88 |
| Example A6 | 30 | 3 | 120 | 280 | 17.18 | No data |
| Perylene Black | 30 | 3 | 120 | 280 | 16.59 | No data |
| Perylene Black | 30 | 3 | 30 | 220 | 16.67 | −13.06 | ticles according to embodiments of the invention are higher than those of films prepared with the alternative pigments.

TABLE 14

| Pigment | Pigment loading in film (wt %) | Photopolymer | Dielectric Constant | Optical density/μm | % Transmission at 950 nm |
|---|---|---|---|---|---|
| Example A6 | 10 | B817 | 5.79 | 0.61 | 11.4 |
| Example A6 | 10 | B817 | 5.9 | 0.62 | |
| Aniline Black | 10 | MB2000 | 4.87 | 0.08 | 84.1 |
| Aniline Black | 10 | MB2000 | 4.89 | 0.08 | |
| Titanium Black | 10 | MB2000 | 5.36 | 0.1 | 23.2 |
| Titanium Black | 10 | MB2000 | 4.96 | 0.11 | |
| Example A6 | 20 | MB2000 | 9.73 | 1.43 | 0.8 |
| Example A6 | 20 | MB2000 | 9.39 | 1.44 | |
| Example A6 | 20 | B817 | 8.77 | 1.11 | |
| Example A6 | 20 | B817 | 6.07 | 1.22 | |
| Example A6 | 20 | B817 | 7.93 | 1.23 | |
| Perylene Black | 20 | MB2000 | 4.47 | 0.61 | 86 |
| Perylene Black | 20 | MB2000 | 4.43 | 0.63 | |
| Aniline Black | 20 | MB2000 | 5.23 | 0.16 | 75.7 |
| Aniline Black | 20 | MB2000 | 5.25 | 0.18 | |
| Titanium Black | 20 | MB2000 | | 0.21 | |
| Titanium Black | 20 | MB2000 | 6.08 | 0.24 | 5.8 |
| Titanium Black | 20 | MB2000 | 6.42 | 0.23 | |
| Example A6 | 30 | MB2000 | 14.24 | 2 | 0.1 |
| Example A6 | 30 | MB2000 | 13.04 | 2.14 | |
| Example A6 | 30 | B817 | 11.27 | 1.98 | |
| Example A6 | 30 | B817 | 11.86 | 1.93 | |
| Example A6 | 30 | B817 | 11.68 | 2 | |

TABLE 14-continued

| Pigment | Pigment loading in film (wt %) | Photopolymer | Dielectric Constant | Optical density/μm | % Transmission at 950 nm |
|---|---|---|---|---|---|
| Example A6 | 30 | B817 | 11.39 | 1.98 | 0.5 |
| Perylene Black | 30 | MB2000 | 4.82 | 0.76 | 76.7 |
| Perylene Black | 30 | MB2000 | 4.7 | 0.78 | |
| Aniline Black | 30 | MB2000 | 5.43 | 0.28 | 69.5 |
| Aniline Black | 30 | MB2000 | 5.41 | 0.28 | |
| Titanium Black | 30 | MB2000 | 7.89 | 0.35 | 2.1 |
| Titanium Black | 30 | MB2000 | 7.34 | 0.36 | |

The properties of films (all with MB2000 photoresist, 3 μm thick on ITO) produced with blends of composite particles produced according to Example A6 and alternative pigments were also evaluated. The column "Example A6 pigment in film" gives the amount of pigment from the Example A6 particle in the film, not the loading of the Example A6 particle itself (which would include the mass of silica in the particle). The results in Table 15 (empty spaces indicate data not collected) demonstrate that blending composite particles with alternative pigments increases the optical density of films with respect to films (all with MB2000 photoresist, 3 μm thick on ITO) containing only the alternative pigment and the near IR transmission of films with respect to films containing only composite particles. Blending composite particles with alternative pigments also resulted in films having dielectric constants intermediate between those of films containing the composite particle and the respective alternative particle.

method that includes preparation of a millbase, let-down and coating forming steps. Millbases were prepared using particles produced according to Examples A2 and A6 according to the process and formulation in Example 5. In addition, millbases were prepared using the process of Example 5 using 20 g composite particles, 15 g Solsperse 37500 dispersant, and 65 g PGMEA. Photoresist ink formulations were prepared with Miphoto MB2000 photoresist as described in Example 5 using the formulations in Table 16. The procedures in Example 5 were used to prepare films with a target thickness of 3 microns on ITO. The dielectric constant and optical density are listed in Table 17. The data demonstrate that particles produced according to embodiments of the invention maintain their performance in a variety of formulations.

TABLE 16

| Component (all amounts in wt %) | Example A2 | | | Example A6 | | |
|---|---|---|---|---|---|---|
| | 30% CB film | 20% CB film | 10% CB film | 30% CB film | 20% CB film | 10% CB film |
| Millbase | 47.47 | 31.65 | 15.82 | 51.37 | 34.25 | 17.12 |
| Photopolymer | 23.81 | 31.54 | 39.28 | 21.90 | 30.27 | 38.64 |
| Monomer solution | 19.65 | 26.03 | 32.42 | 18.07 | 24.98 | 31.89 |
| Photoinitiator solution | 3.67 | 4.86 | 6.06 | 3.38 | 4.67 | 5.96 |
| PGMEA | 5.41 | 5.92 | 6.43 | 5.28 | 5.83 | 6.38 |

TABLE 15

| Pigment (wt % in film) | Example A6 pigment in film (wt %) | Dielectric Constant | Optical density/μm | % Transmission at 950 nm |
|---|---|---|---|---|
| Perylene Black (5) | 15 | | 1.11 | 1.2 |
| Perylene Black (5) | 15 | 7.31 | 1.23 | |
| Perylene Black (5) | 15 | 6.78 | 1.24 | |
| Aniline Black (5) | 15 | 7.75 | 1.1 | 2.4 |
| Aniline Black (5) | 15 | 7.9 | 1.08 | |
| Titanium Black (5) | 15 | | 1.27 | 1.5 |
| Titanium Black (5) | 15 | 8.71 | 1.13 | |
| Titanium Black (5) | 15 | 8.88 | 1.09 | |
| Perylene Black (27) | 3 | 4.9 | 1 | 26.1 |
| Perylene Black (27) | 3 | 4.96 | 1 | |
| Aniline Black (27) | 3 | | 0.49 | 36.1 |
| Aniline Black (27) | 3 | 6.35 | 0.47 | |
| Aniline Black (27) | 3 | 5.46 | 0.51 | |
| Titanium Black (27) | 3 | 8.21 | 0.56 | 1.3 |
| Titanium Black (27) | 3 | 7.9 | 0.58 | |

TABLE 17

| Particle | wt % pigment in dry film | Dispersant | Dielectric constant | Optical density/μm |
|---|---|---|---|---|
| Example A2 | 10 | Solsperse 37500 | 5.72 | 0.64 |
| Example A6 | 10 | Solsperse 37500 | 6.03 | 0.64 |
| Example A2 | 20 | Solsperse 37500 | 8.58 | 1.3 |
| Example A6 | 20 | Solsperse 37500 | 8.6 | 1.3 |
| Example A2 | 30 | Solsperse 37500 | 11.64 | 1.95 |
| Example A6 | 30 | Solsperse 37500 | 12.25 | 1.9 |
| Example A2 | 30 | Byk 9131 | 11.59 | 1.93 |
| Example A6 | 30 | Byk 9131 | 12.67 | 1.85 |

Example 6

In this example, the evaluation of composite particles of the present application was conducted using a standard Example 7

Millbases with 20 wt % particles were produced as described in Example 5 using BYKJET 9131 dispersant and 1) particles produced according to Example A2, 2) particles produced according to Example A6, and 3) particles produced according to WO2012/082484 (derived from Sample D with 45.1% silica, BET=148.8 m²/g, OAN=123.6 cc/100 g, and silica coverage of 54%). Viscosity was measured with a Brookfield DV-III Ultra Programmable Rheometer using a CPE-40 spindle at 40 rpm. The viscosity of the millbases using the composite particles produced according to Examples A2 and Example A6 were 4.36 and 4.57 cP, respectively. The millbases with more highly structured silica-carbon hybrid particles was too viscous to measure under these conditions.

The present invention includes the following aspects/embodiments/features in any order and/or in any combination:

1. Carbon black-metal/metalloid oxide composite particles, comprising a plurality of carbon black aggregates, wherein each carbon black aggregate is at least partially coated with at least one metal oxide or metalloid oxide or any combinations thereof to provide coated aggregates, the coated aggregates are fused together to form individual composite particles having an exposed outer surface area, wherein the at least one metal oxide or metalloid oxide is at least 30% by surface area of the exposed outer surface area of the composite particles.
2. The composite particles of any preceding or following embodiment/feature/aspect, wherein the carbon black aggregates have a roundness of at least 0.8 based on electron microscopy images of samples of the carbon black aggregates.
3. The composite particles of any preceding or following embodiment/feature/aspect, wherein the coated aggregates have metal/metalloid oxide mantles and have a roundness of at least 0.8 based on electron microscopy images of ashed samples of the coated aggregates.
4. The composite particles of any preceding or following embodiment/feature/aspect, wherein the carbon black aggregates have an OAN of from 30 to 50 cc/100 g, measured after hydrofluoric acid treatment of the composite particles to leave residual metal or metalloid oxide coating of less than 1 wt %.
5. The composite particles of any preceding or following embodiment/feature/aspect having an OAN of from 60 to 130 cc/100 g composite particles.
6. The composite particles of any preceding or following embodiment/feature/aspect having a ratio of BET ($m^2/g$)/iodine number (mg/g) of from 2 to 5.
7. The composite particles of any preceding or following embodiment/feature/aspect, wherein the coated aggregates comprise a carbon core and a metal/metalloid oxide-containing shell.
8. The composite particles of any preceding or following embodiment/feature/aspect, wherein the at least one of metal oxide or metalloid oxide or any combinations thereof is from 10 to 30 wt %, based on the weight of the composite particle.
9. The composite particles of any preceding or following embodiment/feature/aspect, wherein the carbon black aggregates comprise less than 0.1 wt % of the metal oxide or metalloid oxide of the coating, based on the weight of the carbon black aggregates.
10. The composite particles of any preceding or following embodiment/feature/aspect, wherein the at least one of metal oxide or metalloid oxide or any combinations thereof is 50 to 99% by surface area of the exposed outer surface area of the composite particle.
11. The composite particles of any preceding or following embodiment/feature/aspect, wherein the at least one of metal oxide or metalloid oxide or any combinations thereof is 60 to 80% by surface area of the exposed outer surface area of the composite particle.
12. The composite particles of any preceding or following embodiment/feature/aspect, wherein from 50 to 99% by weight of total content of the at least one of metal oxide or metalloid oxide or any combinations thereof of the composite particle is shell material.
13. The composite particles of any preceding or following embodiment/feature/aspect having a BET of 50-90 $m^2/g$.
14. The composite particles of any preceding or following embodiment/feature/aspect having a volume resistivity greater than 20 Ω·cm at a powder density of 1 g/cc.
15. The composite particles of any preceding or following embodiment/feature/aspect having a volume resistivity of $10^6$ or greater Ω·cm at a powder density of 1 g/cc.
16. The composite particles of any preceding or following embodiment/feature/aspect, wherein the coated aggregates have an average size of from 1 to 100 nm.
17. The composite particles of any preceding or following embodiment/feature/aspect having an average size of from 5 to 500 nm.
18. The composite particles of any preceding or following embodiment/feature/aspect having a tint of from 75 to 100.
19. The composite particles of any preceding or following embodiment/feature/aspect having a loss on heating of less than 1 wt % loss when subjected to a temperature of from 110° C. to 450° C. in air with a temperature ramp of 5° C. per minute.
20. The composite particles of any preceding or following embodiment/feature/aspect, wherein the at least one metal oxide or metalloid oxide or any combination thereof is metalloid oxide wherein the metalloid is silicon, boron, germanium, or any combinations thereof
21. The composite particles of any preceding or following embodiment/feature/aspect, wherein the at least one metal oxide or metalloid oxide or any combinations thereof is silica.
22. The composite particles of any preceding or following embodiment/feature/aspect, wherein the at least one metal oxide or metalloid oxide or any combinations thereof is metal oxide wherein the metal is aluminum, zinc, magnesium, calcium, titanium, vanadium, cobalt, nickel, zirconium, tin, antimony, chromium, neodymium, lead, tellurium, barium, cesium, iron, molybdenum, or any combinations thereof.
23. A method of making carbon black-metal/metalloid oxide composite particles, for example, of any preceding or following embodiment/feature/aspect, comprising:
    forming a stream of combustion gases by reacting a preheated air stream with a fuel;
    introducing first feedstock into the stream of combustion gases at a predetermined number of points arranged in a first ring pattern that is defined around the stream of combustion gases to form a reaction stream and start pyrolysis of the first feedstock in the reaction stream, wherein the first feedstock comprises carbon black-yielding feedstock;
    introducing an auxiliary hydrocarbon into the stream of combustion gases at a predetermined number of points arranged in a second ring pattern that is defined around the stream of combustion gases, wherein the first and second ring patterns may be located at a same location or different locations;
    additionally introducing into at least one of the stream of combustion gases or the reaction stream or any combinations thereof at least one substance containing at least one Group IA element or Group IIA element or any combinations thereof;

allowing carbon black aggregates to form in the reaction stream, thereby forming carbon black aggregates suspended in the reaction stream, wherein the carbon black aggregates have external surfaces;

introducing a second feedstock comprising at least one of metal containing compound or metalloid-containing compound or any combinations thereof into the reaction stream in which the carbon black aggregates are suspended, the reaction stream having sufficient temperature to decompose the at least one metal-containing compound or metalloid-containing compound or any combinations thereof, wherein the decomposed at least one metal-containing compound or metalloid-containing compound or any combinations thereof form a shell comprising metal oxide or metalloid oxide or any combinations thereof about at least a portion of the external surfaces of the carbon black aggregates to form at least partially coated carbon black aggregates; and allowing the at least partially coated carbon black aggregates to fuse together to form composite particles before quenching the pyrolysis, wherein the at least one metal oxide or metalloid oxide or any combinations thereof is at least 30% by surface area of the exposed outer surface area of the composite particles.

24. The method of any preceding or following embodiment/feature/aspect, further comprising introducing the second feedstock into the reaction stream at a second injection location in the reactor that is a sufficient distance downstream from a first injection location where the introducing of the first feedstock into the stream of combustion gases is completed, wherein the reaction stream having a first average reaction temperature at the first injection location which is greater than a second average reaction temperature at the second injection location with the second average reaction temperature sufficient for decomposition of the at least one metal-containing compound or metalloid-containing compound or any combinations thereof 25. The method of any preceding or following embodiment/feature/aspect, further comprising introducing the second feedstock into the reaction stream at a second injection location in the reactor that is 150 cm or more downstream from a first injection location where the introducing of the first feedstock into the stream of combustion gases is completed.

26. The method of any preceding or following embodiment/feature/aspect, further comprising introducing the second feedstock into the reaction stream at a second injection location in the reactor which occurs at least 30 milliseconds after the introducing of the first feedstock into the stream of combustion gases is completed at a first injection location, wherein this residence time is defined by the total gas volume of the flow after the first injection location and the volume of the reactor between the first and second injection locations.

27. The method of any preceding or following embodiment/feature/aspect, wherein the second feedstock consists essentially of at least one silicon-containing compound.

28. The method of any preceding or following embodiment/feature/aspect, wherein the second feedstock consists of a silicon-containing compound or silicon-containing compounds.

29. The method of any preceding or following embodiment/feature/aspect, wherein the carbon black aggregates suspended in the reaction stream have an OAN of from 30 to 50 cc/100 g, measured after hydrofluoric acid treatment of the coated aggregates to leave residual metal or metalloid oxide coating of less than 1 wt %.

30. The method of any preceding or following embodiment/feature/aspect, wherein the at least partially coated carbon black aggregates comprise a carbon core and a metal/metalloid oxide-containing shell.

31. A coating comprising a polymer composition which comprises at least one polymer and at least one filler, wherein the at least one filler comprising carbon black-metal/metalloid oxide composite particles of any preceding or following embodiment/feature/aspect.

32. The coating of any preceding or following embodiment/feature/aspect, wherein the coating has an optical density of 1 or greater measured at a thickness of about 1 micron.

33. The coating of any preceding or following embodiment/feature/aspect, wherein the coating has a surface resistivity of $10^6$ to $10^{16}$ Ohm/sq.

34. The coating of any preceding or following embodiment/feature/aspect, wherein filler has less than 1% weight loss when subjected to a temperature of from 110° C. to 450° C. in air with a temperature ramp of 5° C. per minute.

35. The coating of any preceding or following embodiment/feature/aspect, wherein the at least one of metal oxide or metalloid oxide or any combinations thereof is from 10 to 30 wt %, based on the weight of the composite particle.

36. The coating of any preceding or following embodiment/feature/aspect, wherein the coated aggregates comprise a carbon core and a metal/metalloid oxide-containing shell.

37. The coating of any preceding or following embodiment/feature/aspect, wherein the at least one of metal oxide or metalloid oxide or any combinations thereof is 50 to 99% by surface area of the exposed outer surface area of the composite particle.

38. The coating of any preceding or following embodiment/feature/aspect, wherein the at least one of metal oxide or metalloid oxide or any combinations thereof is 60 to 80% by surface area of the exposed outer surface area of the composite particle.

39. The coating of any preceding or following embodiment/feature/aspect, wherein the composite particles have an OAN of from 60 to 130 cc/100 g composite particles.

40. The coating of any preceding or following embodiment/feature/aspect comprising from 1 wt % filler loading to 65 wt % filler loading, based on total weight of the coating.

41. The coating of any preceding or following embodiment/feature/aspect, wherein the filler further comprises single phase carbon black, titanium black, or an organic black, e.g., aniline or perylene black.

42. The coating of any preceding or following embodiment/feature/aspect, wherein the at least one polymer comprises a curable polymer.

43. A black matrix comprising a cured coating of any preceding or following embodiment/feature/aspect.

44. A black column spacer comprising a cured coating of any preceding or following embodiment/feature/aspect.

45. A light shielding coating element in an LCD device comprising a cured coating of any preceding or following embodiment/feature/aspect.

46. A product containing one or more of coatings, curable coatings, cured coatings, black matrices, black column spacers, and light shielding elements in a LCD which comprise a filler-polymer composition of any preceding or following embodiment/feature/aspect.

47. A liquid crystal display comprising a cured coating of any preceding or following embodiment/feature/aspect.

48. An ink comprising at least one aqueous or non-aqueous carrier, at least one polymer or resin, and carbon black-metal/metalloid oxide composite particles of any preceding or following embodiment/feature/aspect.

49. A method of making a cured coating comprising:
(i) combining at least one polymer with at least one filler and optionally vehicle to provide a curable filler-polymer composition, said filler comprising carbon black-metal/metalloidoxide composite particles of any preceding or following embodiment/feature/aspect;
(ii) applying the curable filler-polymer composition onto a substrate to form a curable coating;
(iii) curing the coating imagewise to form a cured coating; and
(iv) developing and drying the cured coating.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. Carbon black-metal/metalloid oxide composite particles, comprising a plurality of carbon black aggregates, wherein each carbon black aggregate is at least partially coated with at least one metal oxide or metalloid oxide or any combinations thereof to provide coated aggregates, the coated aggregates are fused together to form individual composite particles having an exposed outer surface area, wherein the at least one metal oxide or metalloid oxide is at least 30% by surface area of the exposed outer surface area of the composite particles, and wherein the composite particles have a ratio of BET (m$^2$/g)/iodine number (mg/g) of from 2 to 5.

2. The composite particles of claim 1, wherein the carbon black aggregates have a roundness of at least 0.8 based on electron microscopy images of samples of the carbon black aggregates.

3. The composite particles of claim 1, wherein the coated aggregates have metal/metalloid oxide mantles and have a roundness of at least 0.8 based on electron microscopy images of ashed samples of the coated aggregates.

4. The composite particles of claim 1, wherein the carbon black aggregates have an OAN of from 30 to 50 cc/100 g, measured after hydrofluoric acid treatment of the composite particles to leave residual metal or metalloid oxide coating of less than 1 wt %.

5. The composite particles of claim 1, wherein the composite particles have an OAN of from 60 to 130 cc/100 g composite particles.

6. The composite particles of claim 1, wherein the at least one of metal oxide or metalloid oxide or any combinations thereof is from 10 to 30 wt %, based on the weight of the composite particle.

7. The composite particles of claim 1, wherein the composite particles have a BET of 50-90 m$^2$/g.

8. The composite particles of claim 1, wherein the composite particles have a volume resistivity greater than 20 $\Omega$·cm at a powder density of 1 g/cc.

9. The composite particles of claim 1, wherein the coated aggregates have an average size of from 1 to 100 nm.

10. The composite particles of claim 1, wherein the composite particles have a tint of from 75 to 100.

11. The composite particles of claim 1, wherein the composite particles have a loss on heating of less than 1 wt % loss when subjected to a temperature of from 110° C. to 450° C. in air with a temperature ramp of 5° C. per minute.

12. A coating comprising a polymer composition which comprises at least one polymer and at least one filler, wherein the at least one filler comprising carbon black-metal/metalloid oxide composite particles of claim 1.

13. The coating of claim 12, wherein the coating has an optical density of 1 or greater measured at a thickness of about 1 micron, a surface resistivity of $10^6$ to $10^{16}$ Ohm/sq, or both.

14. The coating of claim 12 comprising from 1 wt % filler loading to 65 wt % filler loading, based on total weight of the coating.

15. An element of a display device selected from the group consisting of a black matrix, a black column spacer, a light shielding element in an LCD device, and a liquid crystal display, the element comprising the coating of claim 12, wherein the coating is cured.

16. An ink comprising at least one aqueous or non-aqueous carrier, at least one polymer or resin, and carbon black-metal/metalloid oxide composite particles of claim 1.

17. A method of making a cured coating comprising:
(i) combining at least one polymer with at least one filler and optionally vehicle to provide a curable filler-polymer composition, said filler comprising carbon black-metal/metalloid oxide composite particles of claim 1;
(ii) applying the curable filler-polymer composition onto a substrate to form a curable coating;
(iii) curing the coating imagewise to form a cured coating; and
(iv) developing and drying the cured coating.

* * * * *